(12) United States Patent
Arnaud

(10) Patent No.: US 7,993,051 B2
(45) Date of Patent: *Aug. 9, 2011

(54) METHODS AND APPARATUS FOR ENHANCING VENTURI SUCTION IN EDUCTOR MIXERS

(75) Inventor: Johnny Arnaud, Houston, TX (US)

(73) Assignee: Hydrotreat, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/833,479

(22) Filed: Jul. 9, 2010

(65) Prior Publication Data

US 2010/0270223 A1 Oct. 28, 2010

Related U.S. Application Data

(60) Continuation of application No. 10/979,793, filed on Nov. 1, 2004, now Pat. No. 7,776,213, and a continuation-in-part of application No. 10/716,372, filed on Nov. 18, 2003, now Pat. No. 6,811,690, which is a division of application No. 09/879,496, filed on Jun. 12, 2001, now Pat. No. 6,669,843.

(60) Provisional application No. 60/615,998, filed on Oct. 5, 2004.

(51) Int. Cl.
*B01F 5/02* (2006.01)

(52) U.S. Cl. .................. 366/163.2; 137/888; 137/890

(58) Field of Classification Search ............. 366/163.2; 137/888, 890; 239/428.5; 210/220, 221.2, 210/512.1
See application file for complete search history.

(56) References Cited

U.S. PATENT DOCUMENTS

| 174,781 A | 3/1876 | Clemens | 239/288 |
| 355,250 A | 12/1886 | Blass | 261/62 |

(Continued)

OTHER PUBLICATIONS

"Fluid Mechanics With Engineering Applications", R. L. Daugherty, California Institute of Technology, 1954.

(Continued)

*Primary Examiner* — David L Sorkin
(74) *Attorney, Agent, or Firm* — Winston & Strawn LLP

(57) ABSTRACT

An apparatus is provided for suction of a secondary fluid into a primary fluid through one or multiple gaps in contact with a venturi. The venturi imparts a high velocity on the primary fluid to flow across a gap in contact with the venturi and draw in the secondary fluid. The apparatus employs a linear venturi with the flow area, or opening, in the form of a narrow ring or narrow rectangle to increase the length of the gap in contact with the venturi. One gap is provided and positioned in contact with one side of the narrow venturi opening, or two gaps are provided having one positioned in contact each side of the narrow venturi opening. The linear venturi is housed in assemblies referred to as "eductors." Various eductor embodiments are provided including: 1), cylindrical housings with one or multiple concentric linear venturi with openings in the form of narrow rings; 2), rectangular housings with a single rectangular linear venturi with an opening in the form of a narrow rectangle, with multiple rectangular linear venturi with inlets positioned around a primary fluid inlet to flow radially outward through the multiple venturi, with multiple rectangular linear venturi with outlets positioned around a mixing chamber to cause circulation of the flow of fluids; 3), a cylindrical housing with linear venturi with an opening in the form of a narrow ring adapted for inserting into piping; and 4), cylindrical housings with linear venturi with an opening in the form of a wide ring adapted for installation in piping.

25 Claims, 39 Drawing Sheets

U.S. PATENT DOCUMENTS

| | | | | |
|---|---|---|---|---|
| 1,140,548 | A | 5/1915 | Vogelsang | 366/163.2 |
| 2,321,483 | A | 6/1943 | Haedike | 48/180.1 |
| 2,424,654 | A | 7/1947 | Gamble | 48/189.4 |
| 2,735,547 | A | 2/1956 | Vissac | 209/211 |
| 3,289,608 | A | 12/1966 | Laval, Jr. | 103/220 |
| 3,447,511 | A | 6/1969 | Beard et al. | 123/3 |
| 3,507,397 | A | 4/1970 | Robinson | 210/512 |
| 3,512,651 | A | 5/1970 | Laval, Jr. | 210/512 |
| 3,568,837 | A | 3/1971 | Laval, Jr. | 210/136 |
| 3,947,364 | A | 3/1976 | Laval, Jr. | 210/512 |
| 4,026,817 | A | 5/1977 | Ciuti et al. | 516/53 |
| 4,237,006 | A | 12/1980 | Colman et al. | 210/84 |
| 4,374,030 | A | 2/1983 | Franklin, Jr. | 210/758 |
| 4,523,718 | A | 6/1985 | Pearson | 239/106 |
| 4,790,942 | A | 12/1988 | Shmidt et al. | 210/650 |
| 5,000,848 | A | 3/1991 | Hodgins et al. | 210/321.68 |
| 5,021,165 | A | 6/1991 | Kalnins | 210/703 |
| 5,071,542 | A | 12/1991 | Tuszko et al. | 209/144 |
| 5,131,757 | A | 7/1992 | Smith | 366/165 |
| 5,362,395 | A | 11/1994 | Dorau et al. | 210/638 |
| 5,431,346 | A | 7/1995 | Sinaisky | 239/399 |
| 5,451,349 | A | 9/1995 | Kingsley | 261/91 |
| 5,478,484 | A | 12/1995 | Michaluk | 210/788 |
| 5,647,977 | A | 7/1997 | Arnaud | 210/167 |
| 5,794,791 | A | 8/1998 | Kindig | 209/727 |
| 5,882,530 | A | 3/1999 | Chase | 210/788 |
| 5,893,641 | A | 4/1999 | Garcia | 366/163.2 |
| 5,944,998 | A | 8/1999 | Rolchigo et al. | 210/654 |
| 6,024,874 | A | 2/2000 | Lott | 210/512.1 |
| 6,032,931 | A | 3/2000 | Plunkett | 261/77 |
| 6,080,317 | A | 6/2000 | Wagner et al. | 210/652 |
| 6,095,675 | A | 8/2000 | Tai | 366/163.2 |
| 6,106,713 | A | 8/2000 | Miller et al. | 210/321.63 |
| 6,165,365 | A | 12/2000 | Salyer et al. | 210/650 |
| 6,168,724 | B1 | 1/2001 | Hurwitz | 210/780 |
| 6,623,154 | B1 | 9/2003 | Garcia | 366/163.2 |
| 6,669,843 | B2 | 12/2003 | Arnaud | 210/221.2 |
| 6,811,690 | B2 | 11/2004 | Arnaud | 210/512.1 |
| 7,776,213 | B2 * | 8/2010 | Arnaud | 210/221.2 |
| 2002/0121105 | A1 | 9/2002 | McCarthy et al. | 239/399 |
| 2003/0164328 | A1 | 9/2003 | Arnaud | 210/512.1 |
| 2003/0168211 | A1 | 9/2003 | Arnaud et al. | 166/68 |
| 2003/0173275 | A1 | 9/2003 | Arnaud | 210/143 |
| 2003/0173276 | A1 | 9/2003 | Arnaud | 210/143 |
| 2003/0173288 | A1 | 9/2003 | Arnaud | 210/512.1 |
| 2004/0031742 | A1 | 2/2004 | Arnaud | 210/259 |
| 2007/0215712 | A1 | 9/2007 | Rimmer et al. | 239/8 |

OTHER PUBLICATIONS

"Industrial Process Problem Solving . . . Solids/Liquids and Liquid/Liquid Hydrocyclones for Separation, Classification, and Dewatering", © 1995 Krebs Engineers.

DEMCO Cyclone Separators Catalog CI-78, Aug. 15, 1978.

Geosource® The Pioneer in solids/liquid separation, 1979 Catalog.

"Facts about liquid cyclones. Where to use them. Where not to use them. And how to specify the right cyclone for the job. With special emphasis on the DORRCLONE®"; © 1979 Dorr-Oliver Incorporated.

"Porous Plastics" POREX®, © 1998 Porex Technologies Corp.

"Clarifying Oilfield and Refinery Waste Waters by Flotation;" Journal of Petroleum Technology, pp. 426-430, dated Apr. 1973.

"Membrane Bioreactors for Wastewater Treatment;" by Tom Stephenson, et al.; dated 2000, reprinted 2001.

"New Developments in High Shear Crossflow Membrane Filtration;" Fluid/Particle Separation Journal, pp. 123-138, vol. 4, No. 1, Mar. 1991.

EPA Technical Bulletin, EPA 456/F-99-006R; "Nitrogen Oxides (NOx), Why and How They Are Controlled;" Nov. 1999.

International Search Report; International application No. PCT/US02/39623; mailed Mar. 27, 2003.

"*The Eductor Mixer Redefined in Practice*"—Johnny Arnaud, Mar. 2004 (Revision Dec. 4, 2004) Hydrotreat, Inc. (14 pgs.).

"Two Linear Slot Nozzle Virtual Impactors for Concentration of Bioaerosols", A Dissertation by John Steven Haglund, Aug. 2003, available at txspace.tamu.edu/bitstream/1969.1/1414/1/etd-tamu-2003B-2003070712-Hagl-1.pdf.

* cited by examiner

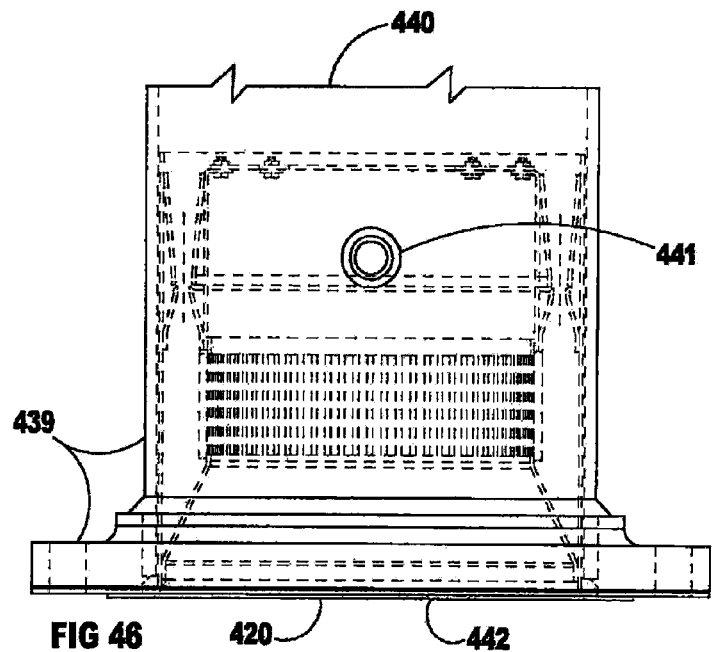
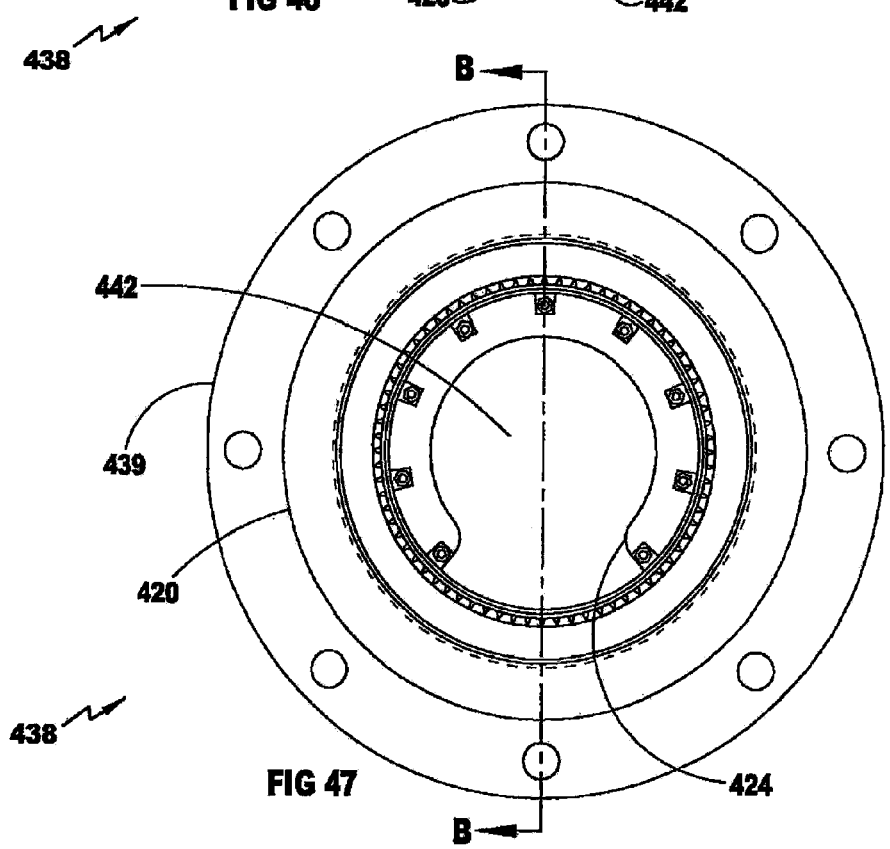

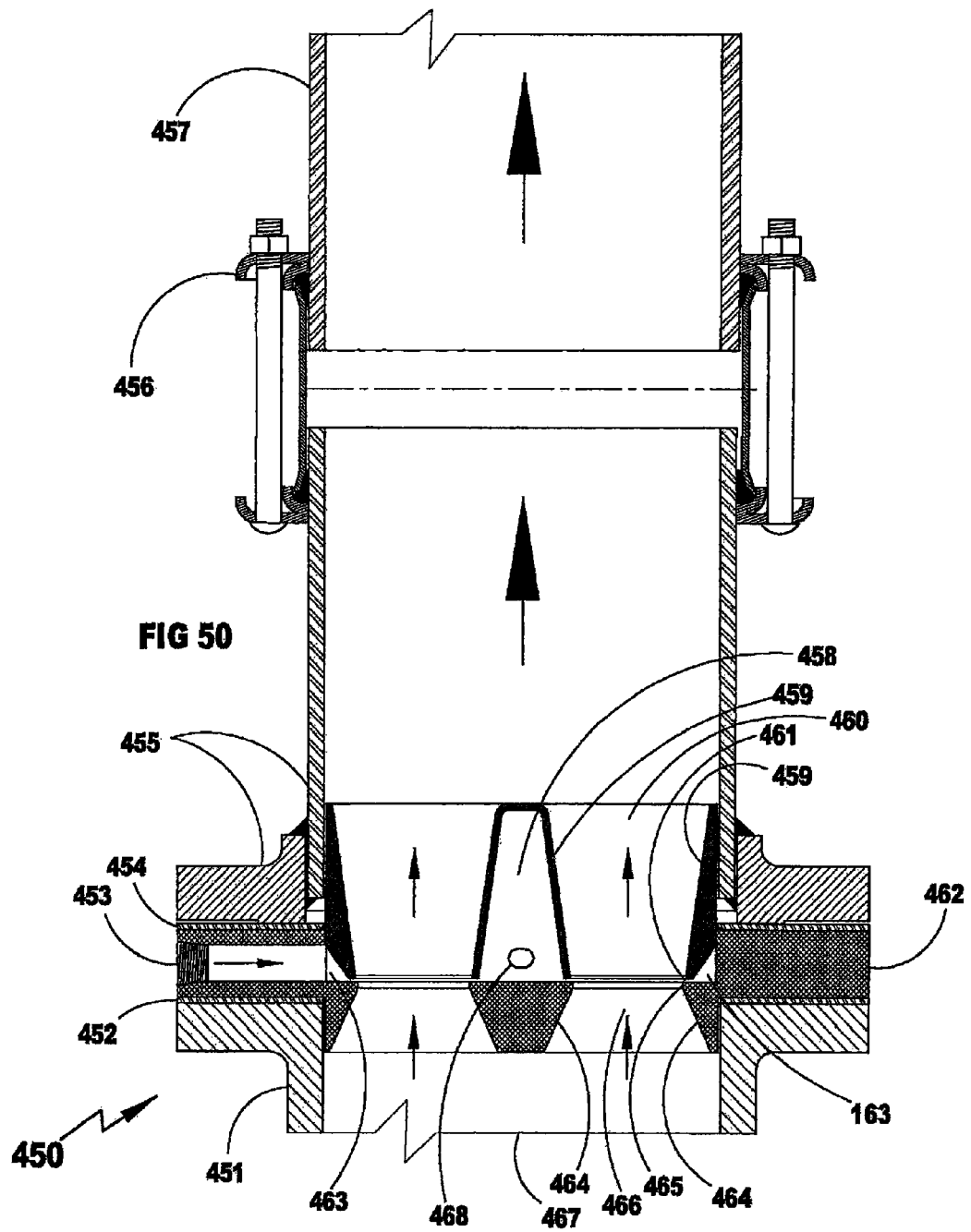

METHODS AND APPARATUS FOR ENHANCING VENTURI SUCTION IN EDUCTOR MIXERS

CROSS REFERENCE TO RELATED APPLICATIONS

This application is a continuation of and claims priority to U.S. Non-Provisional application Ser. No. 10/979,793, filed Nov. 1, 2004, entitled "Apparatus for Enhancing Venturi Suction in Eductor Mixers," naming Johnny Arnaud as inventor, now U.S. Pat. No. 7,776,213, which claims priority to U.S. Provisional Application 60/615,998 filed Oct, 5, 2004, entitled "Method and Apparatus for Enhancing Venturi Suction in Eductor Mixers," naming Johnny Arnaud as inventor, each being incorporated by reference herein in its entirety. U.S. Non-Provisional application Ser. No. 10/979,793 is also a continuation-in-part of U.S. Non-Provisional application Ser. No. 10/716,372, filed Nov. 18, 2003, entitled "Method and Apparatus for Mixing Fluids, Separating Fluids, and Separating Solids from Fluids," naming Johnny Arnaud as inventor, now U.S. Pat. No. 6,811,690, which is a divisional of U.S. Non-Provisional application Ser. No. 09/879,496, filed Jun. 12, 2001, entitled "Method and Apparatus for Mixing Fluids, Separating Fluids, and Separating Solids from Fluids" naming Johnny Arnaud as inventor, now U.S. Pat. No. 6,669,843, each being incorporated by reference herein in its entirety.

BACKGROUND OF THE INVENTION

1. Field of the Invention

The invention relates to methods and apparatus of physical separation of solids from fluids or for mixing fluids. More specifically, the invention relates to methods and apparatus for separating solids from fluids and mixing fluids by using a ring having a plurality of grooves through which fluid passes. The methods and apparatus of the present invention are particularly suitable for use in treatment of aqueous fluids, such as water and wastewater, by dynamic separation of contaminants to be removed and by dynamic mixing of treating agents to be added as part of treatment. The also present invention generally relates to methods and apparatus for increasing suction of fluids by venturi or eductors (sometimes also referred to as "injectors," "inductors," or "aspirators"). More specifically, the invention relates to methods and apparatus employing linear venturi extended in a line, to draw large quantities of gases, liquids, or powdered solids by suction into fluids (liquids or gases).

2. Description of Related Art

Commercial and industrial processes currently employ countless operations involving mixing of fluids (liquids with liquids, gases with liquids, and gases with gases) or separation of fluids or solids from other fluids For example, excessive contaminants must be removed from the wastewater of food service institutions (restaurants, cafeterias, hospitals, etc.) before the water may be discharged. If established discharge-contamination levels are exceeded, cities and other governmental authorities may impose surcharges on the food service institutions. These surcharges increase the costs of doing business.

Typically, food service establishments are required to have grease interceptors, commonly called "grease traps," installed in wastewater outlets with sampling wells downstream of the grease traps before the discharge enters the public sewage lines so the authorities can check the discharge from each facility. When the grease traps become full, the contaminants collected in them are removed by vacuum trucks and further treated before discharging to the public sewage.

In addition to the problem of discharging excessive contaminants to public sewage systems, animal fat rendered during the cooking process can congeal when mixed with cold water and clog up the drain lines from the kitchens to the grease traps. When this occurs, the businesses may be shutdown and typically require routing out with a rotor cutter driven by a mechanical cable to open the lines.

Some of the contaminants are destroyed in the grease traps by bacteria. When the contaminants exceed the capacity of what the bacteria can consume, they must be removed from the grease traps by vacuum trucks, or they are discharged to the public sewer, which can result in surcharges as mentioned above.

Bacteria are active only at the limited outer surface of the contaminants to be consumed as food. The bacteria produce enzymes to disperse the contaminants and increase the amount of surface, and the amount of food, available to them. A different enzyme may be required to disperse each contaminant present. When the food is available, bacteria can reproduce in large quantities in very short periods of time. Oxygen dissolved in the water drained into grease traps can become quickly depleted, and aerobic bacteria (those requiring oxygen continuously in order to survive) die. This leaves the task of consuming the contaminants to the anaerobic bacteria (those requiring the absence of oxygen in order to survive). Anaerobic bacteria are not as efficient as aerobic bacteria in consuming the contaminants, and they also produce offensive odors in the process of consuming their food. The offensive odors are prevalent around businesses with grease traps.

Feeding aerobic bacteria in the drain lines from the kitchens has been somewhat successful at either keeping the lines from clogging or increasing the intervals between the times mechanical routing is required. As soon as the aerobic bacteria reaches the grease trap with the oxygen depleted, they die.

Attempts have been made to keep the bacteria alive by bubbling air in grease traps with limited success. Bubbling air even with the finest diffusers creates a large amount of foam in the grease traps. Therefore, air injection has been largely limited to short periods of time and to smaller systems.

Air bubbles rise quickly out of the water, and the bottom of the grease traps return to an anaerobic condition almost immediately preventing the efficient aerobic bacteria from consuming the solids on the bottom of the grease trap. This limits the bubbling of air to the upper part of the grease trap. When oxygen reaches the anaerobic bacteria on the bottom of the grease trap, they die. Therefore, a periodic kill of the anaerobic bacteria on the solids settled on the bottom of the grease trap can be expected. When left for an extended period of time, the solids on the bottom of the grease trap can become packed and act as a seal to prevent oxygen from penetrating into the solids. Only floating contaminants are then consumed by the aerobic bacteria. The offensive odors are also not eliminated.

Therefore, in the food service industry, there is a need for an efficient apparatus and method that can effectively remove particles from wastewater without the problems mentioned above, e.g. incurring surcharges for unsuccessfully meeting contaminant levels, producing offensive odors, requiring the introduction of bubbling air, thus increasing costs, etc.

Another industry faced with the problem of removing contaminants from fluids is the vehicle washing industry. Water used for vehicle washing typically contains significant amounts of suspended solids, dissolved minerals, and organic materials, including oils and other hydrocarbons. Detergents and other chemicals used in the wash operation present further difficulties to the discharge problems. The wash water with the contaminants is typically drained into some type of still pool as a pit or sump. Some of the still pools function as settling basins for the suspended solids and as oil interceptors similar to the grease traps used in food processing facilities.

The water is typically reused in the washing part of the wash cycle until it becomes apparent that the quality of the vehicle wash is no longer satisfactory. Vacuum trucks are then used to remove the contaminants from the sumps and haul them away to disposal sites. Still pools are optimal breeding ground for anaerobic bacteria, which give off a strong and unpleasant odor. The offensive odors are often detected by customers, especially early in the morning when the systems have been shutdown for the night. Bubbling large quantities of air in the still pools can reduce the offensive odors.

The bubbling of air continuously can cause a foaming problem in the sumps. In addition to the offensive odors, governmental regulations may limit the amount of contaminants that can be discharged into the public sewer systems and totally prevent discharge to the environments.

Multiple attempts have been made to improve the process of separating particles from fluid. For instance, U.S. Pat. No. 5,647,977 discloses that the water from vehicle wash facilities can be completely recycled, without water discharge. However, where the cost of water is not a factor and the public sewage system can accept certain contaminants, a complete recycling system may not be cost justified. In such systems, aeration by dissolved oxygen can be used to element the foul odors without the foaming problems typically caused by continuously bubbling air in the sumps. Additional treatment to remove the suspended solids and reduce the organic materials in the sump, other than detergents, can render the water suitable for reuse in the washing part of the vehicle wash cycle, or for discharge where permitted in selected public sewage systems.

Another industry faced with the problem of separation of suspended solid particles from fluids is the water treatment industry. Typically, the solid particles are removed by settling in still pools, centrifugal separation by cyclone filters, and adding flocculating accelerators followed by clarification. Secondary filtration of the fluids often follows the bulk removal operations. The solid particles have to be concentrated and dewatered after separation for disposal. These steps may increase the time and money associated with the particle-removal operation.

An industry having the need to aerate water is the livestock industry. Concentrated animal feeding operations including cattle, swine, poultry, sheep, horses, etc. typically have ponds called "lagoons" in which all animal waste is collected. Aeration with dissolved air in water continuously circulating through the lagoons allows naturally occurring bacteria to thrive in the nutrient rich environment of lagoons and greatly accelerate decomposition of the organic waste. Similarly aquatic farms, such as for fish and shrimp, with concentrations of species may require injection of supplementary oxygen in the water to replace oxygen consumed by decaying plants.

To remove contaminants from wastewater, many present applications employ a cyclone filter. A typical cyclone filter is an apparatus that can be used to separate suspended solids from fluids (such as solids from water and air) and to separate fluids of different densities (such as oil and water) by using the centrifugal force caused by a forced spiral vortex. The external force used to generate the spiral vortex in a cyclone filter is typically provided by injecting a stream of a contaminated fluid at high velocity into the filter at one end perpendicular and at a tangent to the cylinder in which the fluid circulation occurs. The axis of circulation in a cyclone filter can be at any angle from vertical to horizontal.

When the axis of circulation is vertical, the direction of the forces of gravity are, therefore, equal around the entire circular path of the fluid. When the axis of circulation is at some angle other than vertical, the design of the cyclone filter has to account for the differences in the direction of the forces of gravity acting on the fluid as it flows while circulating with or against the forces of gravity.

The design of the inlet through which the high velocity fluid is introduced becomes a major factor in the effectiveness of present cyclone filters, especially in the separation of very fine (small) solid particles from fluids.

Present cyclone filters typically have only one inlet through which the fluid and contaminant mixture is introduced. The single inlet may be typically round or rectangular. And in present cyclone filters, the inlet must supply fluid tangentially to the filter. This may lead to difficulties in certain applications.

Several attempts have been made to improve the efficiency and effectiveness of cyclone filters. For instance, U.S. Pat. No. 5,882,530 describes using a cyclone separator in which the lower frustoconical surface contains porous surfaces. The cyclone separator of the '530 patent may be used for separating a suspension. However, it has been found that over time, particles concentrate along the inner walls of the apparatus as a result of centrifugal forces and tend to clump together and adhere to the porous walls. This clump formation or caking impedes the exit of the carrier fluid through the porous walls.

Other attempts include those disclosed in U.S. Pat. Nos. 5,021,165, 5,478,484, and 6,024,874. However, these attempts generally require the incoming fluid to be tangentially fed into cyclone filter. This limits the use of the filters when tangential feeding is not possible, for example.

Thus, a need exists for an improved apparatus and method of removing particles from fluids. It is desirable that the apparatus and method remove particles at a desired level to reduce the chance of the imposition of a surcharge. It is desirable that the method should not increase costs or increase time involved in removing the particles. An apparatus that does not have to input the fluid tangentially is desired. A need also exists for an improved method of mixing fluids or aerating fluids in a timely fashion.

Further, venturis employing Bernoulli's theorem have been used in countless apparatus to produce differential pressures for mixing of fluids with other fluids (gases with gases, gases with liquids, and liquids with liquids) or solids, measurement of flow, and removal of gases by suction (such as in a liquid or a vacuum chamber). The venturi has also been used for the movement of solids by suction. The venturi is a universal technology that has been used for generations in commercial, industrial, municipal, agricultural, military, and other industries. The configuration of the typical venturi in existing apparatus is a round area (or tube) reduced into a smaller round area (the venturi) to increase the velocity of a flowing fluid to create a low pressure that can be used for suction through a gap at the venturi, or reduced area. The suction is generally around the circumference of the reduced area. It is also generally known that the highest velocity of a liquid flowing through a pipe or tube is at the center of the stream. Therefore, the highest velocity flowing through a round venturi is away from the outer circumference, or edge, of the stream where the suction occurs.

Because of this the size of the stream can also affect the efficiency of the venturi, with the larger diameter venturi having a decrease in efficiency. A round or circle configuration has the largest cross sectional flow area to the length of its edge (or border) than any other configuration possible. Restated, this provides a low suction-gap-length-to-flow-volume ratio. The existing round venturi low suction-gap-length-to-volume ratio make them notoriously inefficient at transferring a secondary fluid from outside the venturi to a primary fluid flowing through the inside of the venturi. The inefficiency is the primary reason the venturi has not received wide application in municipal wastewater treatment, the largest potential area of application that desperately needs to increase aeration efficiency because of that size and the associated high costs of energy.

For convenience water is used as the operating or primary fluid to create suction in the venturi, and air as the secondary fluid drawn into the venturi by suctions in the discussion of the present invention. It should be understood, however, that the present invention applies to all fluids (liquids and gases) that will flow under pressure through a venturi as a primary fluid to create suction and any fluid (gas or liquid) or powdered solids that can be drawn into the primary fluid by suction. The present invention overcomes the deficiencies of existing venturi technology by employing linear venturi (as in a narrow ring to form a curved or round venturi opening as the area of flow, or as in an extended straight line to form a narrow rectangular venturi opening as the flow area) to increase the length of the stream of primary fluid in contact with the venturi gap resulting in an increase of secondary fluid drawn into the primary fluid stream. As an example, a typical existing round venturi with a one-inch diameter area has 0.785 square inches of flow area and a 3.1416-inch circumference.

The length of contact with the suction gap is equal to the 3.1416-inch circumference. A one-eighth inch width round venturi ring flow area, or opening, of the present invention with the same area of flow has an average diameter (from the center of the venturi ring opening) of two inches and a circumference length of 6.283 inches. Suction gaps could be on either one side (6.283 inches) or on both sides (12.566 inches) of the venturi ring opening or area of flow. A one-quarter inch width round venturi ring has an average diameter of one inch and a circumference of 3.14 inches, with a suction length of either 3.14, or 6.28 inches if suction were added to both sides of the venturi. A rectangular venturi having the same flow areas with a one-eighth inch opening width could also be 6.283 inches long with suction on either one side (6.283 inches) or on both sides (12.566 inches) of the venturi opening.

The width of the venturi flow area, or opening, may be determined by the size of solid particles in the fluid flowing through the venturi, the viscosity of the fluid, and the allowable pressure-drop of the specific application. The length of the venturi flow area may be determined by the amount of secondary fluid that needed to be drawn into and mixed with the primary fluid in each application. As an example of using a filtered water as the primary fluid and air as the secondary fluid to be drawn into and mixed with the water by suction, a $\frac{1}{16}$-inch wide venturi with the same flow area (0.785 in$^2$) has a length of 12.56 inches, and a suction length of 25.12 inches with suction in contact with both sides of the venturi opening. The example is not intended to limit the venturi width, length, area of flow, and amount of flow (flowrate) of the present invention. Any size venturi can be selected for any amount of primary fluid and secondary fluid flowrates needed in specific applications. The present invention allows the operation of the venturi at a lower pressure than existing venturi to transfer the same amount of secondary fluid (air or other fluid) into the primary fluid (water or other fluid) resulting in a reduction of energy consumed to operate the unit.

As much as 60 to 80-percent of the costs of operating a municipal wastewater treatment plant is typically for energy used in the aeration of the treatment basins. A reduction in the cost of aeration of municipal wastewater treatment would have a significant impact on energy consumption in the United States and Worldwide. Other similar applications include lagoons, ponds, rivers, tanks, and other bodies of water treated for biodegradation of organic material and addition of oxygen for aquatic species or odor control. Generally, the use of venturi in water treatment is by pumping the water to increase its pressure and force it through the venturi to draw in air for oxygen to be supplied to microorganisms or other species that require dissolved oxygen to live in water or for odor control. The efficiency of the pumping process is another area where the present invention overcomes deficiencies of existing venturi designs. In addition to the specific design characteristics of a pump itself, the efficiency of a pump is greatly affected by its flowrate and differential pressure across the pump. In operation a venturi of any specific design is also affected by flowrate and differential pressure. According to Henry's Law, the ability to dissolve oxygen (from air or other source) is affected by total pressure at the point where the air comes in contact with the water. The total pressure supplied by a pump can be greatly increased by submerging the pump in water to make use of the head pressure of the water on the inlet side of the pump. The total pressure becomes the head pressure plus the differential pressure created by the pump.

The efficiency of a combined pump and venturi can be greatly improved by submerging the pump intake. However, it has been noted that the increase in head pressure of the water when the system is submerged creates a backpressure on the expanding discharge of the venturi and decreases the amount of air that can be drawn into the venturi. The greater the depth of operation, the larger the decreases in air suction. The present invention also overcomes this existing deficiency by adding a mixing chamber where the expanding outlet from the venturi can be made to rotate and reduce the backpressure commonly encountered when discharging directly into high-pressure water, such as in submerged operations.

In addition, the enclosed rotating discharge chamber mixes and holds the mixture (e.g. water-air) at the venturi outlet pressure to prevent the air from escaping and adding dissolved oxygen to the outlet stream (per Henry's Law) before it is discharged into the wastewater treating basin, such as in municipal wastewater treatment plants or treating ponds. The mixing chamber for rotating the output of venturi to reduce backpressure applies to one or any number of venturi that can be positioned around the circumference of the mixing chamber with a mixing chamber diameter and length selected for the flowrate of the specific application.

The cleaning of gases (also referred to as "purification of gases") is a major function in the Oil and Gas Industry and in municipal wastewater collection and treatment systems as well as in many other industries. The gas purification function becomes even more difficult when the gases are hot, such as exhaust gases from internal combustion engines or other combustion functions, and need to be cooled and cleaned before being discharged in the atmosphere, in an environmentally sensitive area, or in an enclosed area. The ability to draw in hot gases in large quantities with venturi operating at low differential pressures could make certain exhaust gas cleaning functions practical.

In wastewater collection systems throughout municipalities the contaminated wastewater may be pumped to elevate the flowing wastewater to a certain level and then allow it to continue flowing downward toward the treatment plant in piping by gravity. In other instances the wastewater may be pumped and forced to flow under pressure (sometimes called a "forced main") to its destination. In both the gravity flowing and forced main the microorganism action in digesting the organic contaminants may cause the oxygen to become depleted. The action is sometimes referred to as "causing the line or wastewater in the line to become septic." When oxygen is depleted in collection lines the aerobic bacteria die and anaerobic bacteria become active. The action of the anaerobic bacteria generates methane and hydrogen sulfide gases that produce odors when released to the atmosphere. Treated water from municipal wastewater treatment plants and from large industrial plants are typically discharged to public streams, with some being piped under pressure some distance to a river or other stream before being discharged. Discharging a large amount of water into a river without sufficient dissolved oxygen to support life of fish, or other aquatic species, will cause the fish to die. The linear venturi of the present invention overcomes many deficiencies of existing venturi by reducing the differential pressures needed to operate and increasing efficiency of the venturi. The requirement for a pump can also be eliminated in many of this type of application by installing a venturi inside the pipe and causing a small differential pressure across the venturi to draw in atmospheric air from outside the pipe for aeration of the water flowing through the pipe. Typically, there are multiple pumps in lift stations of a municipal wastewater collection system. The pumps are turned on in sequence as the amount of wastewater to be transferred dictates. The linear venturi of the present invention can be used to aerate all wastewater in all collection lines. An inline venturi of the present invention requiring only a low differential pressure to operate can be installed at the outlet of each lift station pump. The additional energy consumed by a lift station pump for the increase in output pressure required (perhaps below 2-5 psi in most applications) to draw air into the line may typically be insignificant compared to installing additional pumps specifically for the venturi and operating them at pressures high enough to inject the output air-water mixture of the venturi downstream of the lift station pumps. As a pump is turned on air may be drawn into the line from within the well of the lift station. All water may be aerated as it continues to flow toward the treatment facility. Any hydrogen sulfide gas accumulated in the well may be drawn into the water, partially dissolved, and pumped downstream. In long lines the oxygen is likely to become depleted again in route to the treatment plant because of the activity of the bacteria. Additional linear venturi units can be positioned in the line at distances close enough to prevent oxygen depletion. With aeration in the lines the wastewater may be partially treated when it arrives at the treatment plant, reducing the treatment load on the plant in an economical way. In some systems the treatment load reduction could be significant. The amount of chemicals used for treating the wastewater to prevent hydrogen sulfide from coming out of solution in collection lines could be reduced, and in many cases possibly eliminated.

Water in a slow moving polluted river could be aerated at a relatively low cost with a linear venturi of the present invention by submerging a pump and venturi in the river water and operating them at a low differential pressure and using the head pressure of the river to contribute to the amount of oxygen that could be dissolved in the water within the venturi assembly before being released into the river. This could contribute to the food supply, to the health of the population, and to the economy by creating a fishing industry in many countries that cannot eat fish from their existing polluted rivers.

Vacuum is used for holding materials in machine tools, evacuating packages, holding containers in lifting operations, moving solids and liquids, evacuating dissolved gases in liquids, and countless other operations. While in most functions the vacuum is produced by vacuum pumps (the suction side of compressors) and blowers, the vacuum in many operations is produced by venturi. In this application the venturi apparatus may be referred to as a "vacuum generator." The present invention overcomes deficiencies of existing venturi in this application by reducing the amount of primary fluid, such as air, and time needed to produce the vacuum. The result is an increase in efficiency.

Further, when pumping liquids having dissolved gases, cavitation can occur in the pump's impeller as the liquid is drawn into the pump. The low pressure produced by the suction of the pump causes the gases to come out of solution. The cavitation occupies space in the pump's impeller and typically reduces the amount of liquid that can be transferred. In many cases, the pump will not transfer any liquid and has to be shut down. An example of this problem that can have economic consequences includes the pumping of wastewater from a treating basin being aerated. Placing an eductor of the present invention at the outlet of the pump to draw the gases away from the impeller as the gasses come out of solution can increase the capacity of the pump and overcome deficiencies of existing pumps in such an application.

In the following discussions of the present invention the assembly of the venturi apparatus including a housing is referred to as an "eductor" with the "venturi" as the internal component with the reduced flow area by which the fluid velocity is increased and suction occurs. It will become clear to those skilled in the art having the benefit of this disclosure that the methods and apparatus in accordance with he present invention overcome, or at least minimize, the deficiencies of existing mixing apparatus and methods.

SUMMARY OF THE INVENTION

The present invention provides a new method and apparatus for drawing large quantities of a secondary fluid into a primary fluid by suction. An apparatus in accordance with the present invention may employ an eductor with a linear venturi having a cross sectional area of flow (or opening) for a primary fluid in the form of a narrow ring or in the form of a narrow rectangle with suction on either one side or both sides of the venturi opening. An eductor in accordance with the present invention expands the length of venturi suction, increases the amount of secondary fluid drawn into the primary fluid by suction, and increases efficiency An embodiment of an eductor of the present invention may comprise a cylindrical housing, a venturi having a flow area (or opening) in the form of a narrow ring for a primary fluid (as water), a reducing venturi inlet contracting on both the outside and inside diameters directed toward the venturi opening, suction gaps in contact with both the outside and inside diameters of the venturi opening, a supply channel for a secondary fluid (as air) drawn into and mixed with the primary fluid, and a venturi outlet expanding on both the outside and inside diameters of the venturi opening directed away from the venturi.

A second embodiment of an eductor of the present invention may comprise a cylindrical housing, a venturi having a flow area (or opening) in the form of a narrow ring for a primary fluid (as water), a reducing venturi inlet contracting on the outside diameter and straight on the inside diameter directed toward the venturi opening, a suction gap in contact with the outside diameter of the venturi opening, a supply channel for a secondary fluid (as air) drawn into and mixed with the primary fluid, a venturi outlet expanding on the outside diameter of the venturi directed away from the venturi opening.

A third embodiment of an eductor of the present invention may comprise a cylindrical housing, a multiple of three concentric narrow ring venturi flow areas (or openings) for a primary fluid (as water), three reducing inlets to the three venturi contracting on the outside diameters directed toward the venturi openings, a suction gap in contact with the outside diameter of each of the three venturi openings, a supply channel to each of three venturi for a secondary fluid (as air) drawn into and mixed with the primary fluid, a venturi outlet for each of the three venturi expanding on the outside diameter directed away from the venturi openings.

A fourth embodiment of an eductor of the present invention may comprise a housing, a linear venturi with a narrow rectangular venturi flow area (or opening) for a primary fluid (as water), a reducing inlet contracting on both sides directed toward the venturi opening, a suction gap in contact with each side of the venturi opening, a supply channel to the suction gaps for a secondary fluid (as air) drawn into and mixed with the primary fluid, a venturi outlet expanding on each side of the venturi opening directed away from the venturi opening.

A fifth embodiment of an eductor of the present invention may comprise a housing, a multiple of eight linear venturi each with a narrow rectangular venturi flow area (or opening) for a primary fluid (as water) with the inlets positioned around a primary fluid inlet and distribution channel to flow radially outward, a reducing inlet to each venturi contracting on both sides directed toward the venturi openings, a suction gap in contact with each side of the eight venturi openings, a supply channel to the suction gaps for a secondary fluid (as air) to be drawn into and mixed with the primary fluid, a venturi outlet on each of the eight venturi expanding on each side of the venturi openings directed away from each of the eight venturi opening.

A sixth embodiment of an eductor of the present invention may comprise a housing, a multiple of two linear venturi each with a narrow rectangular venturi flow area (or opening) for a primary fluid (as water) with venturi outlets positioned around a mixing chamber to cause circulation of the outlet flow of fluids, a primary fluid inlet and distribution channel at the inlet of each venturi, a reducing inlet to each venturi contracting on both sides directed toward the venturi openings, a suction gap in contact with each side of the two venturi openings, a supply channel to the suction gaps for a secondary fluid (as air) to be drawn into and mixed with the primary fluid, a venturi outlet on each of the two venturi expanding on each side of the venturi openings directed away from each of the two venturi openings and discharging to circulate in the mixing chamber, a flow stabilizer to straighten the fluid flow as the mixture of fluids flow out of the eductor.

A seventh embodiment of an eductor of the present invention adapted for insertion in a pipe may comprise a narrow ring venturi flow area (or opening) in an annulus around the outer diameter of the eductor for a primary fluid diverted from the fluid (as water) flowing in the pipe, a baffle for producing a differential pressure across the eductor and forcing the primary fluid to flow through the venturi, a filter upstream of the venturi inlet, a reducing venturi inlet contracting on both the outside and inside diameters directed toward the venturi opening, gaps in contact with both sides of the venturi opening, a supply channel for a secondary fluid (as air) drawn into and mixed with the primary fluid, and a venturi outlet expanding on both the outside and inside diameters of the venturi directed away from the venturi opening.

An eighth embodiment of an eductor of the present invention adapted for installation in piping may comprise a linear venturi with an enlarged venturi opening for fluid (as water) containing large solid particles having a reducing venturi inlet contracting on both the outside and inside diameters directed toward the venturi opening, gaps in contact with both sides of the venturi opening, a supply channel for secondary fluid (as air) drawn into and mixed with the primary fluid, and a venturi outlet expanding on both the outside and inside diameters directed away form the venturi opening. A modified version of the eighth embodiment of the present invention for installation in smaller piping has a gag only on one side of the venturi opening.

BRIEF DESCRIPTION OF THE DRAWINGS

FIG. 4 illustrates the horizontal flow of the fluid as it enters the cyclone filter. FIG. 5 is a fluid flow diagram illustrating the vertical flow of the fluid through the components of the cyclone filter.

FIG. 6 illustrates the horizontal flow of the fluid as it enters the cyclone filter. FIG. 7 is a fluid flow diagram illustrating the vertical flow of the fluid through the components of the cyclone filter.

FIG. 8 illustrates the horizontal flow of the fluid as it enters the cyclone filter. FIG. 9 is a fluid flow diagram illustrating the vertical flow of the fluid through the components of the cyclone filter.

FIG. 10 illustrates the horizontal flow of the fluid as it enters the cyclone filter. FIG. 11 is a fluid flow diagram illustrating the vertical flow of the fluid through the components of the cyclone filter.

FIG. 13 illustrates the horizontal flow of the fluid as it enters the fluid mixer. FIG. 14 is a fluid flow diagram illustrating the vertical flow of the fluids through the components of the fluid mixer.

FIG. 15 illustrates the horizontal flow of the liquid as it enters the fluid mixer and flows through the radial-grooved ring. FIG. 16 illustrates the horizontal flow of the liquid as it enters the fluid mixer and flows through the radial-grooved ring with an orifice ring positioned with the orifice ports over each groove in order to inject a gas into each stream. FIG. 17 is a fluid flow diagram illustrating the vertical flow of the fluids through the components of the fluid mixer.

FIG. 46 depicts a top view of a seventh eductor embodiment installed in a piping system identifying a primary fluid inlet and outlet and a secondary inlet and outlet (e.g. for a secondary fluid or solid) in accordance with the invention FIG. 47 depicts an elevation view of the primary fluid inlet of the seventh eductor embodiment inserted in a pipe and identifying the installed position of the baffle and showing the position where a vertical cross sectional view was taken and illustrated in a following drawing in accordance with the present invention.

FIG. 50 is a vertical cross sectional schematic of the eighth eductor embodiment adapted with a larger linear venturi opening for large solid particles with suction gaps on both sides of the venturi opening identifying internal components and direction of fluid flow in accordance with the present invention.

DESCRIPTION OF ILLUSTRATIVE EMBODIMENTS

The dynamics of fluid flow generally can be mathematically expressed by conservation of energy, momentum, and impulse. When fluid flows in a curved path, pressure is increased (1) with the radial distance from the center of rotation outward, (2) with the angular velocity of the fluid, and (2) with the unit mass of the fluid. A fluid may rotate in a closed vessel by applying an external force resulting in a forced vortex. If the entire body of fluid rotates together with all particles rotating in a concentric circle, a cylindrical vortex is formed. If radial flow is combined with the circular flow, a forced spiral vortex results. The forced spiral vortex can be used for separation of fluids by density, separation of suspended solids from fluids also by density, and the mixing of various fluids.

Illustrative embodiments of the invention are described below as they might be employed in the use of methods and apparatus for separating fluids, mixing fluids, and separating solids from fluids. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments of the invention will become apparent from consideration of the following description and drawings.

Figure 1:
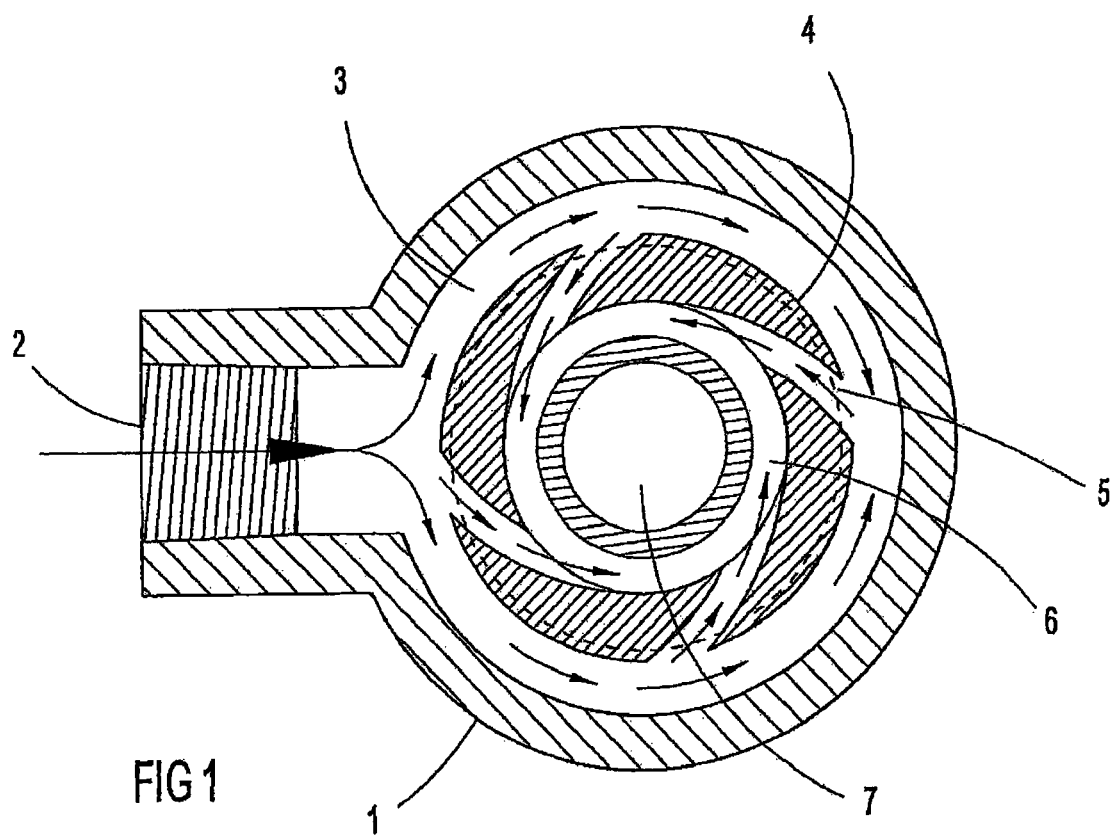
FIG. 1 depicts a schematic representation of a cyclone filter illustrating the fluid flow pattern through a spiral-grooved ring in accordance with the present invention.

Referring now to the drawings in more detail, and particular to FIG. 1, therein is depicted in schematic representation of the inlet of a cyclone filter 1 in accordance with the present invention for separating suspended solids from an aqueous fluid, such as water, by centrifugal force. The cyclone filter 1 consists of an inlet 2, a distribution channel 3, a spiral-grooved ring 4 with multiple grooves 5, a down-flow annulus 6, and an up-flow outlet 7. The arrows indicate the direction of flow.

Fluid, such as water, containing suspended solids flows into the filter system 1 through inlet 2 and flows into a distribution channel 3 around spiral grooved ring 4 then into four spiral grooves 5 where the velocity is increased and injected into the down-flow annulus 6 at a tangent to the circle formed by the outside diameter of the down-flow annulus 6 to flow downward in a spiral motion. The four spiral grooves 5 are illustrated each with the same width as the down-flow annulus 6. The number and depth of the spiral grooves 5 are selected to provide the optimum fluid velocity at the application flow-rate. The centrifugal force causes the heaviest materials in the circulating fluid to flow to the outside edges of the annulus 6 as the water spirals downward. It is well understood by those skilled in the art that the higher the velocity of the water in circulation the smaller the particles that can be removed at any given flowrate.

Figure 2:
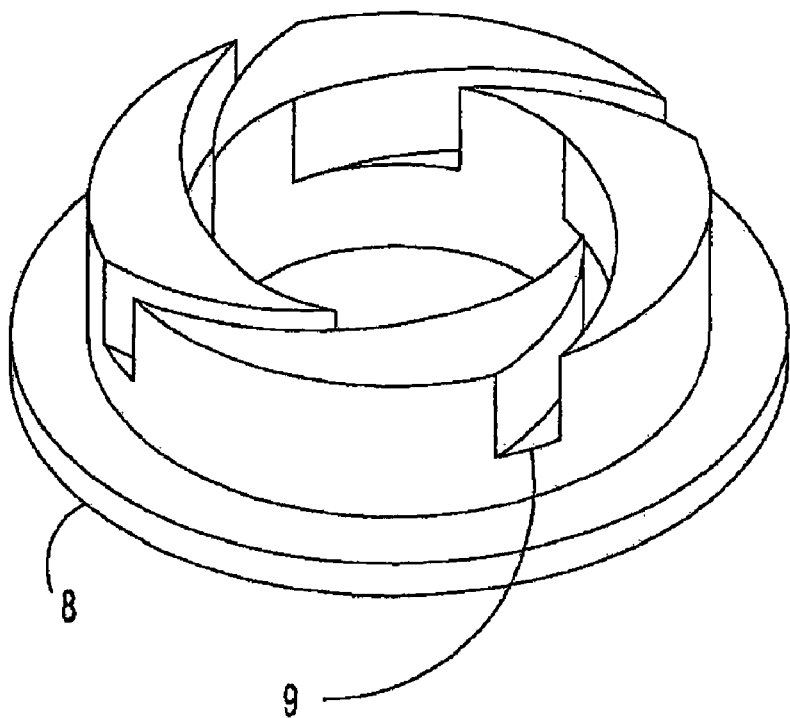
FIG. 2 depicts a three dimensional view of a spiral-grooved ring in accordance with the present invention identifying the depth of the grooves.

In FIG. 2 is depicted a three-dimensional spiral grooved ring 8 having four spiral grooves 9 with a certain depth. The depth and width of the four grooves 9 are selected to provide the optimum water flow velocity to be injected into the down-flow annulus.

Figure 3:
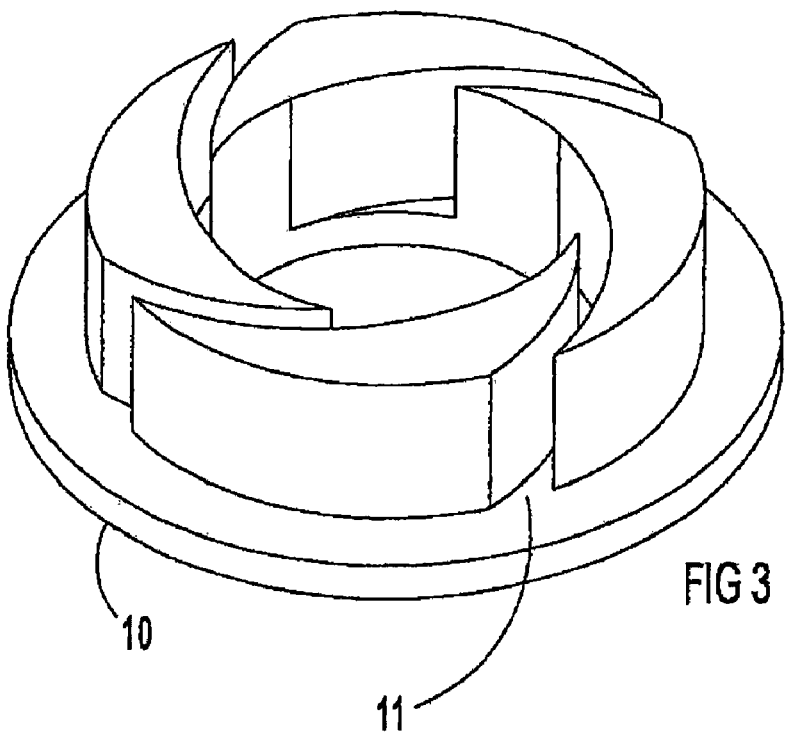
FIG. 3 depicts a second three dimensional view of a spiral-grooved ring in accordance with the present invention illustrating deeper grooves.

FIG. 3 illustrates a second spiral-grooved ring 10 having four grooves 11 that are deeper than those illustrated in FIG. 2. Any desired fluid velocity could be obtained by simply changing the replaceable spiral grooved ring.

Figure 4:
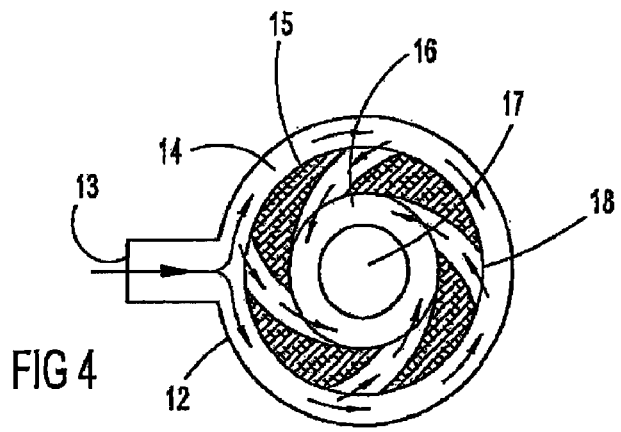
FIGS. 4 and 5 are fluid diagrams of another embodiment of a cyclone filter employing a spiral-grooved ring to divide the entering fluid and inject the fluid in high velocity multiple streams into an annulus in accordance with the present invention.
Figure 5:
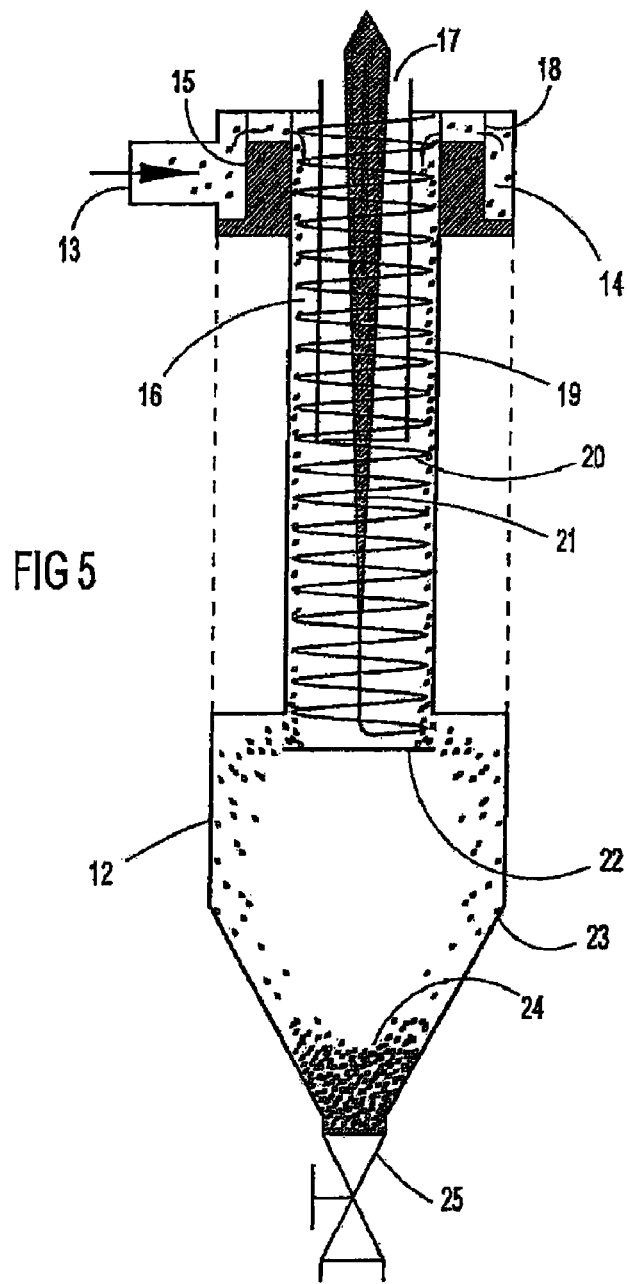

FIGS. 4 and 5 illustrate simplified horizontal and vertical schematics of a cyclone filter in accordance with the present invention. The cyclone filter 12 consists of an inlet 13, a distribution channel 14, a spiral-grooved ring 15 with multiple spiral grooves 18, a down-flow annulus 16, a collection chamber 23 for the separated solids 24, a deflector 22, a vortex finder 19, and an outlet 17.

FIG. 4 illustrates the horizontal flow of water as it enters the cyclone filter 12. The arrows indicate the direction of water flow. Referring to FIG. 4 water containing the suspended particles to be removed enters the filter through the inlet 13 and flows into the distribution channel 14 and flows in both directions around the spiral-grooved ring 15. The water from the distribution channel 14 is then divided and flows into the four grooves 18 where its velocity is increased then injected into the down-flow annulus 16 and flows downward in a spiral motion. The suspended solids are separated from the water in the lower part of the filter, and the water flows upward and out of the filter through the outlet 17.

FIG. 5 illustrates the flow pattern of the water in a vertical schematic of the cyclone filter 12. Again, water containing the suspended solids to be removed enters the filter through inlet 13 and flows into the distribution channel 14 around the spiral-grooved disc 15. The circulating water flows through the spiral grooves 18 and is injected at a high velocity into the down-flow annulus 16 and flows downward in a spiral motion 20. The centrifugal force caused by the circulating water drives the suspended particles the outer diameter of the down-flow annulus 16 and causes a vortex 21 to form in the center. A deflector 22 is located in the lower part of the filter where the diameter is increased. The increase in diameter allows the solid particles to flow outward away from the down-flow annulus while the deflector 22 causes the water to reverse and flow upward in the lower pressure center of the stream and out through the outlet 17. The solid particles 24 accumulate in a collection chamber 23 in the lower part of the filter 12 below the deflector 22 and are periodically removed through the bottom outlet valve 25.

Figure 6:
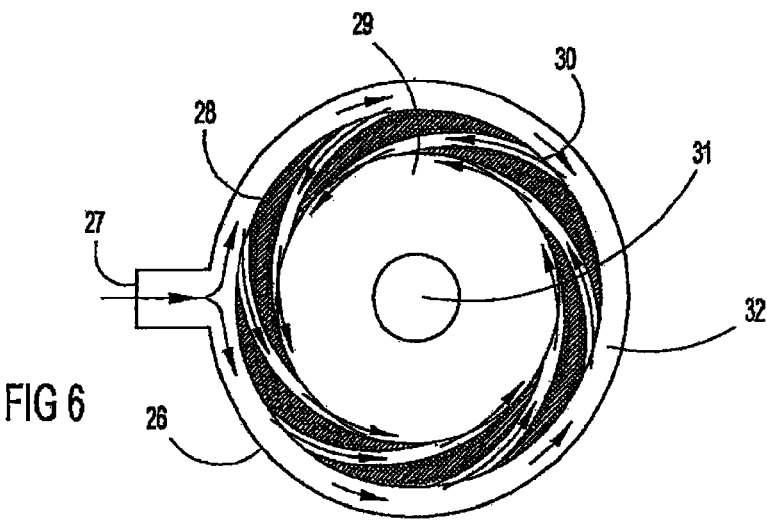
FIGS. 6 and 7 are fluid diagrams of another embodiment of a cyclone filter employing a spiral-grooved ring mounted outside the housing to divide the entering fluid and inject the fluid in high velocity multiple streams into and at a tangent to a cylinder above the cone shaped housing in accordance with the present invention.
Figure 7:
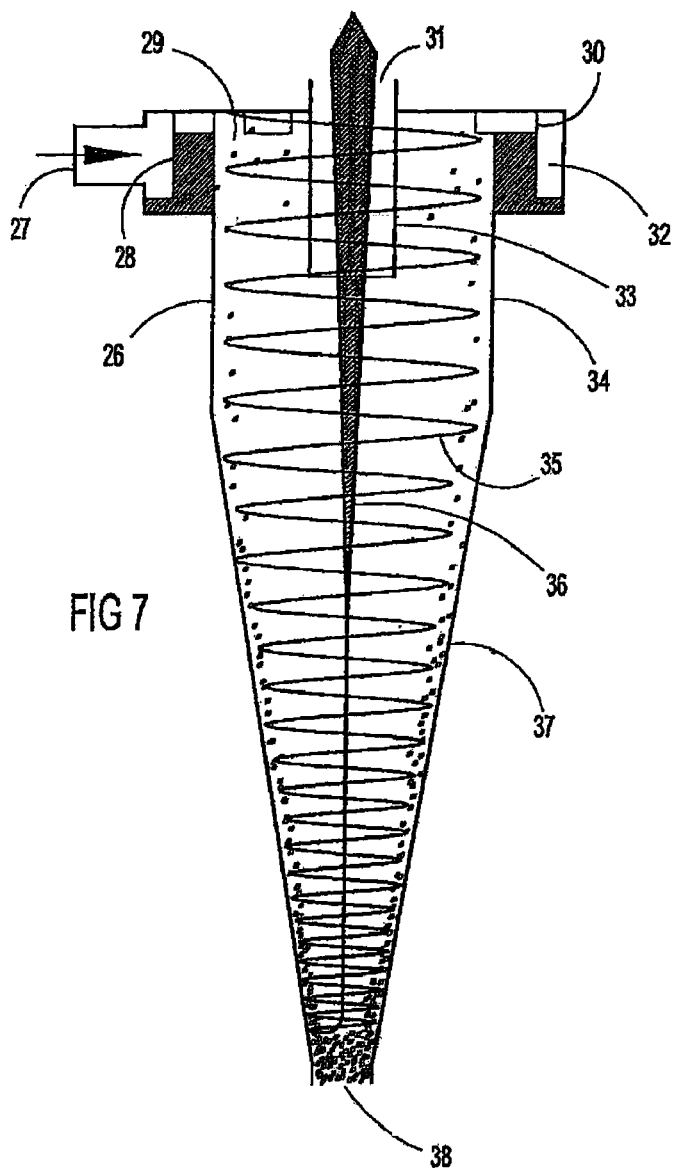

FIGS. 6 and 7 illustrate simplified horizontal and vertical schematics of another embodiment of a cyclone filter 26 in accordance with the present invention. The cyclone filter 26 consists of an inlet 27, a distribution channel 32, a spiral-grooved ring 28 with multiple spiral grooves 30, a cylinder 34 in which the fluid is made to circulate, a lower cone 37, and a cone outlet 38, sometimes referred to as an "orifice," for discharging the solid particles separated from the fluid. The spiral-grooved ring is positioned in the outside of the cylinder 34.

FIG. 6 illustrates the horizontal flow of fluid as it enters the cyclone filter 26. The arrows indicate the direction of fluid flow. Fluid enters the filter 26 through inlet 27 and flows into the distribution channel 32 then flows in both directions around the outside of spiral-grooved ring 28. The fluid from the distribution channel 32 is divided and flows into six spiral grooves 30 where its velocity is increased then injected as narrow streams into the outer diameter 29 and tangent to the circumference of cylinder 34. Six grooves 30 are shown, as the example in this illustration, but it is clearly understood that any number of grooves can be added based on the size of the cyclone filter without departing from the spirit of invention.

It is understood by those skilled in the art that water injected at multiple points in a narrow stream around and tangent to the circumference of the filter will cause less disturbance than a single, wide stream injected at a single point. Multiple streams allow a higher injection velocity. A conventional filter with a 2-inch, schedule-40 pipe inlet would have a cross-sectional area of approximately 3.36 square inches (3.36 in$^2$). A 2-inch, schedule-80 pipe inlet would have a cross-sectional area of 2.95 in$^2$. Water flowing at 100 gallons-per-minute (gpm) through the schedule 40 inlet would have a velocity of 9.56 feet-per-second (ft/sec), and through the schedule 80 inlet a velocity of 10.86 ft/sec.

With the present invention with an equivalent rectangular inlet area having dimensions of 1.295-inches in width and 2.59-inches in height causes less mixing of inlet and outlet fluids. Further, a spiral-grooved ring with six grooves of 0.5-inches in width and 1-inch in height provides a flow velocity of 10.694 ft/sec injected into the cylinder.

A spiral-grooved ring with eight grooves of 0.5-inches in width and 0.75-inches in height provides a flow velocity of 10.694 ft/sec also. A spiral-grooved ring with six grooves of 0.5-inches in width and 0.75-inches in height provides a flow velocity of 14.26 ft/sec, an even better improvement. A spiral-grooved ring with four grooves of 0.375-inches in width and 1.50-inches in height would also provide a flow velocity of 14.26 ft/sec.

The spiral-groove rings with multiple narrow streams as indicated above allows a larger outlet 31 without mixing the inlet and outlet fluids and with less pressure drop than conventional cyclone filters operating at the same flowrate.

Figure 8:
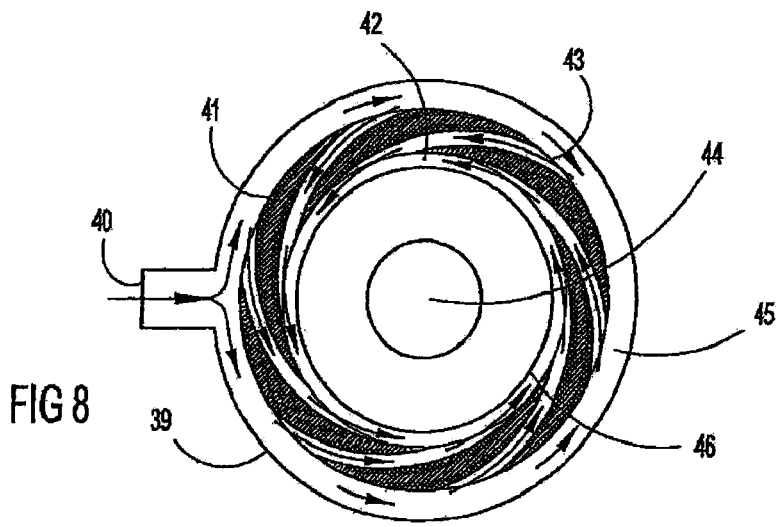
FIGS. 8 and 9 are fluid diagrams of another embodiment of a cyclone filter employing a spiral-grooved ring mounted outside the housing to divide the entering fluid and inject the fluid in high velocity multiple streams into an annulus in the outer diameter of a cylinder above the cone shaped housing in accordance with the present invention.
Figure 9:
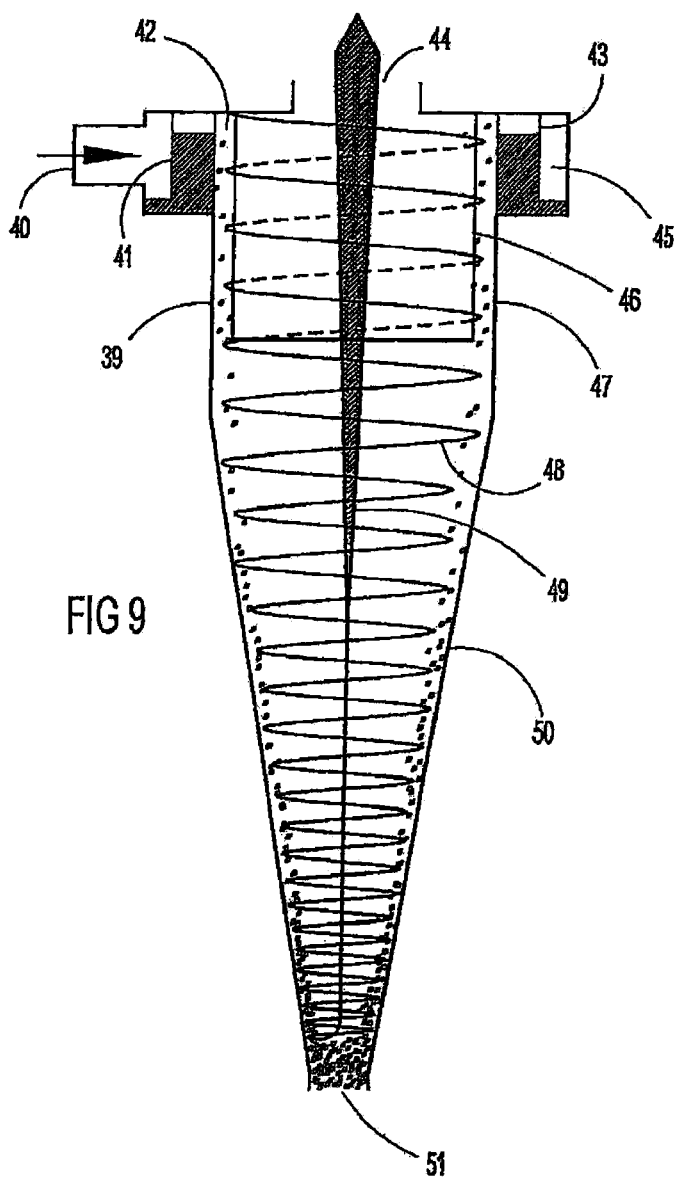

FIGS. 8 and 9 illustrate a simplified schematic of another embodiment of a cyclone filter 39 in accordance with the present invention. The cyclone filter 39 consists of an inlet 40, a distribution channel 45, a spiral-grooved ring 41 with multiple spiral grooves 43, a cylinder 47 serving as the outer diameter of a down-flow annulus 42, an inner short cylinder or skirt 46 serving as the inside diameter of the down-flow annulus 42, a lower cone 50, and a cone outlet 51 for discharging solid particles separated from the fluid, and a fluid outlet 44.

FIG. 8 illustrates the horizontal flow of the fluid as it enters the cyclone filter 39. The arrows indicate the direction of fluid flow. Fluid enters the cyclone filter 39 through the inlet 40 and flows into the distribution channel 45 in both directions around the outside of the spiral-grooved ring 41. The fluid from the distribution channel 45 is divided and flows into six spiral grooves 43 where its velocity is increased then injected into a narrow down-flow annulus 42. The down-flow annulus 42 allows the fluid to be injected at a velocity much higher than filters with no annulus 42 without interfering with the outgoing fluid. The fluid flows downward in a spiral motion 48. The circulating fluid causes a vortex 49 to form at the low-pressure center. As the fluid flows down the lower cone 50 it is forced to the center and upward through the outlet 44. With the inner skirt 46 dividing the incoming and outgoing fluids, the outlet 44 can be much larger without the need of a vortex finder. Solid particles separated from the fluids are discharged through the outlet 51 into a collection chamber (not shown) or other receptacle.

Figure 10:
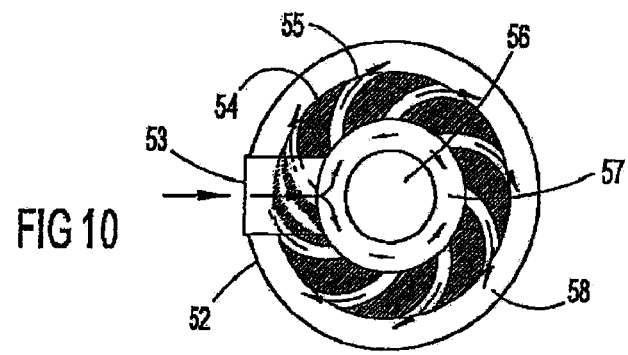
FIGS. 10 and 11 are fluid diagrams of another embodiment of a cyclone filter employing a spiral-grooved ring mounted inside the housing to divide the entering fluid and inject the fluid in high velocity multiple streams into an annulus in the outer diameter of a cylinder above the cone shaped housing in accordance with the present invention.
Figure 11:
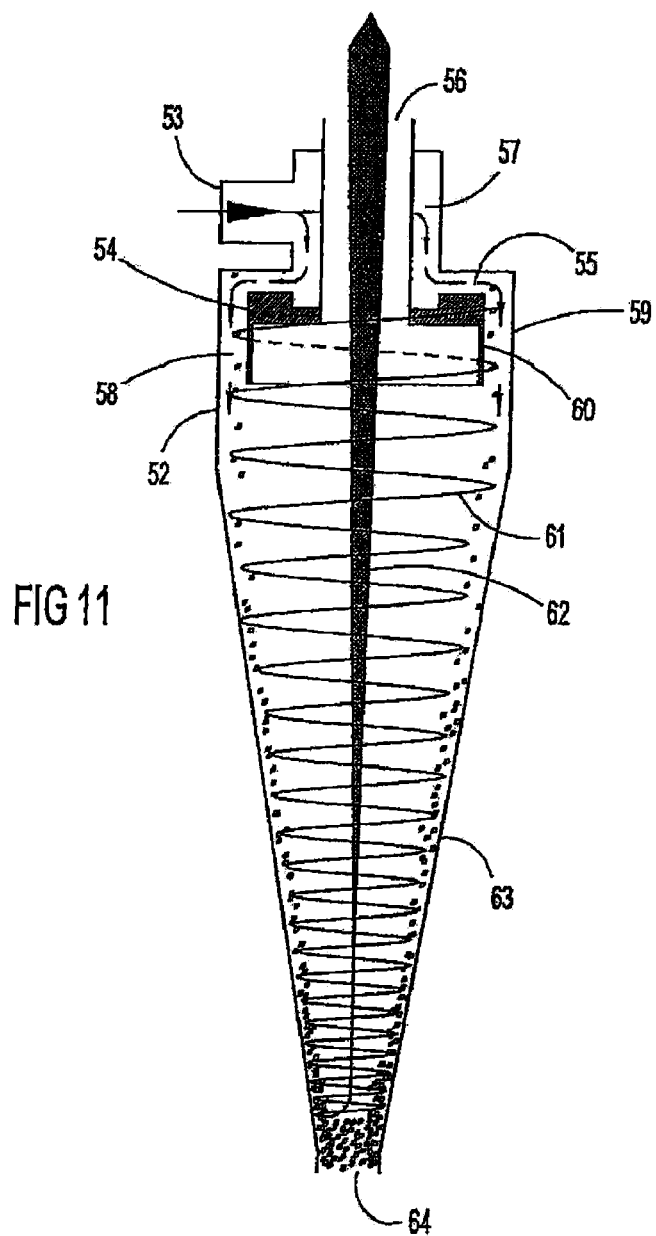

FIGS. 10 and 11 provide simplified schematics of another embodiment of a cyclone filter 52 in accordance with the present invention. The cyclone filter 52 consists of an inlet 53, a distribution channel 57, a spiral-grooved ring 54, a down flow annulus 58 between the outside and inner cylinders 59 and 60 respectively, a lower cone 63, and a cone outlet 64, and a fluid outlet 56. A collection chamber (not shown) can be added to the filter.

Fluid containing the suspended solids to be removed enters the filter through the inlet 53 and flows into the distribution channel 57 inside the spiral-grooved ring 54. The fluid flows through the multiple spiral grooves 55 and injected at a high circulating velocity into the down-flow annulus 58. The inner short cylinder or skirt 60 divides the inflow from the outflow to prevent the incoming fluid from mixing with the outflow and also prevent any solid particle from escaping before separation in the lower part of the filter. The multiple injection points provided by the spiral grooves 55 with the narrow accelerating annulus 58 divided from the outflow provides a higher tangential or horizontal circulating fluid velocity adjacent to the outer cylinder 59.

When the fluid emerges from the lower part of the down-flow annulus 58 it is at its maximum velocity in a very narrow integrated stream creating a maximum centrifugal force at the outer diameter of the filter with less disturbance than a wide single inlet entering and mixing with the large amount of water in the upper part of filters with large diameters ranging from 6 to 30 inches, or even larger. The higher tangential velocity without disturbing the outflow removes finer (smaller) particles that would normally require a second smaller filter to separate them. The fluid flows downward in a spiral motion 61. The circulating fluid causes a vortex 62 to form at the low-pressure center. As the fluid flows down the lower cone 63 it is forced to the center and upward through the outlet 56. With the inner skirt 60 dividing the incoming and outgoing fluids, the outlet 56 can be much larger without the need of a vortex finder. Solid particles separated from the fluids are discharged through the outlet 64 into a collection chamber (not shown) or other receptacle.

Figure 12:
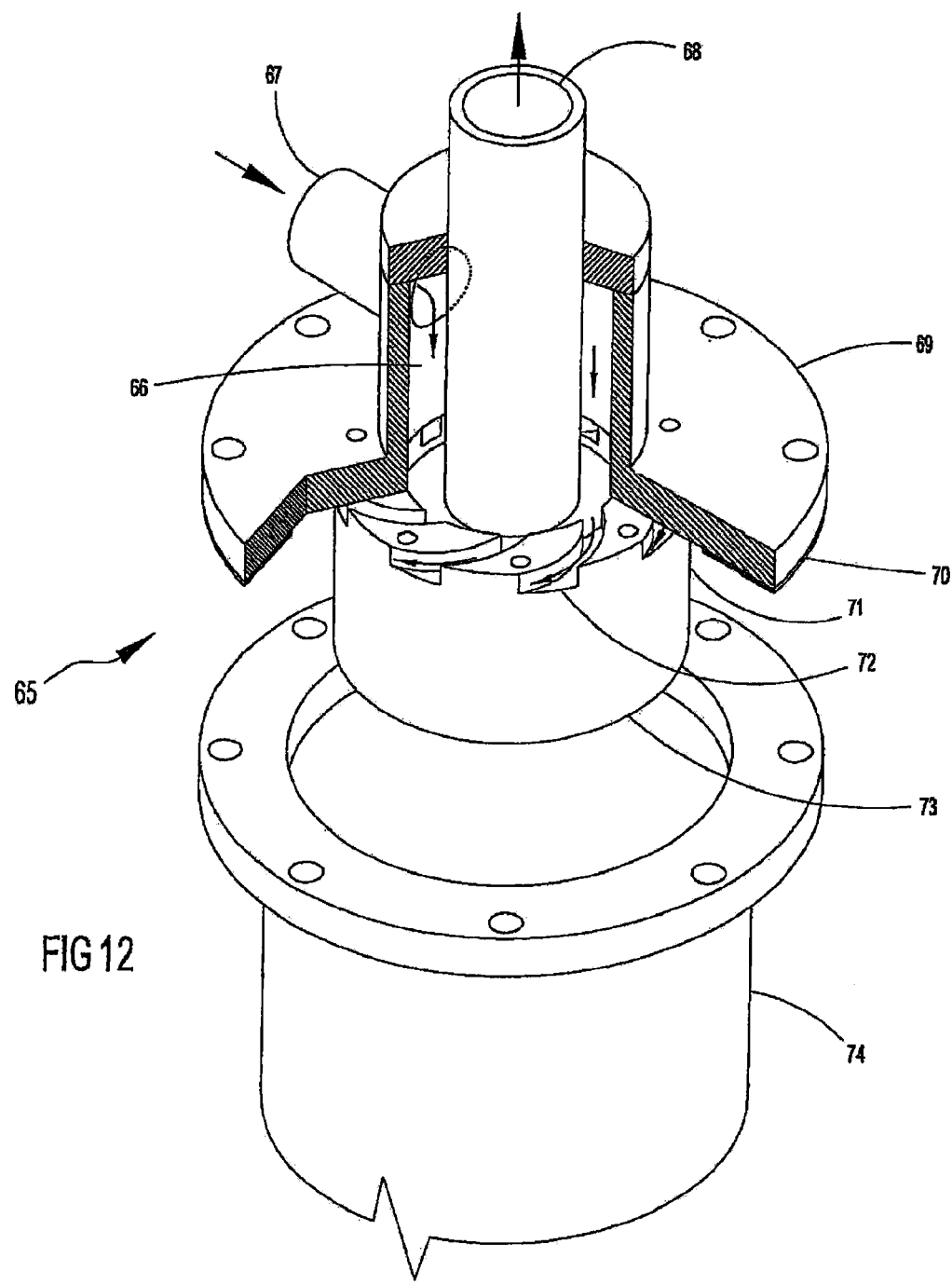
FIG. 12 is a three dimensional illustration of a typical spiral-grooved ring mounted inside the upper part of the cyclone filter housing in accordance with the present invention.

FIG. 12 provides a three-dimensional illustration of an enlarged upper part of an embodiment of the cyclone filter 65 in accordance with the present invention. The cyclone filter 65 illustrated generally consists of an upper flange assembly 69, a gasket 70, a spiral-grooved ring assembly 71, and the top part of a lower housing 74. The spiral-grooved ring assembly 71 has a skirt 73 and an outlet 68 as part of the ring assembly 71. The arrows indicate the direction of fluid flow. The fluid flows into the inlet 67, down the distribution channel 66, into the multiple spiral grooves 72, and then injected at high velocity into the lower housing 74.

Figure 13:
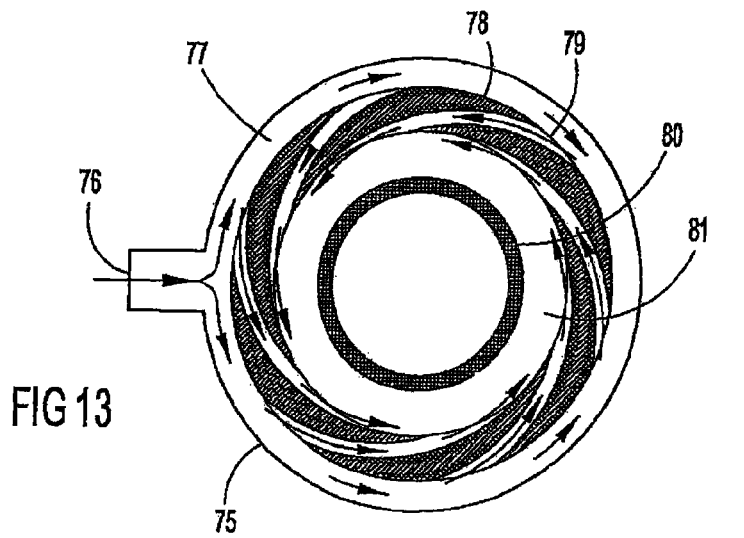
FIGS. 13 and 14 are fluid diagrams of another embodiment of a fluid mixer used as a dissolved gas generator employing the spiral-grooved ring mounted outside the housing and a diffuser mounted inside the housing for saturating liquids with dissolved gases in accordance with the present invention.
Figure 14:
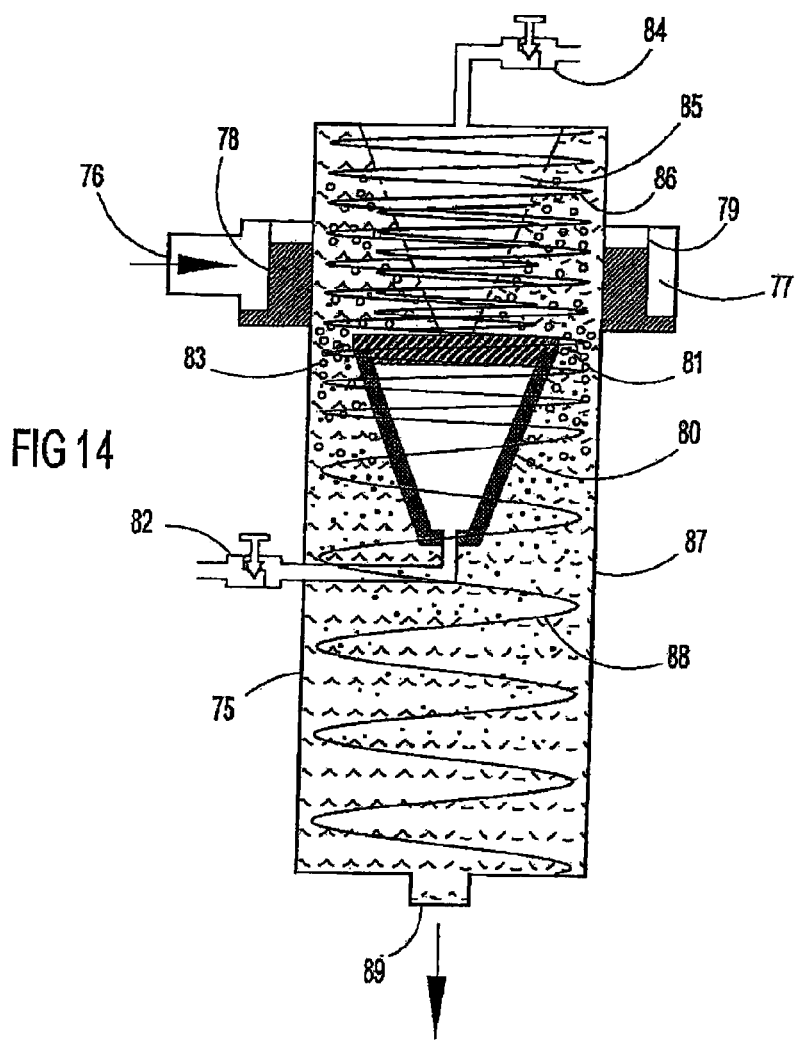

FIGS. 13 and 14 provides a fluid schematic of an embodiment of a fluid mixer 75 used as a dissolved gas generator employing the dynamic forces of flow obtained with the spiral-grooved ring in accordance with the present invention. The fluid mixer 75 consists of a fluid inlet 76 on a donut housing, a distribution channel 77, a spiral-grooved ring 78, a cylinder 87, a fluid outlet 89, a gas diffuser 80, an inlet gas-metering valve 82, and an outlet gas-metering valve 84.

The fluid enters the dissolved gas generator 75 through the inlet 76 and flows into the distribution channel 77 outside the spiral-grooved ring 78 and flows in both directions. The fluid flows through the spiral grooves 79 and is injected at a high circulating velocity into the upper part of the cylinder 87 above the diffuser 80. Gas enters the diffuser through the inlet gas-metering valve 82 and is distributed through the porous material of the diffuser into the pressurized circulating fluid where it is dissolved.

The circulating fluid 86 causes a vortex 85 to form in the top of the cylinder 87. The top of the diffuser serves as a vortex interceptor. Excess gas is released to the atmosphere through the outlet gas-metering valve 84. The fluid flows downward in a spiral motion through a mixing zone 81 where it encounters gas 83 bubbling upward. The downward spiraling fluid flows with a high enough velocity to carry the gas bubbles through the mixing zone 81.

The diffuser 80 may be an inverted cone. The cross sectional area of the cylinder 87 outside the diffuser 80 increases downward causing the fluid velocity to decrease as it passes the diffuser 80 cone. The decrease in fluid velocity allows the gas bubbles to flow upward and return to the mixing zone 81. The circulating gas bubbles ensures that the fluid becomes saturated with gas before exiting through the bottom outlet 89.

Figure 15:
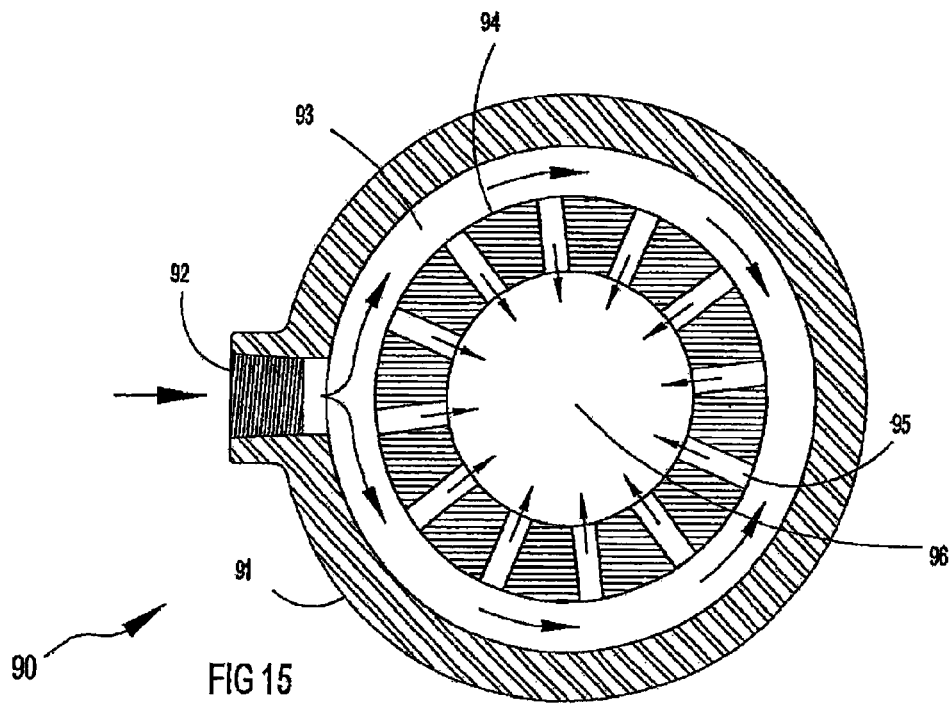
FIGS. 15-17 are fluid diagrams of another embodiment of a fluid mixer used as a dissolved gas generator employing a radial-grooved ring, an orifice ring positioned with the orifice ports over each groove in order to inject a gas into each stream, and an impact zone for saturating liquids with dissolved gases in accordance with the present invention.
Figure 16:
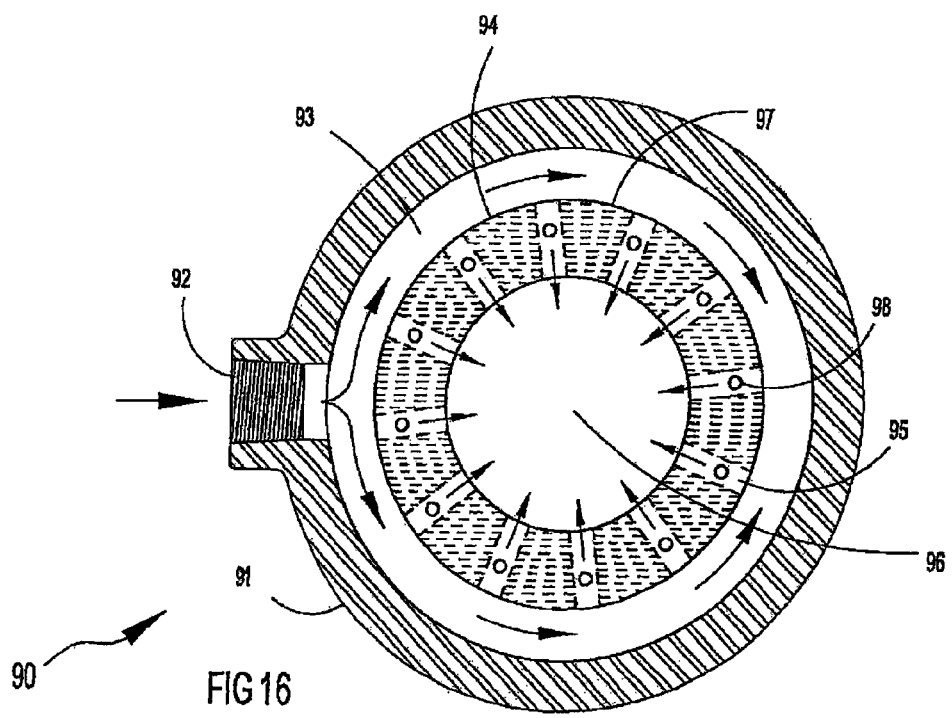
Figure 17:
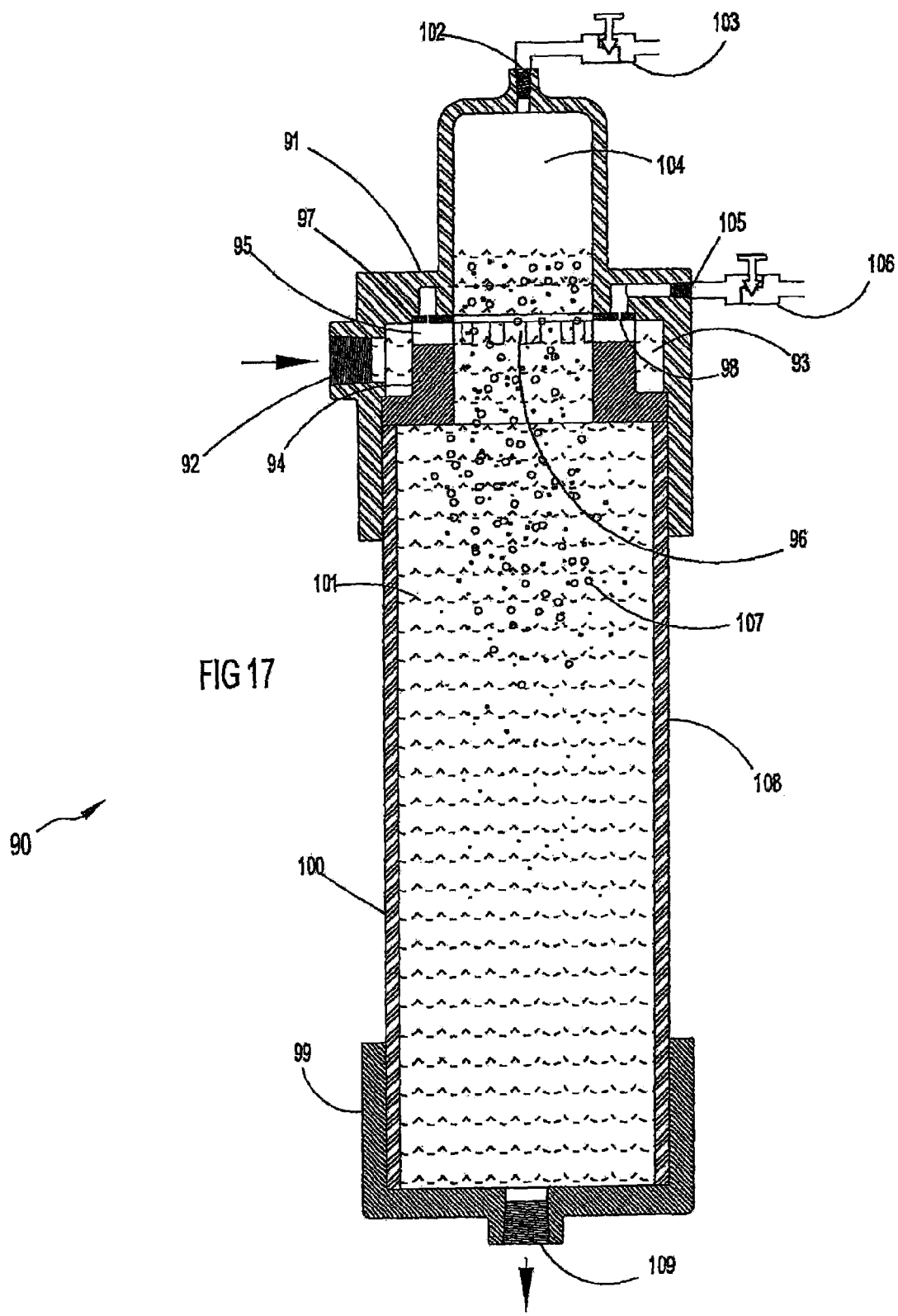

FIGS. 15-17 depict another embodiment of a fluid mixer 90 used as a dissolved gas generator employing the dynamic forces of fluid flow obtained with a radial-grooved ring in accordance with the present invention. FIG. 15 depicts a horizontal cross sectional view of the liquid inlet to the dissolved gas generator 90 illustrating the cylindrical donut housing 91, the distribution channel 93, the radial-grooved ring 94 with 16 radial grooves 95, and an impact chamber 96 to which the radial grooves 95 are directed.

FIG. 16 also provides a horizontal cross sectional view of the fluid mixer 90 with an orifice ring 97 positioned with the orifice ports 98 over the radial grooves 95. The arrows indicate the direction of liquid flow. FIG. 17 provides a vertical cross sectional view of the fluid mixer 90 assembly consisting of an cylindrical donut housing 91, an orifice ring 97, a radial-grooved ring 94, a lower cylinder 108, and a lower cylinder cap 99. The cylindrical donut housing 91 has a gas separation chamber 104 to separate the excess gases from the liquids so the gases can be discharged while retaining the liquid.

The center of the radial-grooved ring 94 serves as an impact zone 96 into which the multiple streams of the liquid-gas mixture flowing at a high velocity are directed to collide with each other. An inlet gas-metering valve 106 connected to the gas inlet 105 of the cylindrical donut housing 91 regulates the amount of gas supplied during operation. An outlet gas-metering valve 103 connected to the gas outlet 102 of the cylindrical donut housing 91 regulates the amount of gas discharged from the device during operation.

Referring to FIG. 16, the arrows indicate direction of liquid flow. The liquid enters the fluid mixer 90 through the inlet 92 and flows into the distribution channel 93 in both directions around the radial grooved ring 94. The liquid is divided and flows into the radial grooves 95 under the orifice ring 97 where gas is injected into each of the high velocity streams. The liquid-air mixture in each groove is then injected into the impact zone 96.

Referring to FIG. 17, again the liquid enters through inlet 92 and flows into the distribution channel 93 around the radial-grooved ring 94. The liquid then flows through the radial grooves 95 where the gas is injected through the orifice 98 into each liquid stream. The liquid-gas mixture in each of the grooves 95 is then injected at high velocity into the impact zone 96 to collide with each other. The liquid becomes saturated with the gas at this point. The inlet gas-metering valve 106 regulates the amount of gas supplied.

The saturated liquid flows downward out of the impact zone 96 and into the larger area of the lower cylinder 108 where the velocity is decreased. The excess gas bubbles 107 flow upward and return to the impact zone 96. The saturated liquid continues to flow downward and exits through the outlet 109. The excess gas bubbles flow up through the impact zone 96, and the gas is separated from the liquid in the separation chamber 104 and released from the unit through the outlet gas-metering valve 103.

The amount of gas retained in the separation chamber 104 regulates the liquid level in the apparatus. The amount of gas released is adjusted to maintain the liquid level just above the impact zone 96, and only a small amount of gas has to be released from the chamber 104. The fluid mixer 90 is extremely effective at saturating liquid with gas with only five parts that can be manufactured in many sizes at low cost. It can be manufactured in metal or in plastic either machined or injected molded.

Figure 18:
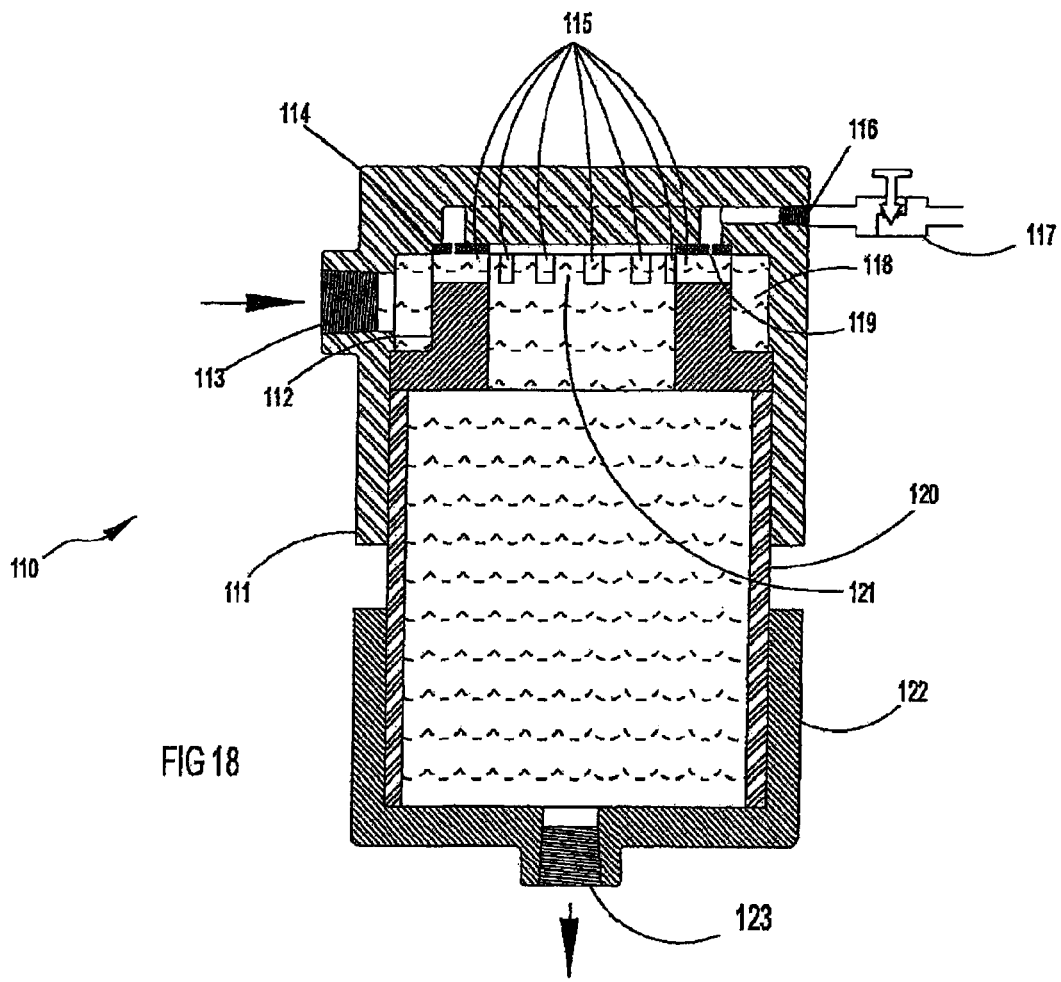
FIG. 18 is fluid diagrams of another embodiment of a fluid mixer employing a radial-grooved ring, an orifice ring positioned with the orifice ports over each groove in order to inject a second fluid into each stream, and an impact zone for mixing various fluids without provisions for releasing excess gases in accordance with the present invention.

FIG. 18 depicts another embodiment of a fluid mixer 110 for mixing liquids, for mixing gases, and for mixing gases and liquids where excess gases do not have to be separated from the liquids in accordance with the present invention. The fluid mixer 110 consists of an upper donut housing 111, an inlet 113, an orifice ring 114, a radial-grooved ring 112, a short lower cylinder 120, and a lower cylinder cap 122. The operation of the fluid mixer 110 is similar to the operation of the other fluid mixers previously discussed.

A first or primary fluid enters the dynamic mixer 110 through the inlet 113 and flows into the distribution channel 118 around the radial-grooved ring 112. The primary fluid then flows through the radial grooves 115 where a second fluid is injected into each stream through the orifices 119 into each primary fluid stream. The fluid mixture in each of the radial grooves 115 is then injected at high velocity into the impact zone 121 to collide with each other and become completely mixed. The fluid mixture flows downward out of the impact zone 121 into the short lower cylinder 120 and exits the fluid mixer 110 through the outlet 123. Valve 117 regulates the amount of secondary fluid into the mixer 110.

Figure 19:
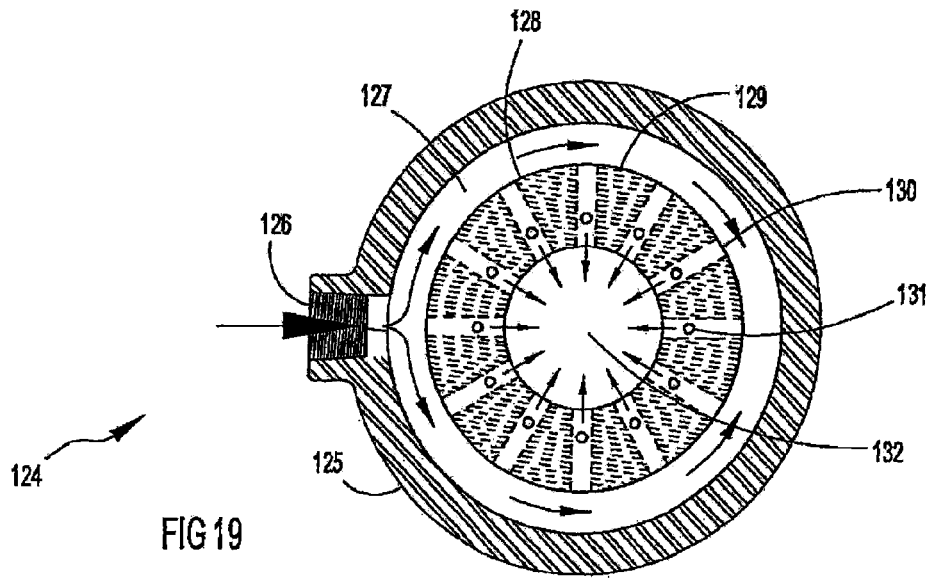
FIGS. 19-20 are fluid diagrams of another embodiment of a fluid mixer employing a radial-grooved ring, a combination venturi-orifice ring positioned with the venturi and orifice ports in each groove in order to draw a second fluid into each stream, and an impact zone for mixing the various fluids in accordance with the present invention.
Figure 20:
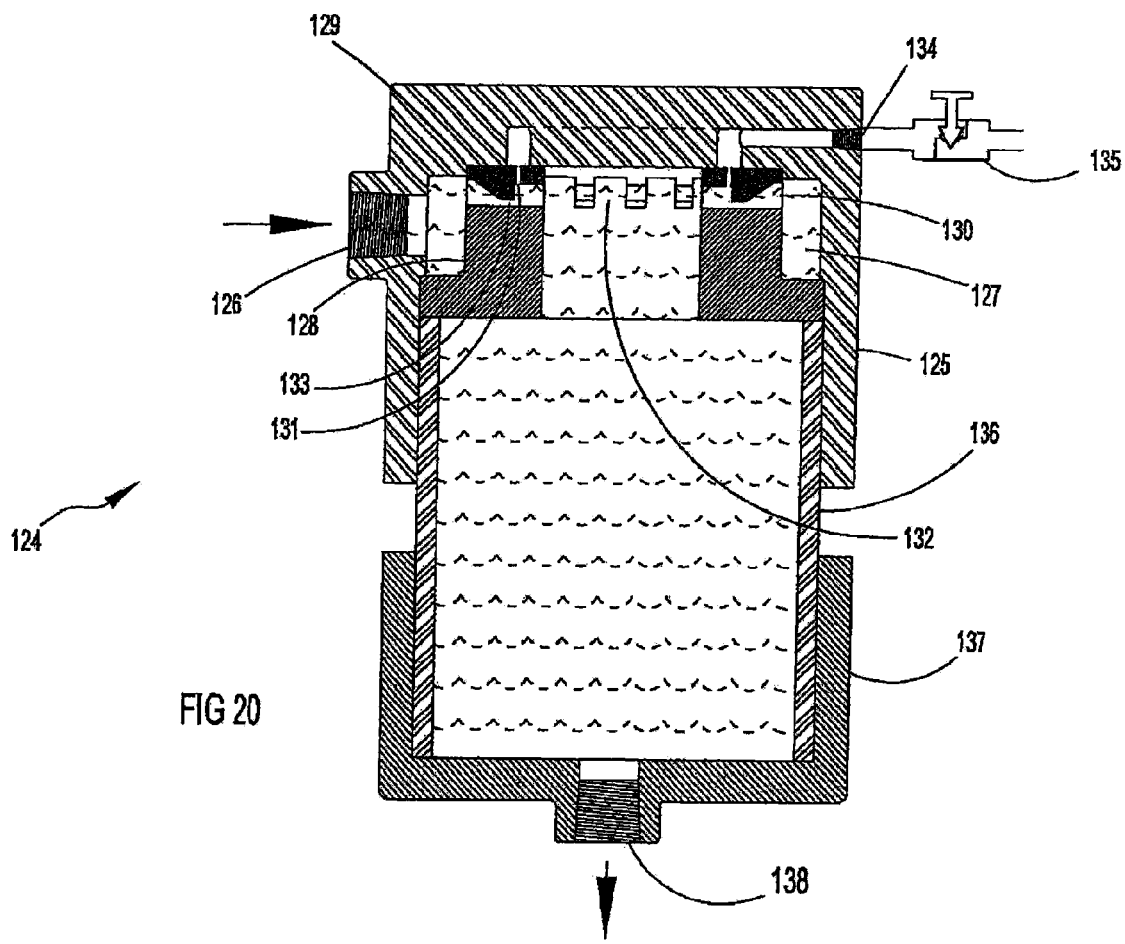

FIGS. 19 and 20 depict another embodiment of an fluid mixer 124 employing a radial-grooved ring 128, a combination venturi-orifice ring 129, and an impact zone 132 for mixing various fluids in accordance with the present invention. The fluid mixer 124 consists of an upper housing 125, a primary fluid inlet 126, a combination venturi-orifice ring 129, a radial-grooved ring 128, a secondary fluid inlet 134, a short lower cylinder 136, and a lower cylinder cap 137.

The operation of the dynamic mixer is similar to the operation of the other dynamic mixers previously discussed. A first or primary fluid enters the fluid mixer 124 through the inlet 126 and flows into the distribution channel 127 around the radial-grooved ring 128. The primary fluid then flows through the radial grooves 130 where a second fluid is drawn into each stream by the venturi 133 through the orifices 131 into each primary fluid stream. The fluid mixture in each of the radial grooves 130 is then injected at high velocity into the impact zone 132 to collide with each other and become completely mixed. The fluid mixture flows downward out of the impact zone 132 into the short lower cylinder 136 and exits the fluid mixer 124 through the outlet 138. Valve 135 regulates the amount of secondary fluid into the fluid mixer 124.

Figure 21:
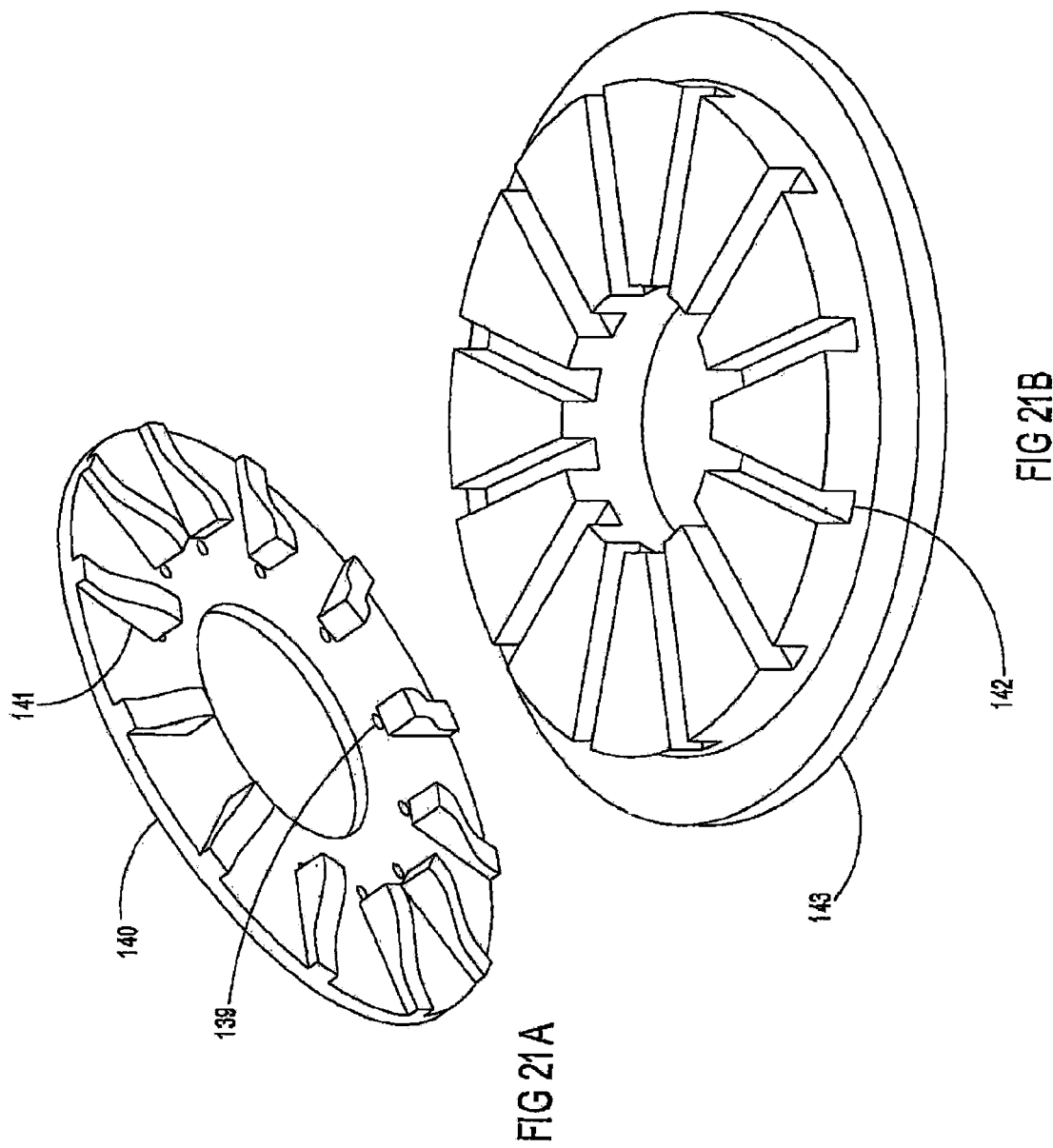
FIGS. 21A and 21B provide three-dimensional illustrations of a typical radial-grooved ring and a combination venturi-orifice ring used in the fluid mixer in accordance with the present invention.

FIG. 21 provides three-dimensional illustration of a typical radial-grooved ring 143 having 12 radial grooves 142 and a combination venturi-orifice ring 140 having 12 orifices 139 and 12 venturi 141 to fit onto the radial-grooved ring 143 of a fluid mixer.

Now, turning to the various embodiments of FIGS. 22-50. When a primary fluid (as water) is forced under pressure to flow through the reduced area of a venturi, the reduced area causes an increase in flow velocity. A lower pressure is produced in the area where velocity is increased. By adding a gap at the point where the velocity is increased, suction is produced and can be used to draw a secondary fluid (or solids, e.g. particles) into, and mixed with the primary fluid. Water and air are used as the primary and secondary fluids, respectively, in the discussions of the present invention for the purpose of clarity; however, it will be understood by those skilled in the art that any fluid can be used as the primary fluid to draw in any secondary fluid (or solid). Fluids may comprise gas or liquid, for example. The assembly of the venturi apparatus including a housing is referred to as an "eductor" with the "venturi" as the internal component causing the suction.

Illustrative embodiments of the invention are described below as they might be employed in the mixing of fluids with fluids and fluids with solids by suction of venturi. In the interest of clarity, not all features of an implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments of the invention will become apparent from consideration of the following description and drawings.

Figure 22:
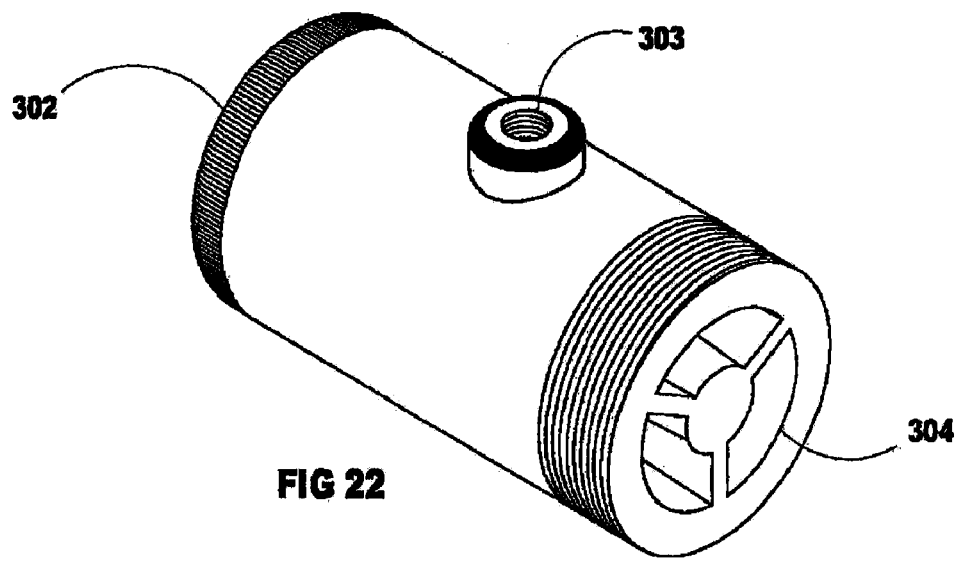
FIG. 22 depicts a three dimensional representation of a first eductor embodiment identifying primary fluid inlets and outlets and secondary inlets and outlets (e.g. for a secondary fluid or solid) in accordance with the invention.

1001331 Referring now to the drawings in more detail, FIG. 22 therein is depicted a three-dimensional illustration of an eductor 1 with a linear venturi in the form of a narrow circular opening for mixing fluids in accordance with the present invention. The eductor 301 generally may comprise a primary fluid (e.g. water) inlet 302, a secondary inlet (e.g. for air) 303, and an outlet 305 where the mixture (e.g. water-air) exits the unit in the form of an expanding ring. The eductor 301 can be adapted with a threaded 304 or flanged (not shown) outlet so it can be incorporated into a distribution piping system.

Figure 23:
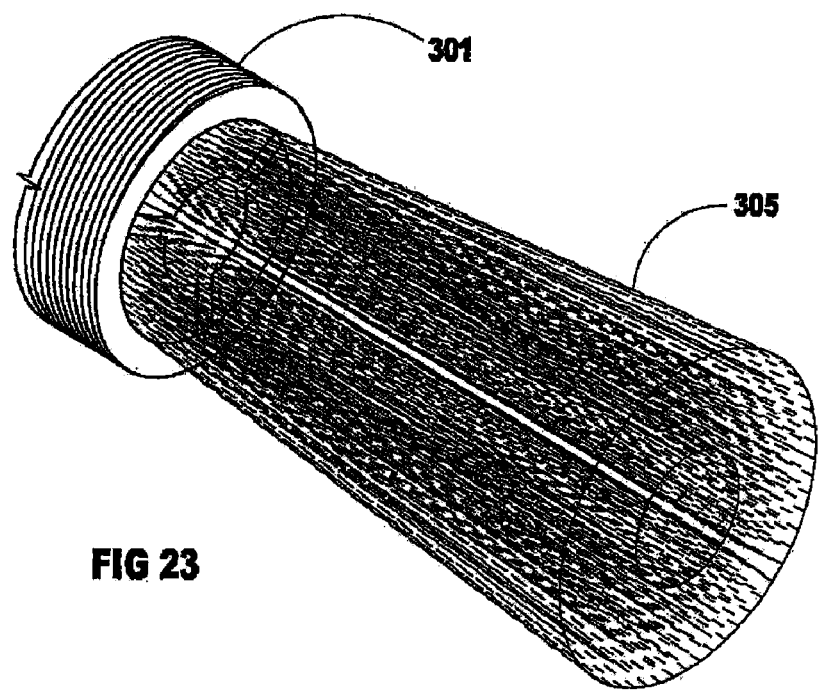
FIG. 23 illustrates the flow pattern of the fluids as they exit the first eductor embodiment in accordance with the present invention.
Figure 24:
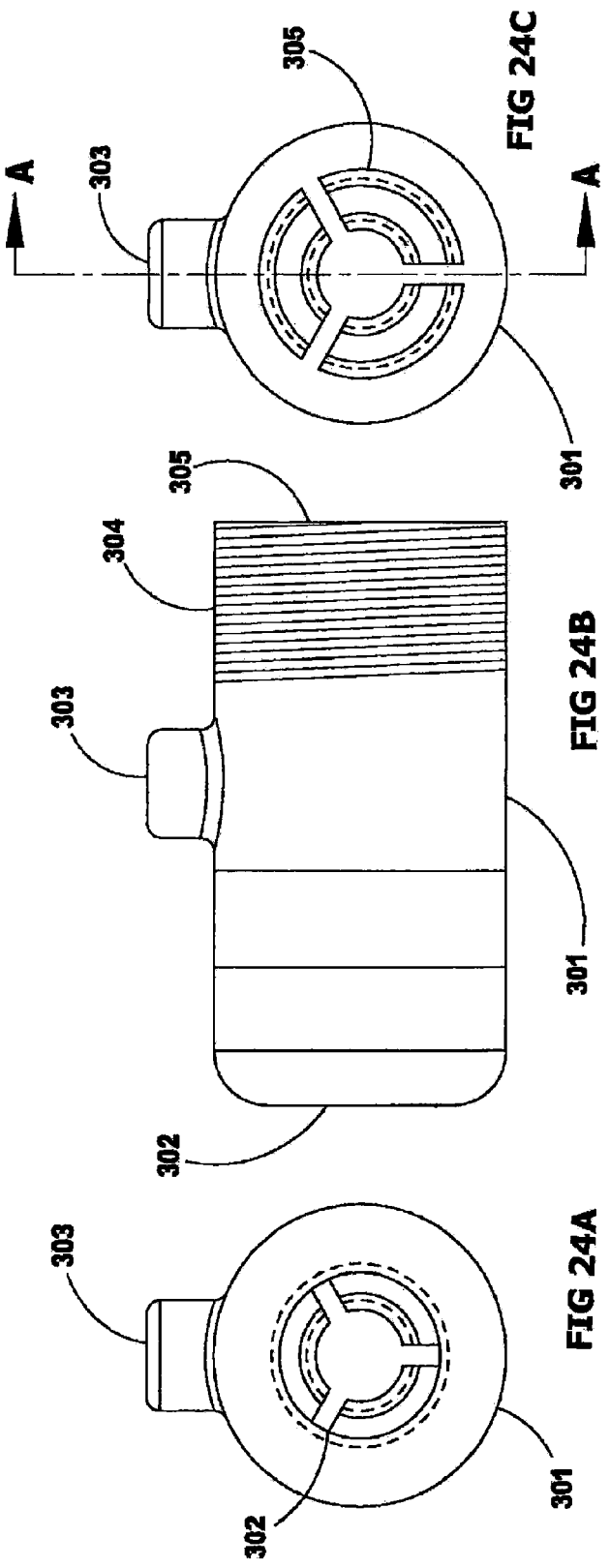
FIGS. 24a-24c depict elevation views of the primary fluid inlet, side, and primary fluid outlet, respectively, of the first eductor embodiment in accordance with the present invention.

FIG. 23 depicts a three-dimensional mixture (e.g. water-air) 306 flowing as it exits the outlet 305 of the eductor 301 in the form of an expanding ring in accordance with the present invention.

FIGS. 24a-24c illustrate three views of the eductor 301 in accordance with the present invention. FIG. 24a provides an elevation view of the primary fluid (e.g. water) end 302 of the eductor 301. FIG. 24b provides a side elevation view of the eductor 301 and identifies the primary fluid inlet (e.g. water) 302, the secondary inlet (e.g. for air) 303, and the outlet 305.

FIG. 24c provides an elevation view of the outlet end 305 of the eductor 301 from which a Sectional View A-A is taken.

Figure 25:
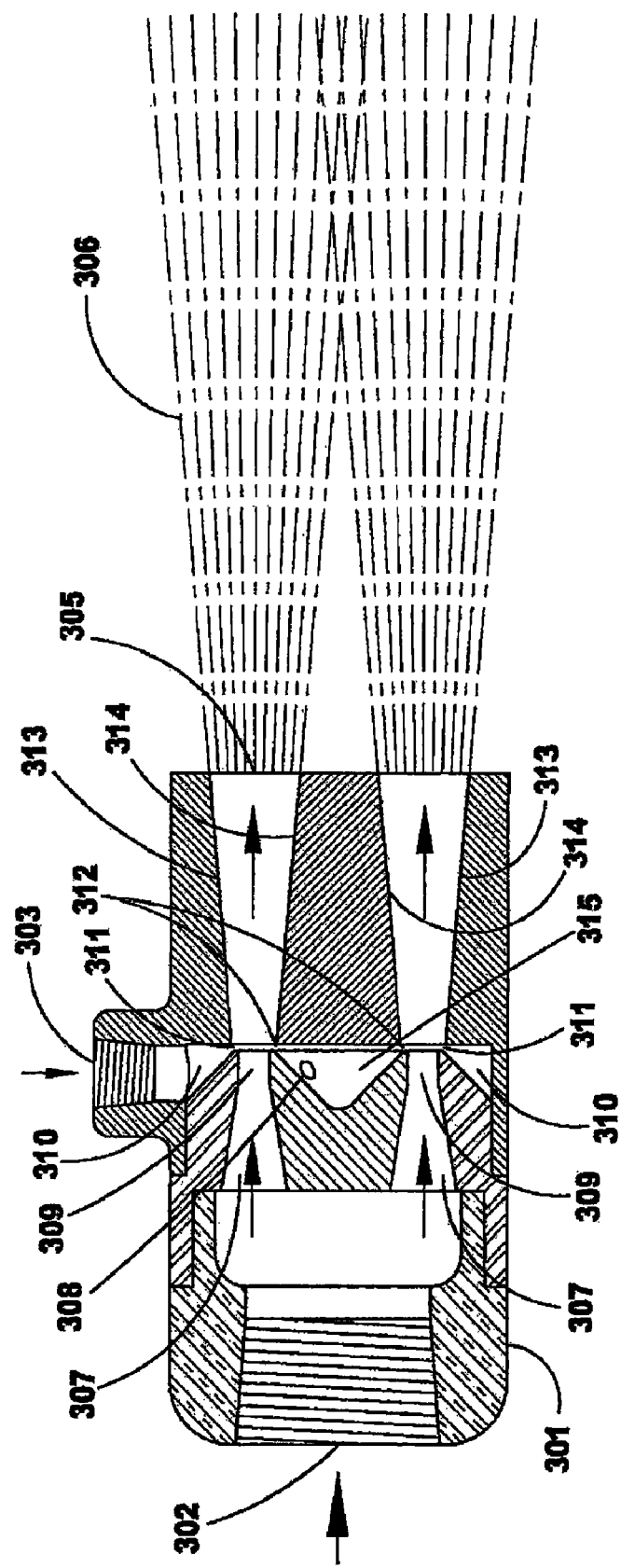
FIG. 25 is a vertical longitudinal cross sectional schematic of the first eductor embodiment identifying internal components and direction of fluid flow in accordance with the present invention.

FIG. 25 depicts a longitudinal Sectional View A-A of the eductor 301 taken from FIG. 3c in accordance with the present invention. The eductor 301 may comprise a primary fluid inlet 302 (e.g. for water), a circular contracting venturi inlet 307, a circular venturi 309, an secondary inlet (e.g. for air) 303, a circular venturi outlet expanding both outward 313 and inward 314, and an eductor outlet 305. The arrows indicate the direction of flow. Water (or other fluid) enters the eductor 301 through the primary fluid inlet (e.g. for water) 302, is divided and flows through the circular venturi inlet 307 where the flow velocity is increased, flows through the circular venturi 309, flows across the gaps 311 and 312, and draws air (or other fluid or solids) into the stream from both an outer distribution channel 310 and an inner distribution channel 315 supplied from the atmosphere through the secondary inlet 303 (e.g. for air). Air to the inner distribution channel 315 is supplied from the outer distribution channel 310 through a passageway 308. The mixture (e.g. water-air) flows from the gaps (e.g. for air) 311 and 312 through the expanding venturi outlet 313 and 314 where the flow velocity is decreased and is discharged 306 from the unit though the eductor outlet 305.

Figure 26:
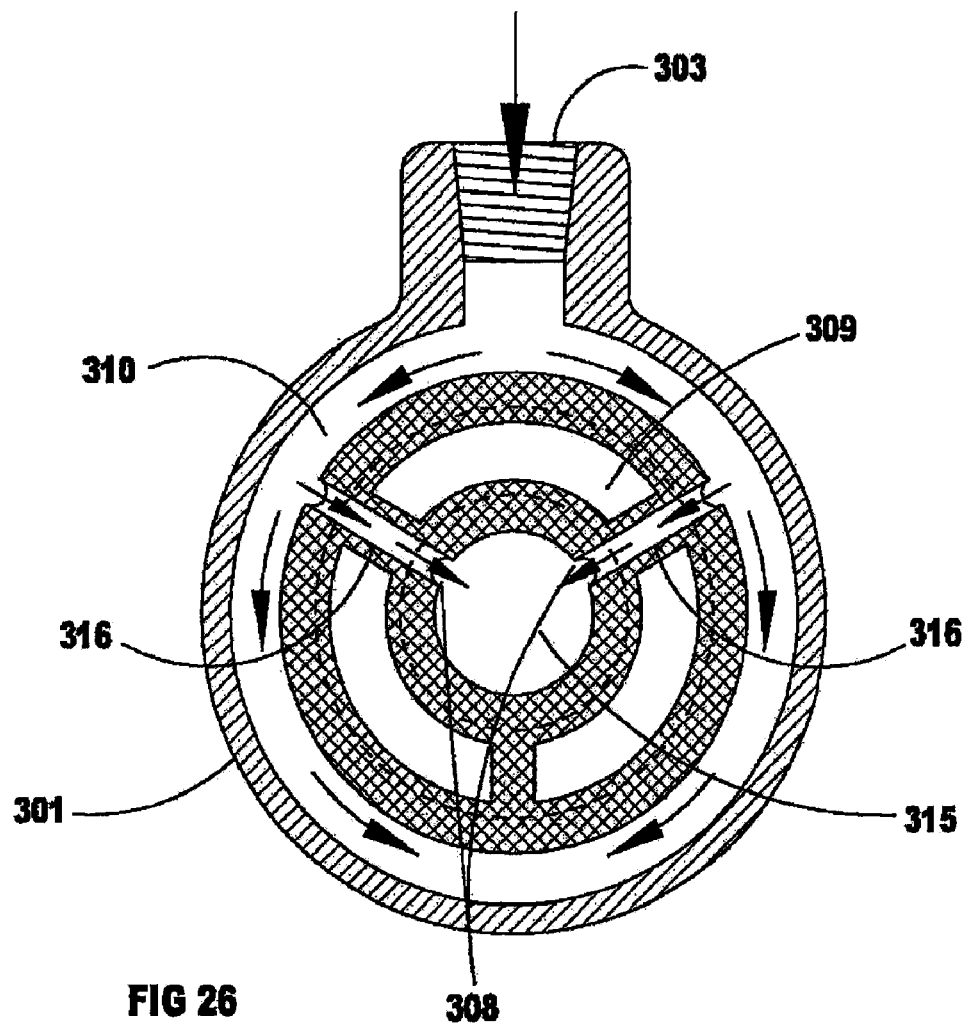
FIG. 26 is a vertical traverse cross sectional schematic of the first eductor embodiment identifying the flow path of the secondary fluid or solid in accordance with the present invention.
Figure 27:
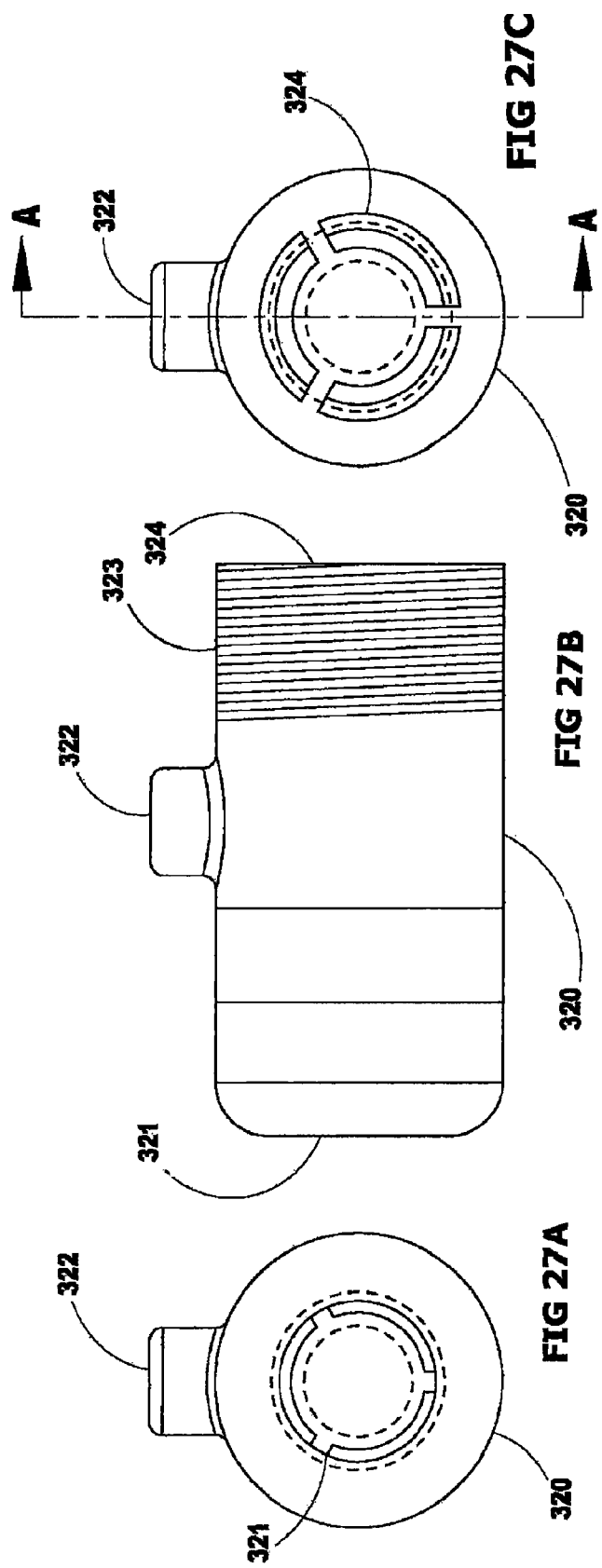
FIGS. 27a-27c depict elevation views of the primary fluid inlet, side, and primary fluid outlet, respectively, of the second eductor embodiment in accordance with the present invention.

FIG. 26 provides a traverse sectional schematic of the eductor 301 showing the flow of air through the eductor 301 in accordance with the present invention. Air from the atmosphere enters the eductor 301 through the secondary inlet 303 (e.g. for air), flows into the outer distribution channel 310 from which the secondary fluid (e.g. air) may be supplied to the outer gap (311, FIG. 25) where it is drawn into the primary water stream by the venturi (309, FIG. 25). The secondary fluid, e.g. air, from the outer distribution channel 310 is also supplied to the inner distribution channel 315 through the air passageway 308 in the supports 316 where it is drawn into the primary (water) stream by the venturi 309 through the inner gap (312, FIG. 25).

FIGS. 27a-c illustrate three views of a second embodiment of the eductor 320 in accordance with the present invention. FIG. 27a provides an elevation view of the primary fluid inlet (e.g. for water) end 321 of the eductor 320. FIG. 27b provides a side elevation view of the eductor 320 and identifies the primary fluid inlet (e.g. for water) 321, the secondary inlet 322 (e.g. for air), and the outlet 324. FIG. 27c provides an elevation view of the outlet end 324 of the eductor 320 from which a Sectional View A-A is taken.

Figure 28:
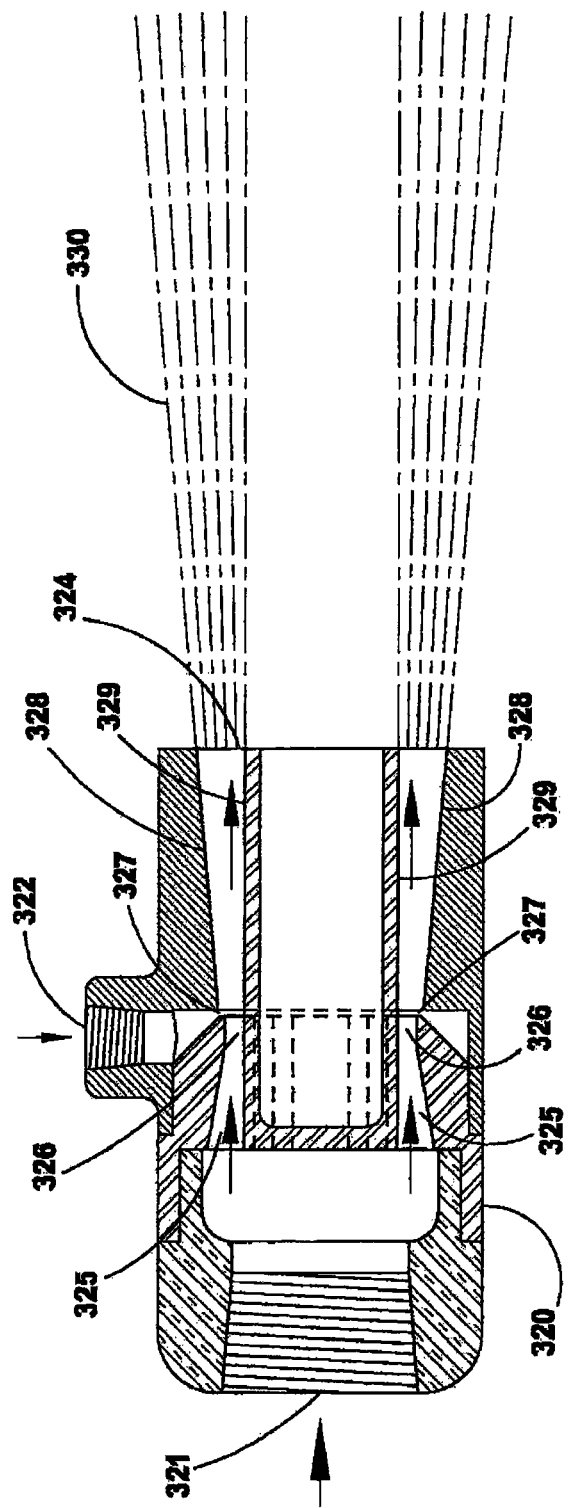
FIG. 28 is a vertical longitudinal cross sectional schematic of the second eductor embodiment identifying internal components and direction of fluid flow in accordance with the present invention.

FIG. 28 depicts a longitudinal Sectional View A-A of the eductor 320 taken from FIG. 27c in accordance with the present invention. The eductor 320 may comprise a primary fluid inlet (e.g. for water) 321, a circular venturi inlet 325 conically shaped on the outside, a circular venturi 326, an secondary inlet 322 (e.g. for air), a circular venturi outlet 328 expanding outward 328 and in a straight line 329 on its inside diameter, and an eductor outlet 324. The arrows indicate the direction of flow. Water (or other fluid) enters the eductor 320 through the primary fluid inlet 321, is divided and flows through the circular venturi inlet 325 where the flow velocity is increased, flows through the circular venturi 326, flows across the gap 327, and draws air (or other fluid or solids) into the water stream from the secondary inlet (e.g. for air) 322. The mixture (e.g. water-air) flows from the gaps 327 through the expanding venturi outlet 328 and 329 where the flow velocity is decreased and is discharged from the unit though the eductor outlet 324 in a ring spray pattern 330 that expands in its outside circumference as it flows away from the eductor 320.

Figure 29:
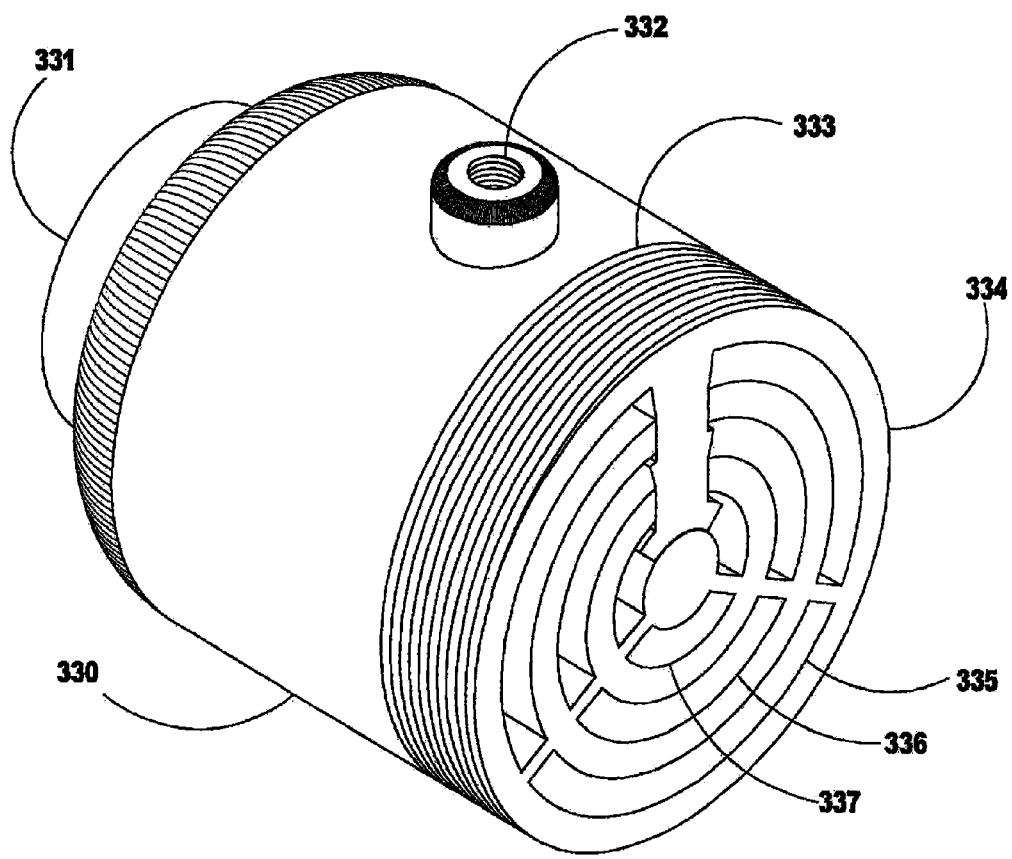
FIG. 29 depicts a three dimensional representation of a third eductor embodiment identifying primary fluid inlet and outlet and a secondary inlet and outlet (e.g. for a secondary fluid or solid) in accordance with the invention.
Figure 30:
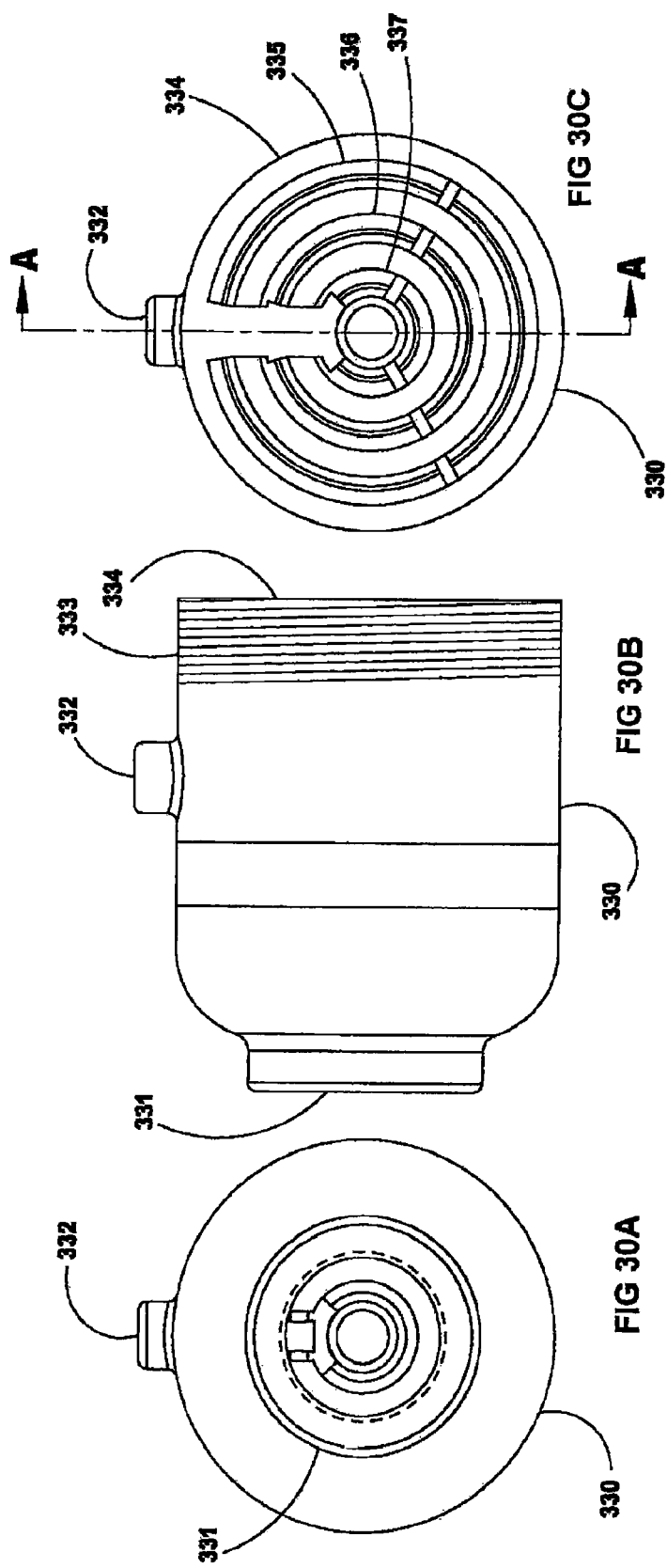
FIGS. 30a-30c depict elevation views of the primary fluid inlet, side, and primary fluid outlet, respectively, of the third eductor embodiment in accordance with the present invention.

FIG. 29 depicts a three-dimensional illustration of a third embodiment of an eductor 330 with three linear venturi forming three concentric rings with each venturi opening in the form of a narrow ring in accordance with the present invention for mixing fluids. The eductor 330 generally may comprise a primary fluid inlet (e.g. for water) 331, an secondary inlet 332 (e.g. for air), and three expanding outlets 335, 336, and 337 where the mixture (e.g. water-air) exits the outlet 334 of the eductor 330 in the form of three expanding rings. The eductor 330 can be adapted with a threaded 333 or flanged (not shown) outlet so it can be incorporated into a distribution piping system.

FIGS. 30a-30c illustrate three views of the third embodiment of the eductor 330 in accordance with the present invention. FIG. 30a provides an elevation view of the primary fluid inlet (e.g. for water) end 331 of the eductor 330. FIG. 30b provides a side elevation view of the eductor 330 and identifies the primary fluid inlet (e.g. for water) 331, the secondary inlet 332 (e.g. for air), and the outlet end 334 of the eductor 330. FIG. 30c provides an elevation view of the outlet end 334 of the eductor 330 showing the position of the expanding outlets 335, 336, and 337 and from which a Sectional View A-A is taken.

Figure 31:
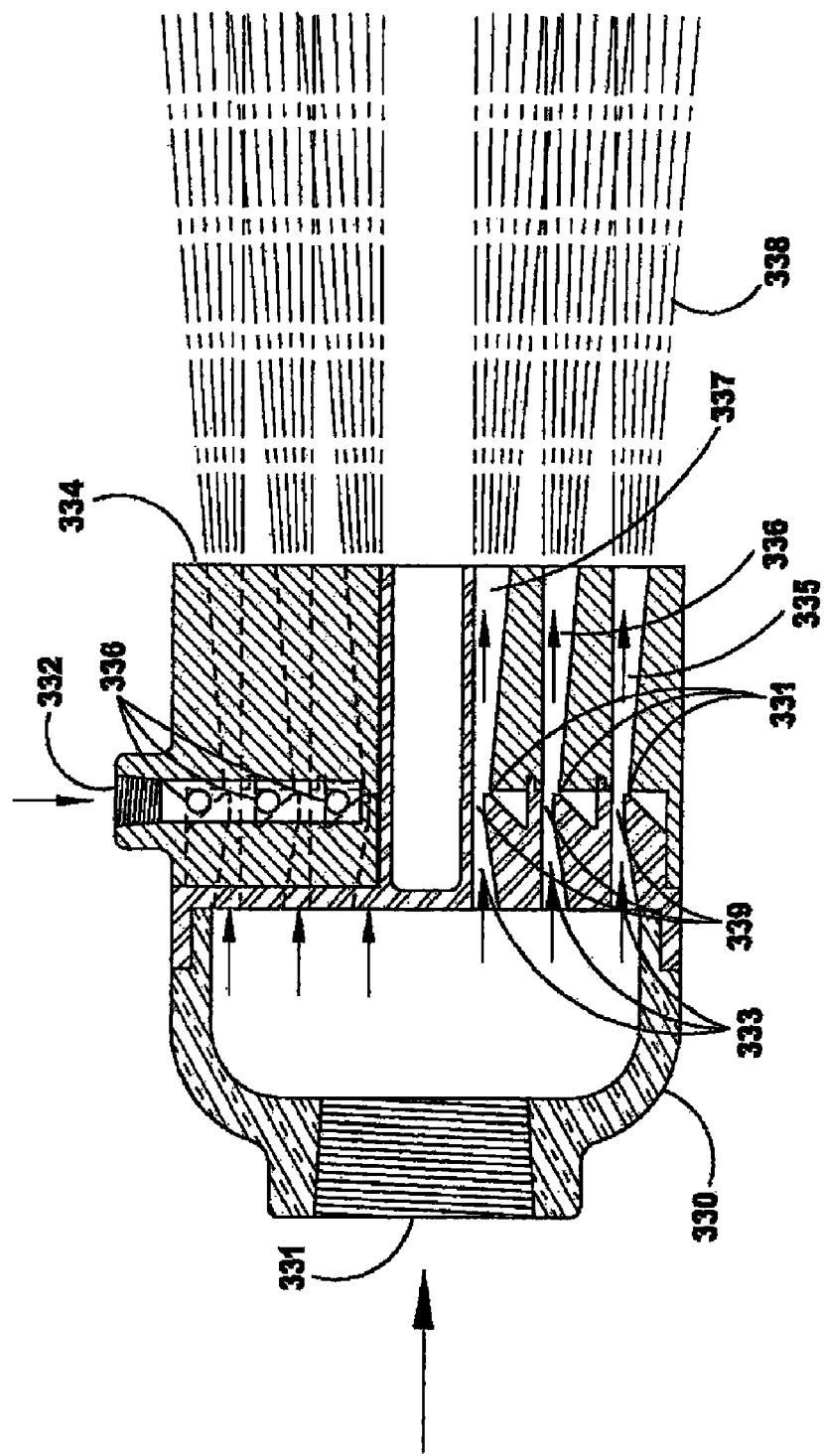
FIG. 31 is a vertical longitudinal cross sectional schematic of the third eductor embodiment identifying internal components and direction of fluid flow in accordance with the present invention.

FIG. 31 depicts a longitudinal Sectional View A-A of the eductor 330 taken from FIG. 30c to identify internal components and show fluid flow through the eductor 330 in accordance with the present invention. The eductor 330 may comprise a primary fluid inlet (e.g. for water) 331, three circular venturi inlets 333 conically shaped on the outside, three circular venturi 339, an secondary inlet (e.g. for air) 332, three circular venturi outlets 335, 336, and 337 expanding outward, and an eductor outlet 334. The arrows indicate the direction of flow. Water (or other fluid) enters the eductor 330 through the primary fluid inlet (e.g. for water) 331, is divided and flows through the three circular venturi inlets 333 where the flow velocity is increased, flows through the three circular venturi 339, flows across the three gaps 331, and draws air (or other fluids or solid particles) into the water stream from the secondary inlet 332. The mixture (e.g. water-air) flows through the three expanding venturi outlets 335, 336, and 337 where the flow velocity is decreased and is discharged from the unit though the eductor outlet 334 in three ring spray patterns 338 that expand on the outside circumference as they flow outward from the eductor 330.

Eductors with one and three concentric linear venturi in the form of narrow circular openings were discussed. The number presented is not intended as a limitation of the present invention. Any number of concentric venturi can be incorporated in the eductor to increase the eductor flowrate and the amount of air that can be drawn into the eductor. The eductors can be constructed with plastic or metal components. Plastic components can be assembled by ultrasonic welding, by induction welding, or by bolting. Soldering, brazing, sintering, or bolting can be used to assemble metal components.

Figure 32:
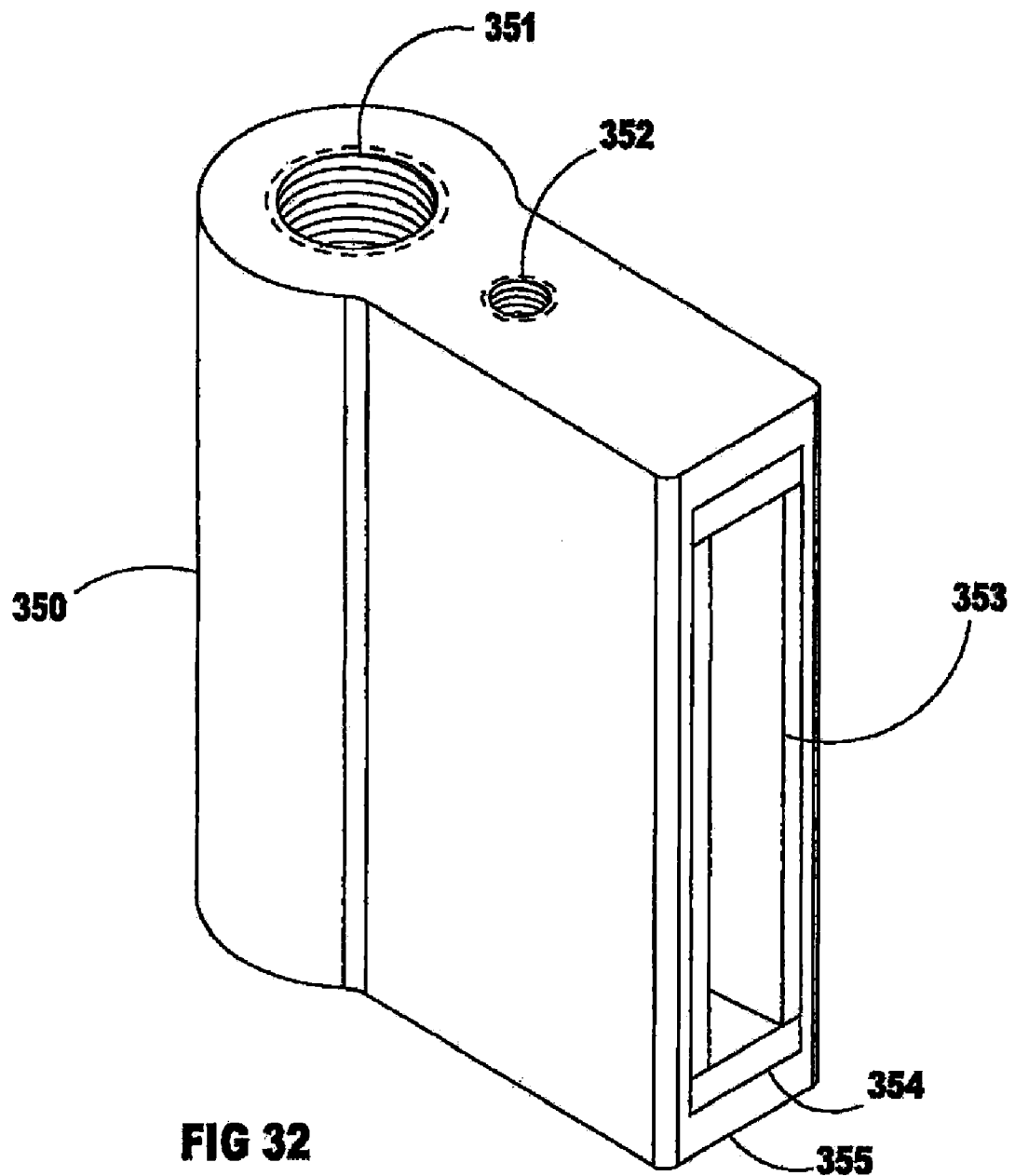
FIG. 32 depicts a three dimensional representation of a fourth eductor embodiment identifying a primary fluid inlet and outlet and a secondary inlet and outlet (e.g. for secondary fluid or solid) in accordance with the invention.

FIG. 32 depicts a three-dimensional illustration of a fourth embodiment of an eductor 350 with a linear venturi opening in the shape of a thin rectangle in accordance with the present invention for mixing fluids. The eductor 350 is constructed of a housing 355 with a venturi assembly 354 inserted into the housing 355, which functionally may comprise a primary fluid inlet (e.g. for water) 351, an secondary inlet (e.g. for air) 352, and an outlet 353 where the mixture (e.g. water-air) exits the eductor 350. There are water and secondary inlets (e.g. for air) 351 and 352, respectively, on both top and bottom of the eductor 350.

Figure 33A:
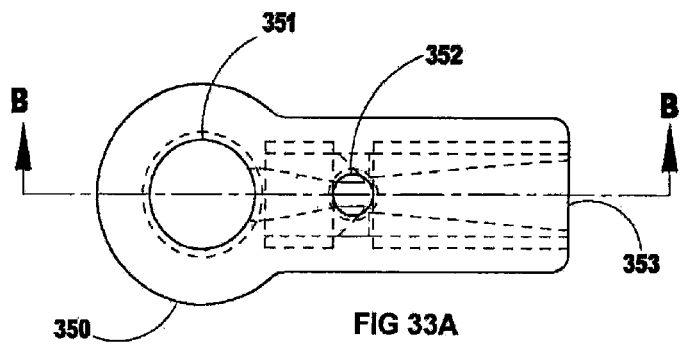
FIGS. 33a-33c depict elevation views of the primary fluid inlet, side, and primary fluid outlet, respectively, of the fourth eductor embodiment in accordance with the present invention.
Figure 33B:
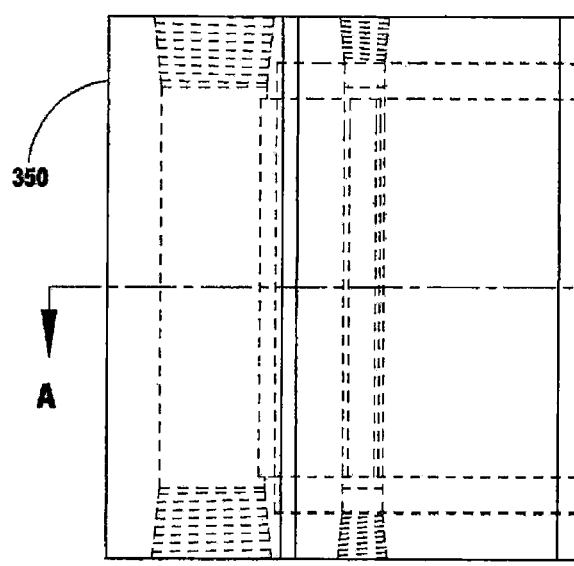
Figure 33C:
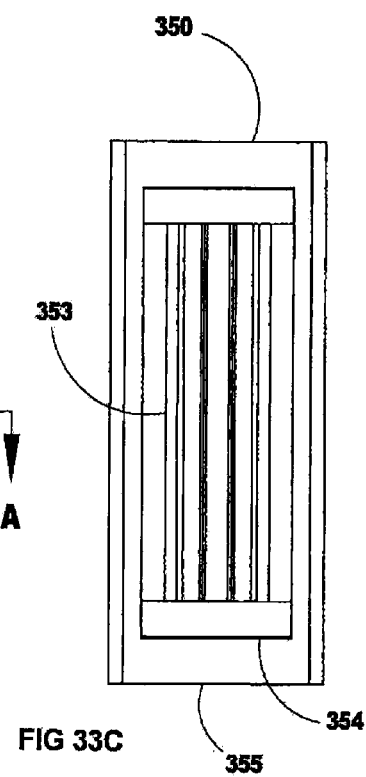

FIGS. 33a-33c illustrate three views of the fourth embodiment of the eductor 350 in accordance with the present invention. FIG. 33a provides a top view of the eductor 350 indicating the primary fluid inlet (e.g. for water) 351, the secondary inlet (e.g. for air) 352, and the outlet 353 of the eductor 350 with a Sectional View B-B taken. FIG. 33b provides a side elevation view of the eductor 30 with a Sectional View A-A taken. FIG. 33c provides an elevation view of the outlet 353 of the eductor 350 identifying the eductor housing 355 and the venturi assembly 354.

Figure 34A:
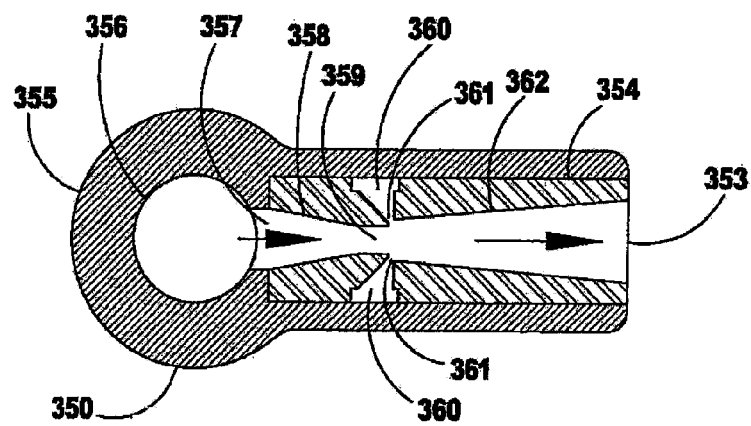
FIG. 34a is a horizontal cross sectional schematic of the fourth eductor embodiment identifying internal components and direction of fluid flow in accordance with the present invention.

FIG. 34a provides a horizontal Sectional Views A-A of the eductor 350 taken from FIG. 33b showing internal components and fluid flow through the eductor 350. The internal components of the eductor 350 may comprise a housing 355, a venturi assembly 354, a primary fluid (e.g. for water) distribution channel 536, a contracting venturi inlet 357, a venturi 359, gaps (e.g. for air) 361 on each side of the venturi 359, an expanding venturi outlet 362, and an eductor outlet 353. The arrows indicate the direction of flow. Water, e.g., from the primary fluid inlet 351 (not shown) enters the primary fluid distribution channel (e.g. for water) 356, flows through the contracting venturi inlet 357, through the venturi 359, and across the gaps 61 where air is drawn into the water stream by suction. The mixture (e.g. water-air) flows from the gaps 361 into the expanding venturi outlet 362 where the flow velocity is decreased and exits the eductor 350 through the outlet 353.

Figure 34B:
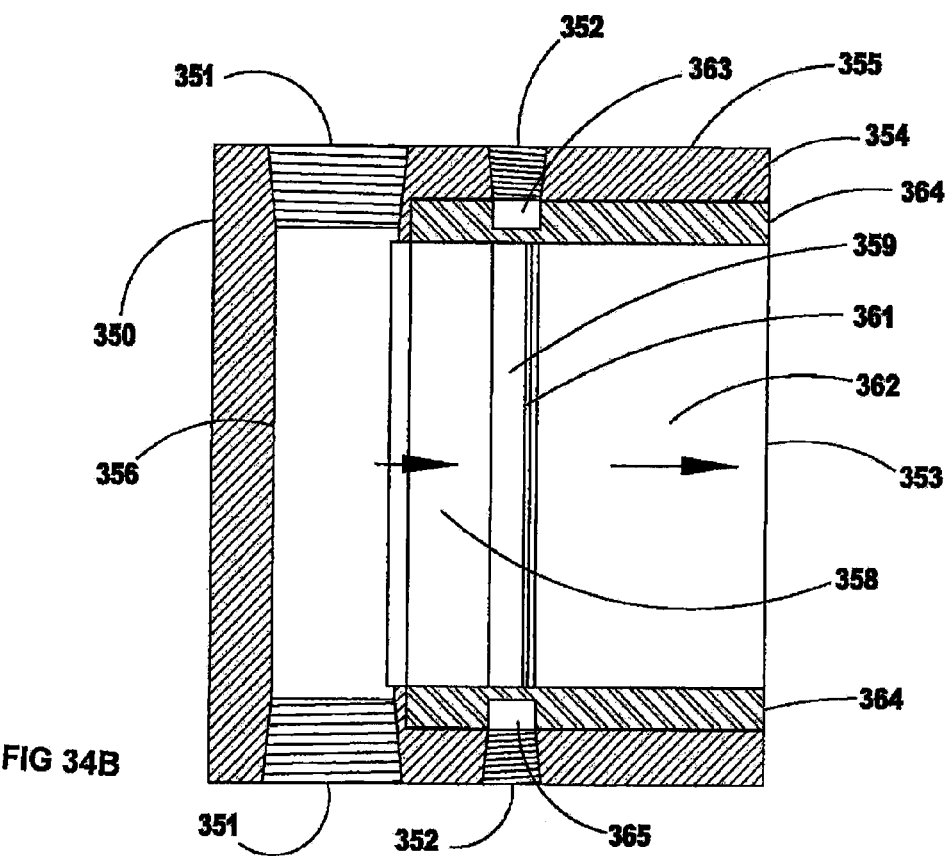
FIG. 34b is a vertical longitudinal cross sectional schematic of the fourth eductor embodiment identifying internal components and direction of fluid flow in accordance with an embodiment of the present invention.

FIG. 34b provides a vertical Sectional Views B-B of the eductor 350 taken from FIG. 33a showing internal components and fluid flow through the eductor 350. The internal components of the eductor 350 consist of a housing 355, a venturi assembly 354, a contracting venturi inlet 358, a venturi 359, horizontal air distribution channels 363 and 365 in the top and bottom 364 of the venturi assembly 354, gaps (e.g. for air) 361 on each side of the venturi 359, an expanding venturi outlet 362, and an eductor outlet 353. The arrows indicate the direction of flow. Primary fluid (e.g. water) from the primary fluid inlet 351 on top and bottom of the eductor 350 enters the primary fluid distribution channel 356 (e.g. for water), flows through the contracting venturi inlet 358, through the venturi 359, and across the gaps 361 where air is drawn into the water stream by suction from the second (e.g. air) distribution channels 363 and 365. The mixture (e.g. water-air) flows from the gaps 361 into the expanding venturi outlet 362 where the flow velocity is decreased and exits the eductor 350 through outlet 353.

Figure 35:
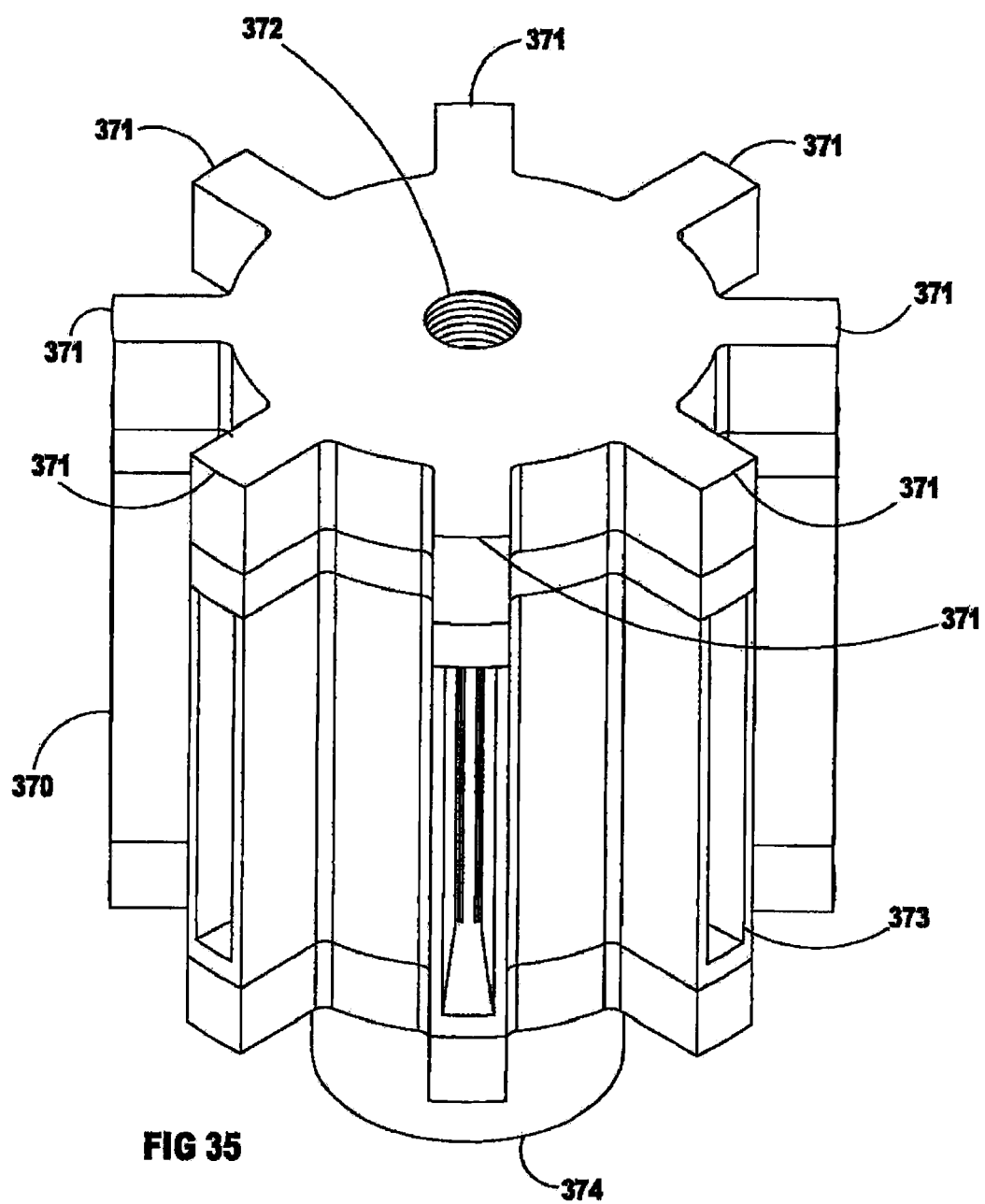
FIG. 35 depicts a three dimensional representation of a fifth eductor embodiment identifying a primary fluid inlet and outlet and a secondary inlet and outlet (e.g. for secondary fluid or solid) in accordance with an embodiment of the present invention

FIG. 35 depicts a three-dimensional illustration of a fifth embodiment of an eductor 370 with eight linear venturi 371 with openings in the form of narrow rectangles positioned around a center primary fluid inlet (e.g. for water) 374 and an secondary inlet (e.g. for air) 372 with radial flow from the center outward in accordance with the present invention for mixing fluids. When operated submerged in a body of water (such as a municipal wastewater treatment basin or a pond) the area around the eductor 370 becomes flooded with air bubbles.

Figure 36:
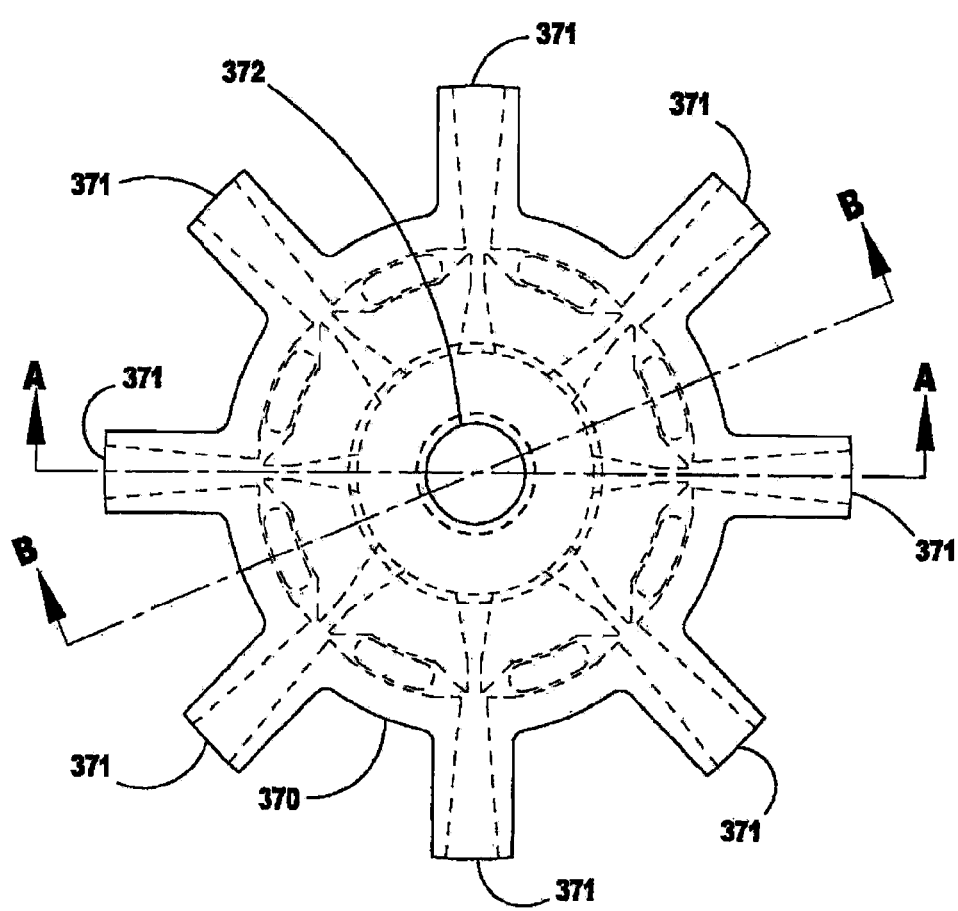
FIG. 36 depicts a top view of the fifth eductor embodiment identifying the location of two cross sectional views taken and illustrated in the following drawings in accordance with the present invention.

FIG. 36 depicts a top view of the eductor 370 identifying the radial positions of eight eductors 371 around the center secondary inlet (e.g. for air) 372 from which Section Views A-A and B-B are taken in accordance with the present invention.

Figure 37A:
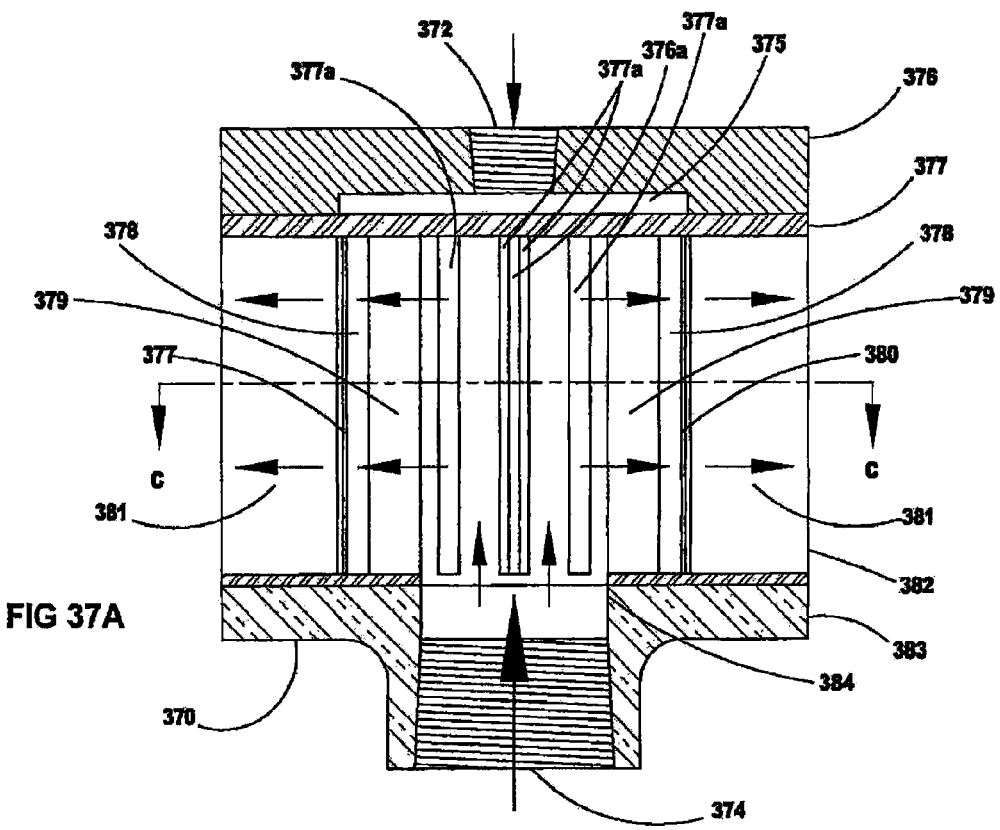
FIG. 37a is a vertical cross sectional schematic of the fifth eductor embodiment identifying internal components and direction of fluid flow in accordance with the present invention.

FIG. 37a depicts a vertical Sectional View A-A of eductor 370 taken form FIG. 36 identifying internal components and from which a Sectional View C-C is taken. The eductor 370 generally may comprise a top plate 376 with the secondary inlet (e.g. for air) 372 and a horizontal air distribution channel 375, a venturi-seal and an air-distribution plate 377, an 8-venturi array 382, and a bottom plate 383 with the primary fluid inlet (e.g. for water) 374 feeding a primary fluid (e.g. for water) distribution channel 384. The internal components of the 8-venturi array 382 include a distribution channel 384 continued from primary fluid inlet (e.g. for water) 374 and extending through the 8-venturi array 382, eight contracting venturi inlets 379, eight venturi 378, gaps 380 (e.g. for air) on each side of the eight venturi 378, and eight venturi outlets 381. Three additional contracting venturi inlets can be seen from inside the primary fluid distribution channel 384 (e.g. for water) in the FIG. 37*a* and are identified as 377*a*. One venturi can also be seen from the primary fluid distribution channel 384 (e.g. for water) and identified as 376*a*. The arrows indicate the direction of flow. Water enters the eductor 370 through the primary fluid inlet (e.g. for water) 374, flows through the primary fluid distribution channel 384 (e.g. for water), flows through the contracting venturi inlets 379, flows through the venturi 378, and across the gaps 380 where air is drawn into the water stream by suction. The air is drawn from the secondary inlet (e.g. for air) 372 through the horizontal air distribution channel 375, through slots 386 (shown in a following drawing) in the venturi-seal and air-distribution plate 377, and through vertical distribution channels in the venturi array 382 on each side of each venturi 378 (shown in the following drawing). The mixture (e.g. water-air) flows from the gaps 380 into the expanding venturi outlet 381 where the flow velocity is decreased and exits the eductor 370.

Figure 37B:
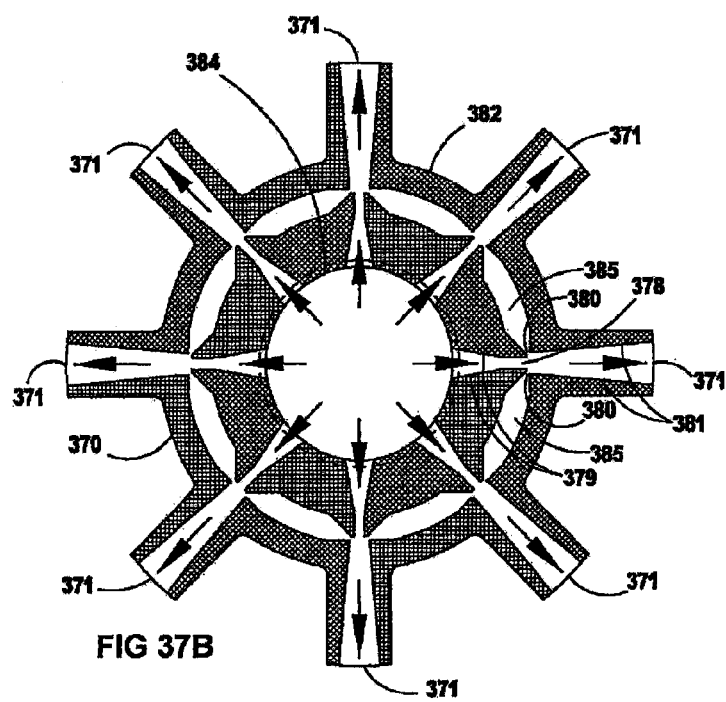
FIG. 37b is a horizontal cross sectional schematic of the fifth eductor embodiment identifying internal components and direction of fluid flow in accordance with the present invention.

FIG. 37*b* provides a horizontal Sectional Views C-C of the eductor 370 taken from FIG. 37*a* showing internal components and fluid flow through the eductor 370. The internal components of the eductor 370 consist of a primary fluid distribution channel (e.g. for water) 384, eight venturi assemblies 371 positioned around the primary fluid distribution channel (e.g. for water) 384, eight contracting venturi inlets 379, eight venturi 378, gap (e.g. for air) 380 on each side of the eight venturi 378, and eight expanding venturi outlets 381. The arrows indicate the direction of flow. Water from the primary fluid inlet (e.g. for water) 374 (not shown) enters the primary fluid distribution channel 384 (e.g. for water), flows through the eight contracting venturi inlets 379, flows through the eight venturi 378, and across the gaps 380 where air is drawn into the water stream by suction from the vertical air distribution channels 385. The mixture (e.g. water-air) flows from the gaps 380 into the eight expanding venturi outlets 381 where the flow velocity is decreased and out the eductor 70 where the mixture (e.g. water-air) continues to expand.

Figure 38:
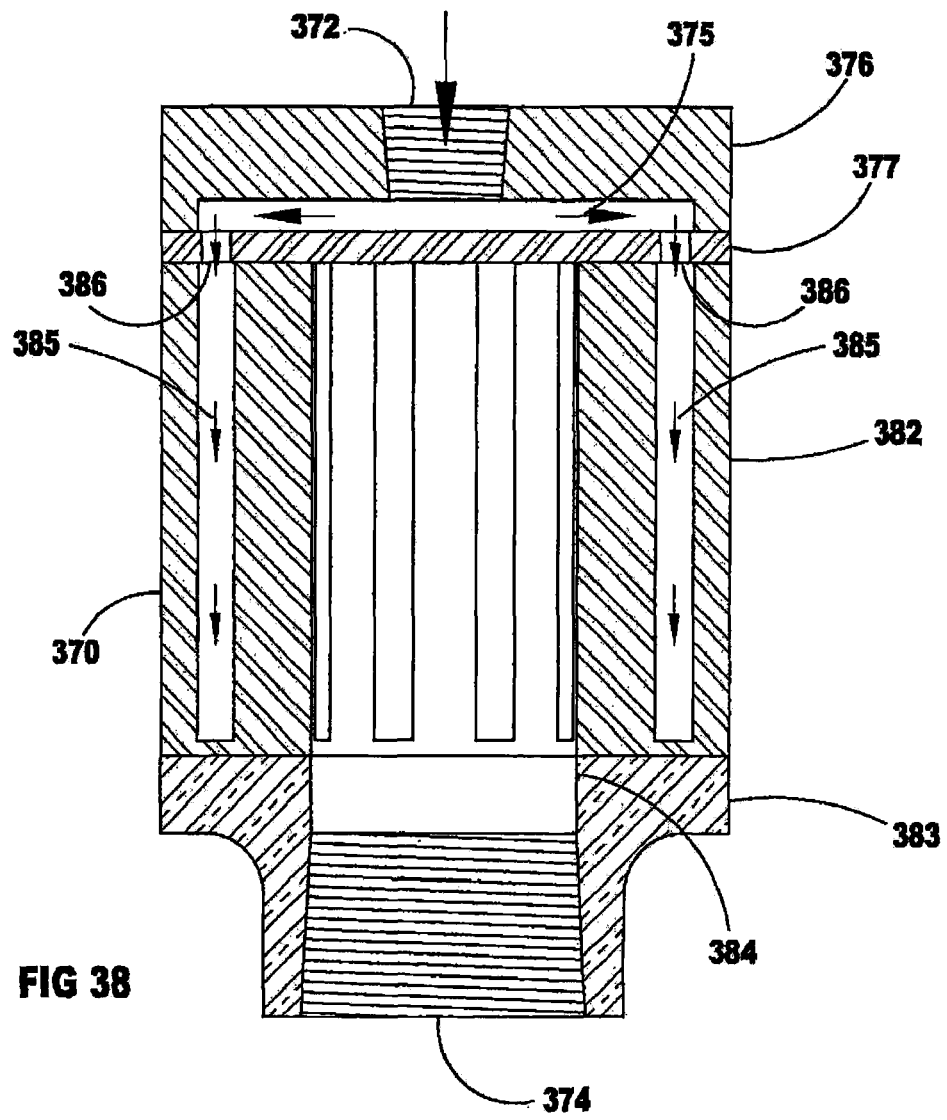
FIG. 38 is a vertical cross sectional schematic of the fifth eductor embodiment identifying the flow channels of the secondary fluid in accordance with the present invention.

FIG. 38 provides a vertical Sectional View B-B of the eductor 370 taken from FIG. 36 to identify air passageways. A second fluid, e.g. air from the atmosphere enters the eductor 370 through the secondary inlet (e.g. for air) 372, flows through the horizontal distribution channel 375 in the top plate 376, flows downward through eight slots 386 in the venturi-seal and air-distribution plate 377, and flows downward in the vertical channels 385 in the venturi array 382 then distributed to the gaps (e.g. for air) (380, FIG. 37*b*) to be drawn into the streams of water as the water flows through the eight venturi (378, FIG. 37*b*).

Figure 39:
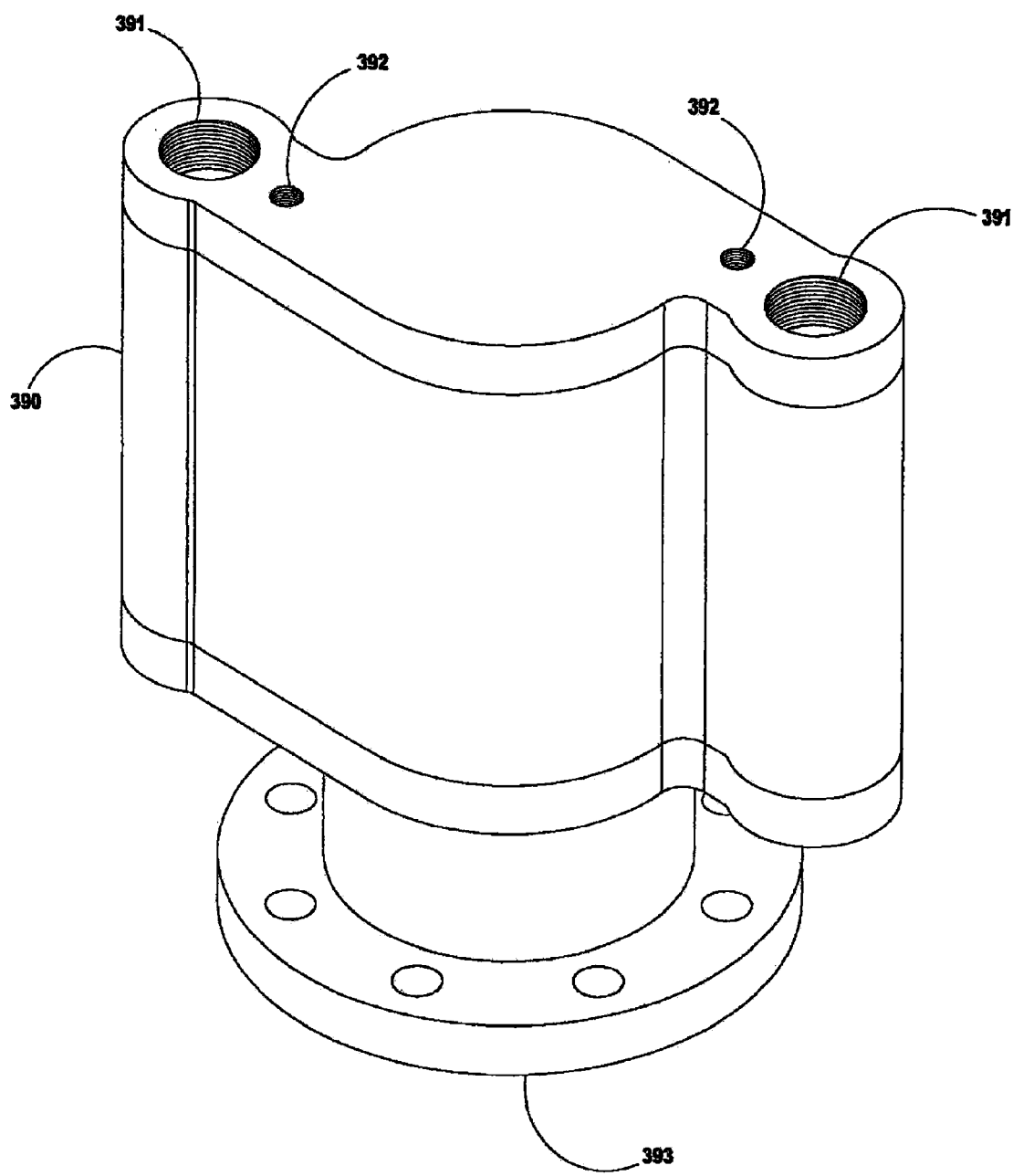
FIG. 39 depicts a three dimensional representation of a sixth eductor embodiment identifying primary and secondary fluid inlets and outlets in accordance with the invention

FIG. 39 depicts a three-dimensional illustration of a sixth embodiment of an eductor 390 for mixing fluids having linear venturi with openings in the form of a narrow rectangle positioned around a center chamber with two primary fluid inlets 391 (e.g. for water), two secondary inlets (e.g. for air) 392, and an eductor outlet 393 for the mixture (e.g. water-air) in accordance with the present invention. The eductor 390 may reduce backpressure and prevent the associated high reduction of air that can be drawn into the stream of water typically encountered when an eductor is submerged and has to discharge the flow into the high head pressure experienced in a deep body of water.

Figure 40:
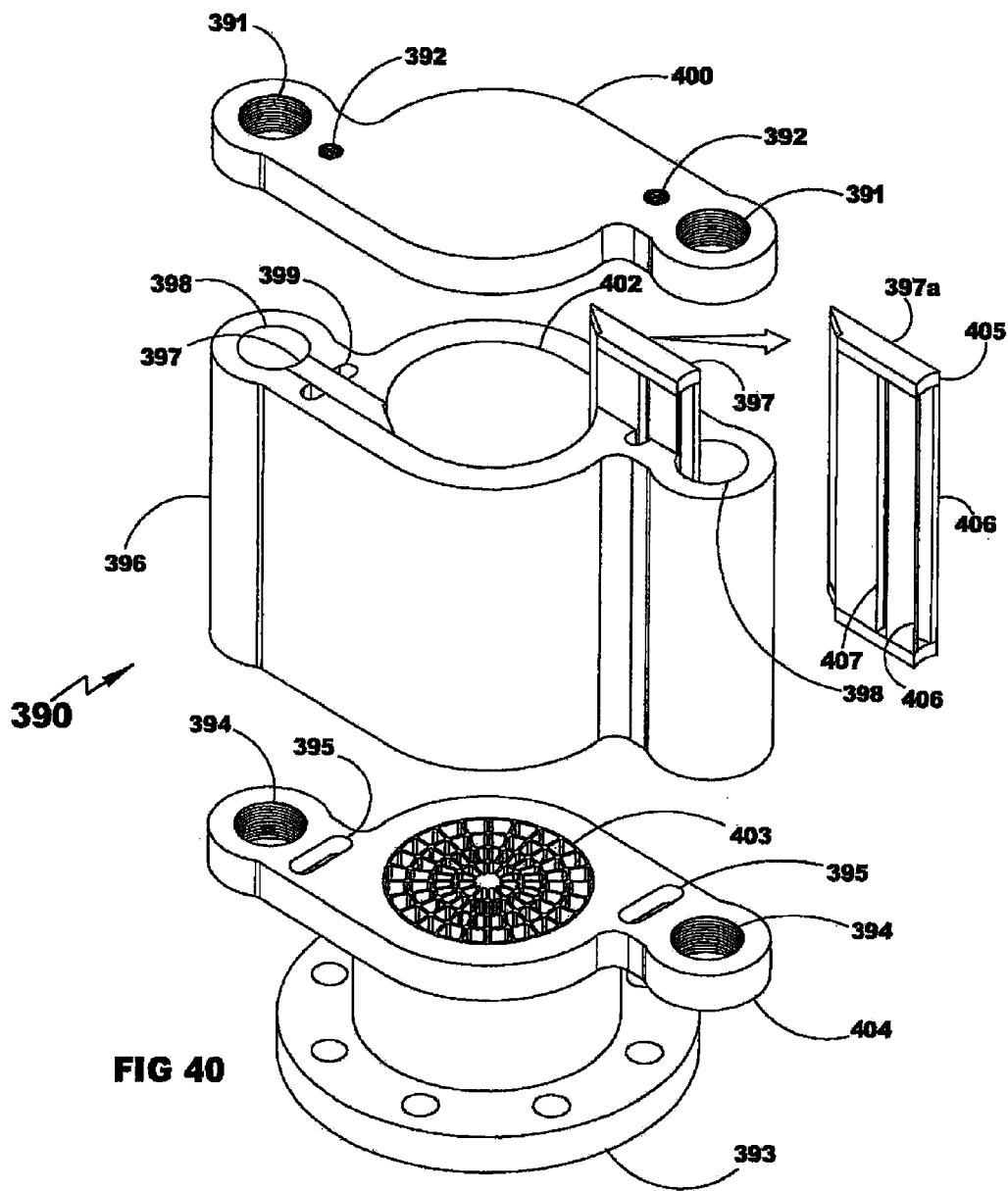
FIG. 40 depicts a three dimensional exploded view of the sixth eductor embodiment identifying the eductor components.

FIG. 40 depicts the eductor 390 in an exploded illustration to identify internal components in accordance with the present invention. The eductor 390 may comprise top plate 400 with two primary fluid inlets 391 (e.g. for water) and two secondary inlets (e.g. for air) 392; a venturi housing 396 with two venturi assemblies 397, two primary fluid distribution channels 398 (e.g. for water), two vertical air distribution channels 399 for each venturi 97, and a mixing chamber 102 (e.g. for water); a bottom plate 104 with two primary fluid inlets (e.g. for water) 394, two secondary inlets (e.g. for air) (as the secondary inlet (e.g. for air) 395 in the top plate 400 and not shown) with cross channels 395 to distribute air to both sides of the venturi 397, an eductor outlet (flanged) 393, and a flow stabilizer 403 with straighten vanes to stabilize the circulating flow (e.g. water-air) before leaving the eductor 390. A complete venturi assembly 397*a* is shown outside the eductor housing 396. The venturi assembly 397*a* may comprise a top and bottom seals 405, two contracting venturi inlets 406, and two expanding venturi outlets 407 (only one shown). There are also two cross channels 395 in the bottom of the top plate 400 below the secondary inlet 392 similar to the cross channels 395 shown in the bottom plate 304.

Figure 41:
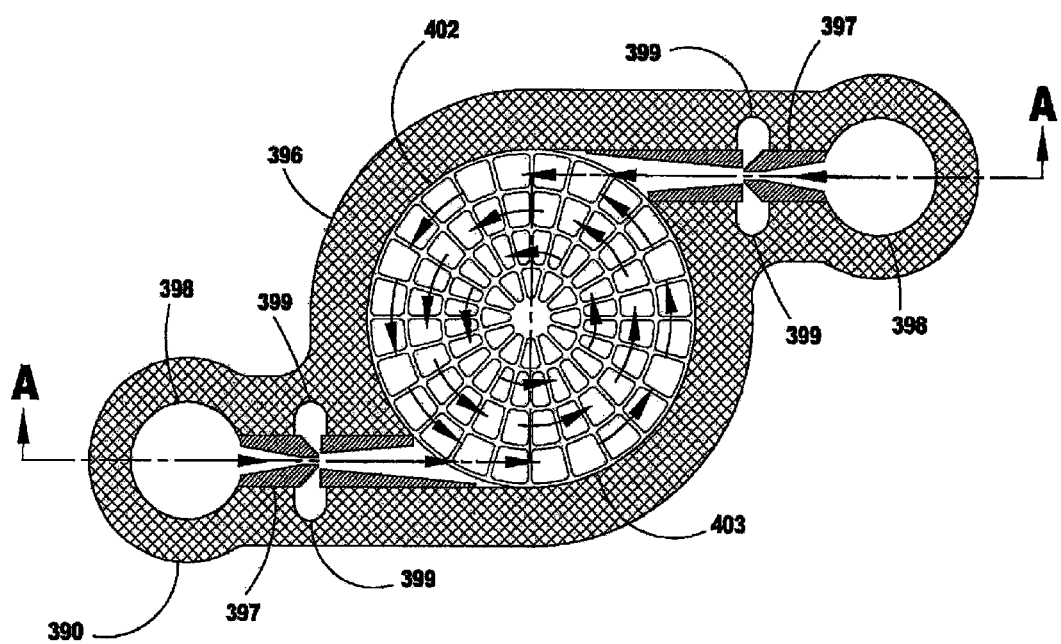
FIG. 41 is a horizontal cross sectional schematic of the sixth eductor embodiment identifying internal components and direction of fluid flow in accordance with the present invention.

FIG. 41 depicts a horizontal cross section of the venturi housing 396 and the two-venturi assemblies 397 and illustrates horizontal fluid flow through the eductor 390. The arrows indicate the direction of flow. A primary fluid (e.g. water) entering through the four primary fluid inlets 91 (not shown) flows through the two primary fluid distribution channels 398 (e.g. for water), and flows through the two venturi assemblies 397 where air, e.g., is drawn into the water stream from the vertical air distribution channels 399. The mixture (e.g. water-air) is discharged into the round mixing chamber 402 at a tangent to its circumference and circulates in the mixing chamber 402 to prevent a back pressure on the two venturi 397. The circulating mixture (e.g. water-air) flows downward and into the flow stabilizer 403 and exits through the eductor outlet 393 (shown in FIG. 40) below the flow stabilizer 403. A vertical Sectional View A-A is taken.

Figure 42:
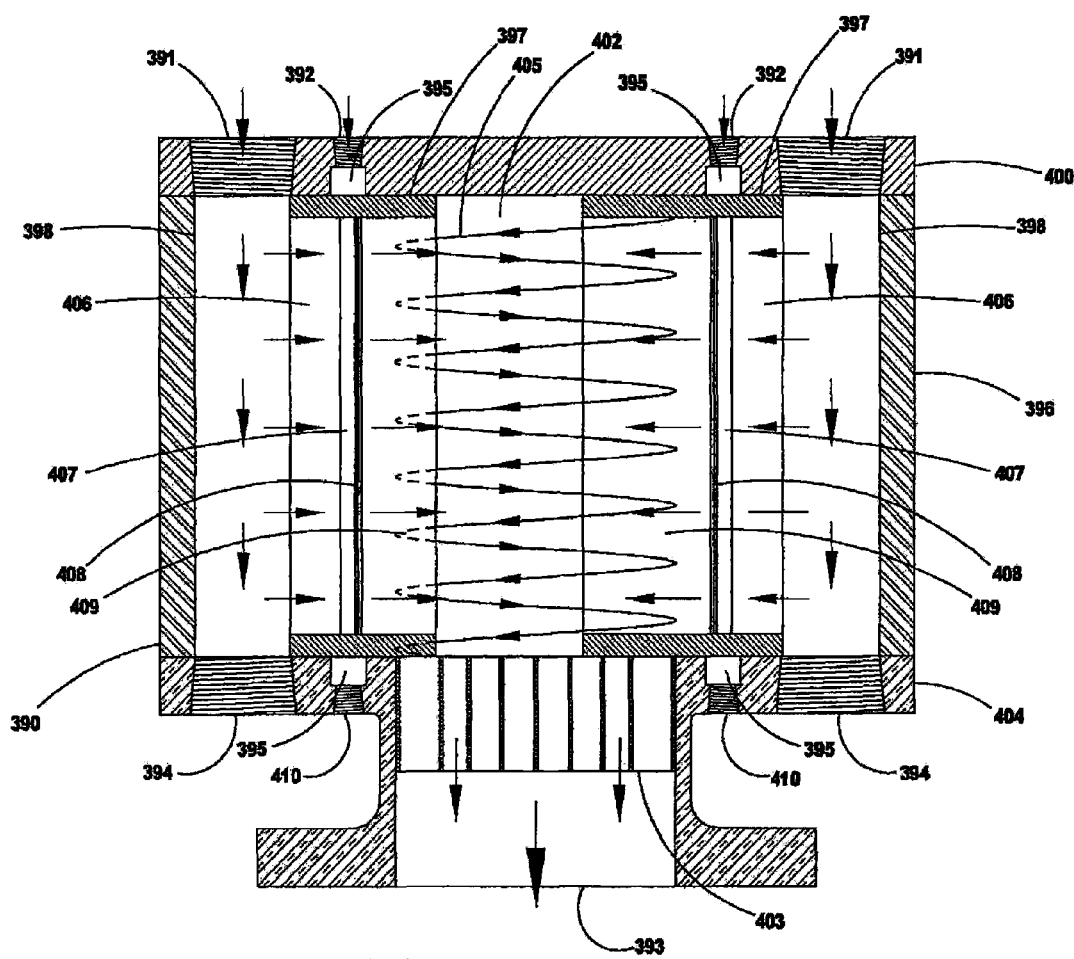
FIG. 42 is a vertical cross sectional schematic of the sixth eductor embodiment identifying the flow channels of the secondary fluid in accordance with the present invention.

FIG. 42 depicts a vertical Sectional View A-A of eductor 390 taken from FIG. 41 to identify components and show the fluid flow through the eductor 390. The eductor 390 may comprise a housing 396 with two primary fluid distribution channels 398 (e.g. for water), four vertical air distribution channels 399 (not shown), and a mixing chamber 402; a top plate 400 with two primary fluid inlets 391, two secondary inlets (e.g. for air) 392, and two air cross channels 395; two venturi assemblies 397 each with a contracting venturi inlet 406, a venturi 407, a gap 408, and an expanding venturi outlet 409; and a bottom plate with two primary fluid inlets 394 (e.g. for water), two secondary inlets 410 (e.g. for air), two air cross channels 395, a flow stabilizer 403, and an eductor outlet 393. The arrows indicate the direction of flow. Water enters the eductor 390 through the primary fluid inlets (e.g. for water) 391 and 394, flows in the vertical distribution channels 398, flows through the contracting venturi inlets 406, through the venturi 407, and across the gaps 408 where air is drawn into the water streams. The mixture (e.g. water-air) flows from the gaps 408 into the venturi outlets 409 and discharged into the mixing chamber 402 and circulates. The circulating water spirals 405 downward in the mixing chamber 402 and flows out through the flow stabilizer 403 and exits the eductor 390 through the outlet 393.

The eductor 390 can be made any size diameter and length for the water and air flowrates selected with any number of venturi positioned around the circumference to satisfy the need of the intended application. The eductor 390 can be manufactured in plastic or metal materials. Ultrasonic welding, induction welding, or bolting can be used to assemble components made of plastic materials. Soldering, brazing, or bolting can used to assemble components made of metal materials.

Figure 43:
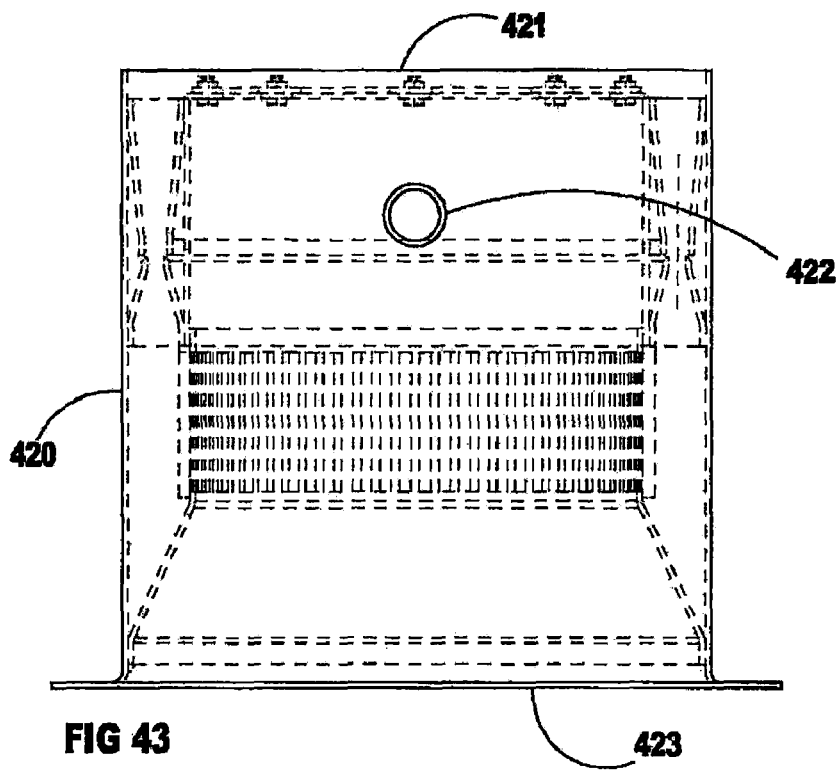
FIG. 43 depicts a top view of a seventh eductor embodiment identifying a primary fluid inlet and outlet and a secondary inlet and outlet (e.g. for a secondary fluid or solid) in accordance with the invention

FIG. 43 depicts an illustration of the top view of a seventh embodiment of an eductor 420 identifying the primary fluid inlet 423 (e.g. for water), the water outlet 421, and the secondary inlet (e.g. for air) 422 for mixing fluids having linear venturi with an opening in the shape of a narrow ring for drawing air into and aerating water flowing through a pipe in accordance with the present invention.

Figure 44:
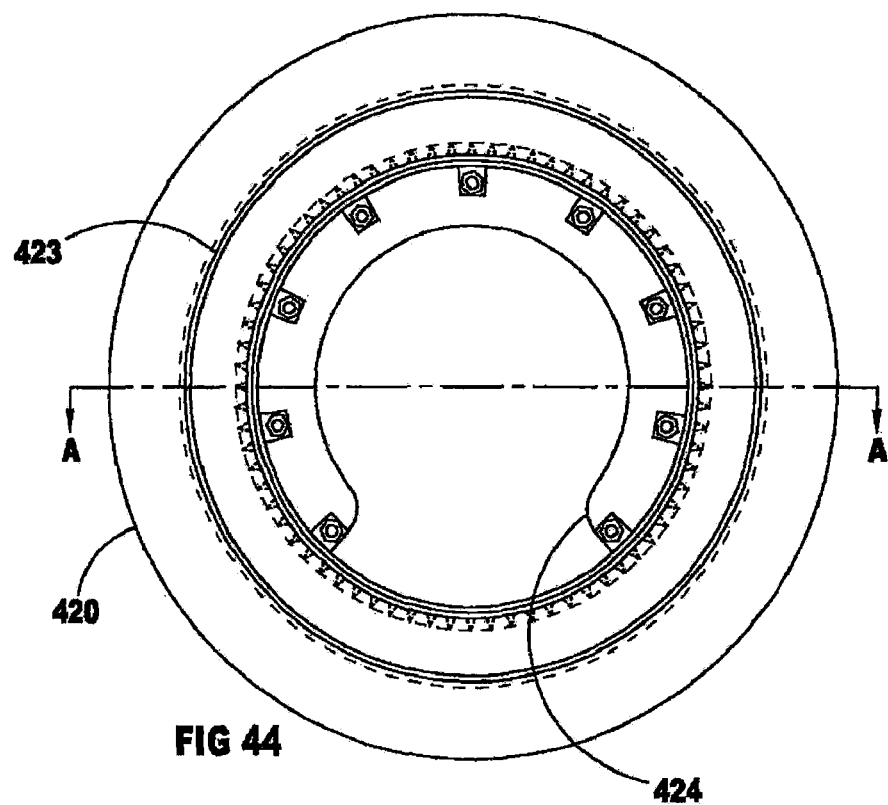
FIG. 44 depicts an elevation view of the primary fluid inlet of the seventh eductor embodiment for insertion in a pipe and identifying the location of a baffle to provide a differential pressure across the eductor and divert primary fluid flowing in the pipe through the eductor in accordance with the present invention.

FIG. 44 depicts an elevation view of the primary fluid inlet (e.g. for water) 423 of the eductor 420 and identifies a baffle 424 or pressure ring inside the eductor 420 to block part of the water flowing through a pipe and produce a differential pressure to divert part of the water through the eductor 420 positioned inside the pipe to draw in air for aeration in accordance with the present invention. The baffle 424 is a ring cut off at the bottom to allow solids in the bottom of the water to flow through without blocking the inlet when the eductor 420 is installed in a horizontal position. The baffle may not be cut off for an installation in a pipe with vertical flow. A Sectional View A-A is taken at the center of the eductor 420 and illustrated in the following figure.

Figure 45:
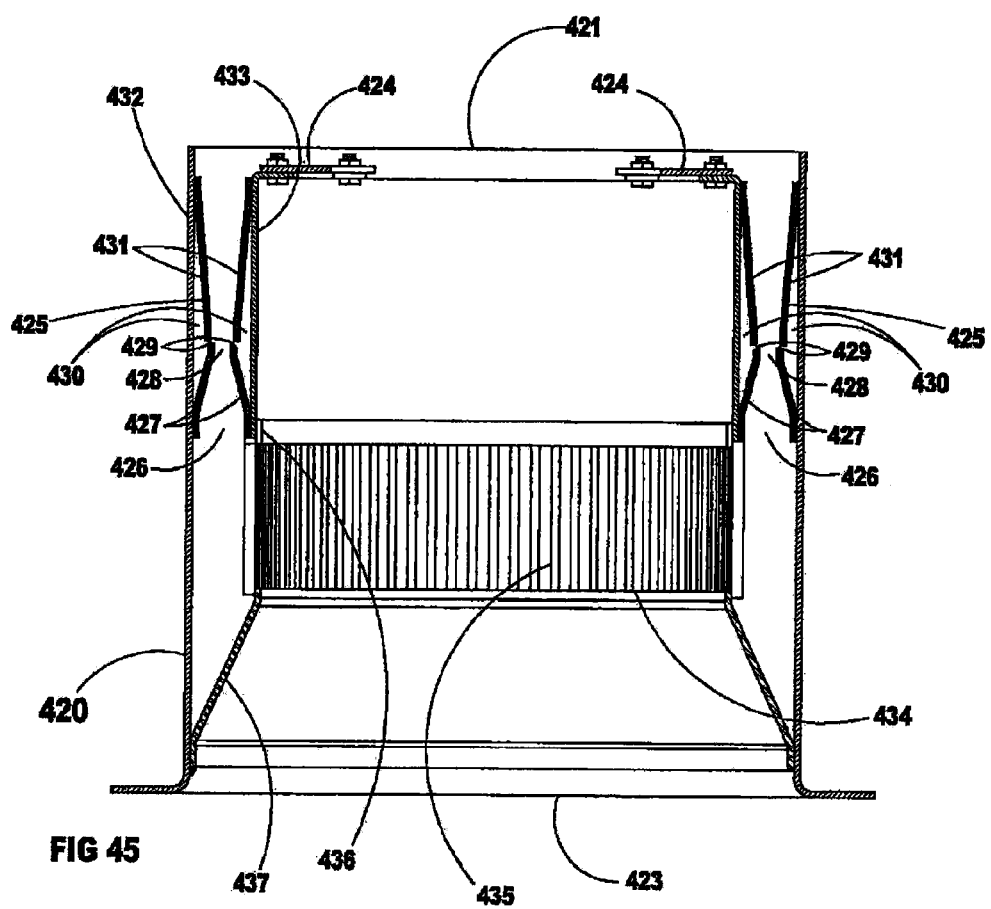
FIG. 45 is a horizontal cross sectional schematic of the seventh eductor embodiment identifying internal components in accordance with the present invention.

FIG. 45 depicts a horizontal Sectional View A-A of the eductor 420 taken from FIG. 44 to identify the internal components in accordance with the present invention. The eductor 420 may comprise a primary fluid inlet 423 (e.g. for water), a primary fluid outlet 421 (e.g. for water), a venturi assembly 425 positioned in an annulus produced by an outer housing 432 and an inner tube 433, a filter assembly 434 to prevent solids from entering and blocking the venturi assembly 425, and a baffle 424 to cause a pressure buildup inside the eductor 420. The venturi assembly 425 may comprise a venturi inlet 426 with contracting sides 427, a venturi 428, gaps 429 on each side of the venturi 428, and an expanding venturi outlet 431. The filter assembly 434 may comprise an inlet cone 437, wedge wires 435 (e.g. triangular shaped) positioned parallel to the direction of water flow to minimize the blockage by solid particles flowing across the filter 434, and a downstream wedge wire retainer 436.

FIG. 46 depicts a piping installation 438 with the eductor 420 and identifies a piping system 439, the primary fluid inlet 442 (e.g. for water), the outlet 440, and the secondary inlet 1414 (e.g. for air) in accordance with the present invention.

FIG. 47 depicts an elevation view of the primary fluid inlet (e.g. for water) 442 of the piping installation 438 with the eductor 420 and piping system 438 and illustrating the position of the baffle 424 from which a Sectional View B-B is taken in accordance with the present invention.

Figure 48:
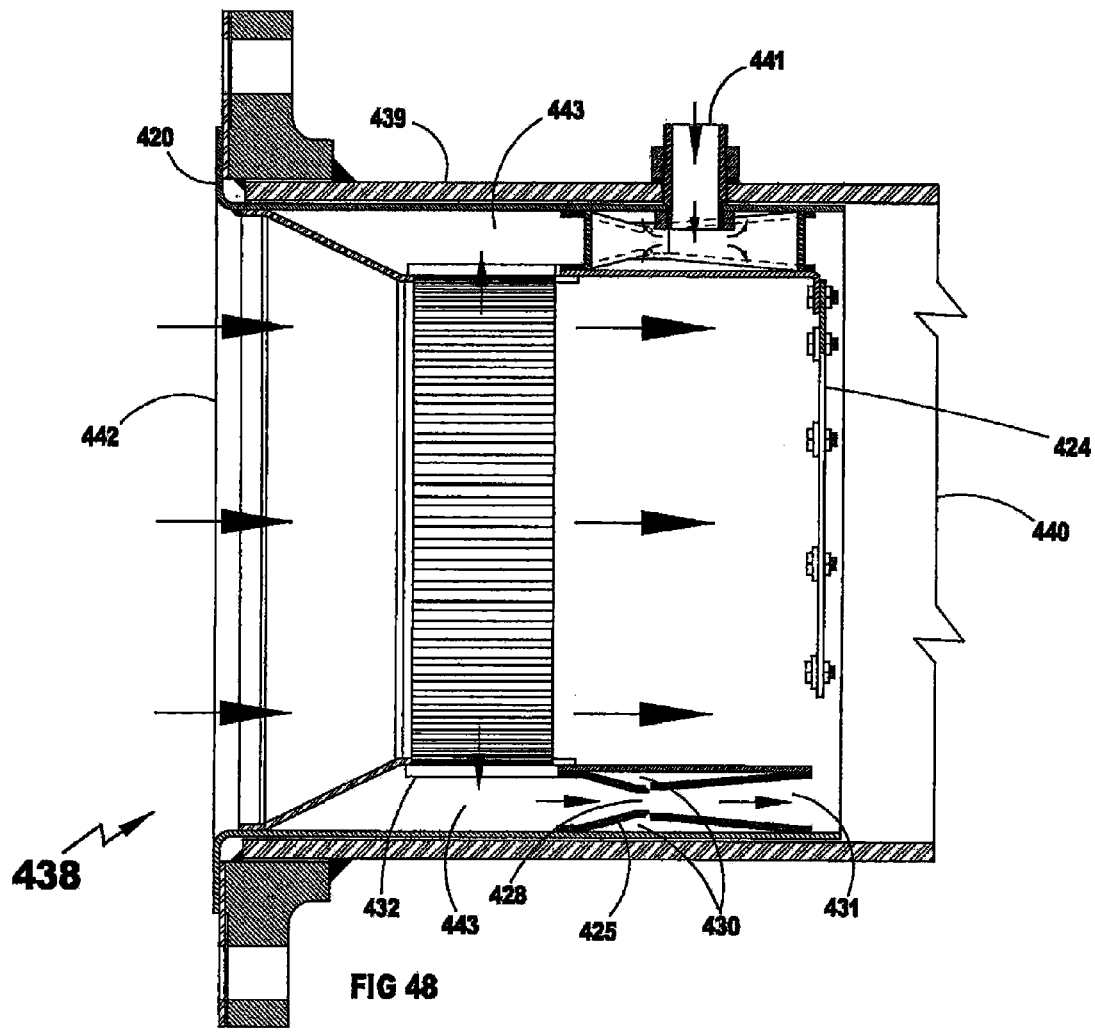
FIG. 48 is a horizontal cross sectional schematic of the seventh eductor embodiment identifying internal components and direction of fluid flow in accordance with the present invention.

FIG. 48 depicts a horizontal Sectional View A-A of the piping installation 438 with the eductor 420 installed in piping 439 taken from FIG. 47 to identify the internal components and show the flow through the piping installation 438 in accordance with the present invention. The piping installation 438 consists the eductor 420 and piping system 439 with a primary fluid inlet 442 (e.g. for water), an outlet 440 (e.g. for water), and a secondary inlet (e.g. for air) 441. The arrows indicate the direction of flow. Water enters the piping installation 138 through the primary fluid inlet (e.g. for water) 442, flows into the eductor 420 where the flow is restricted by the baffle 424, flows through the filter assembly 432 into a distribution channel 443, flows through the venturi 128, and draws air into the water stream from the secondary inlet (e.g. for air) 441 through the air distribution channels 430 on each side of the venturi 428. The mixture (e.g. water-air) flows out of the eductor 420 through the expanding venturi outlet 431 and out of the piping installation 438 through the water outlet 440.

Figure 49:
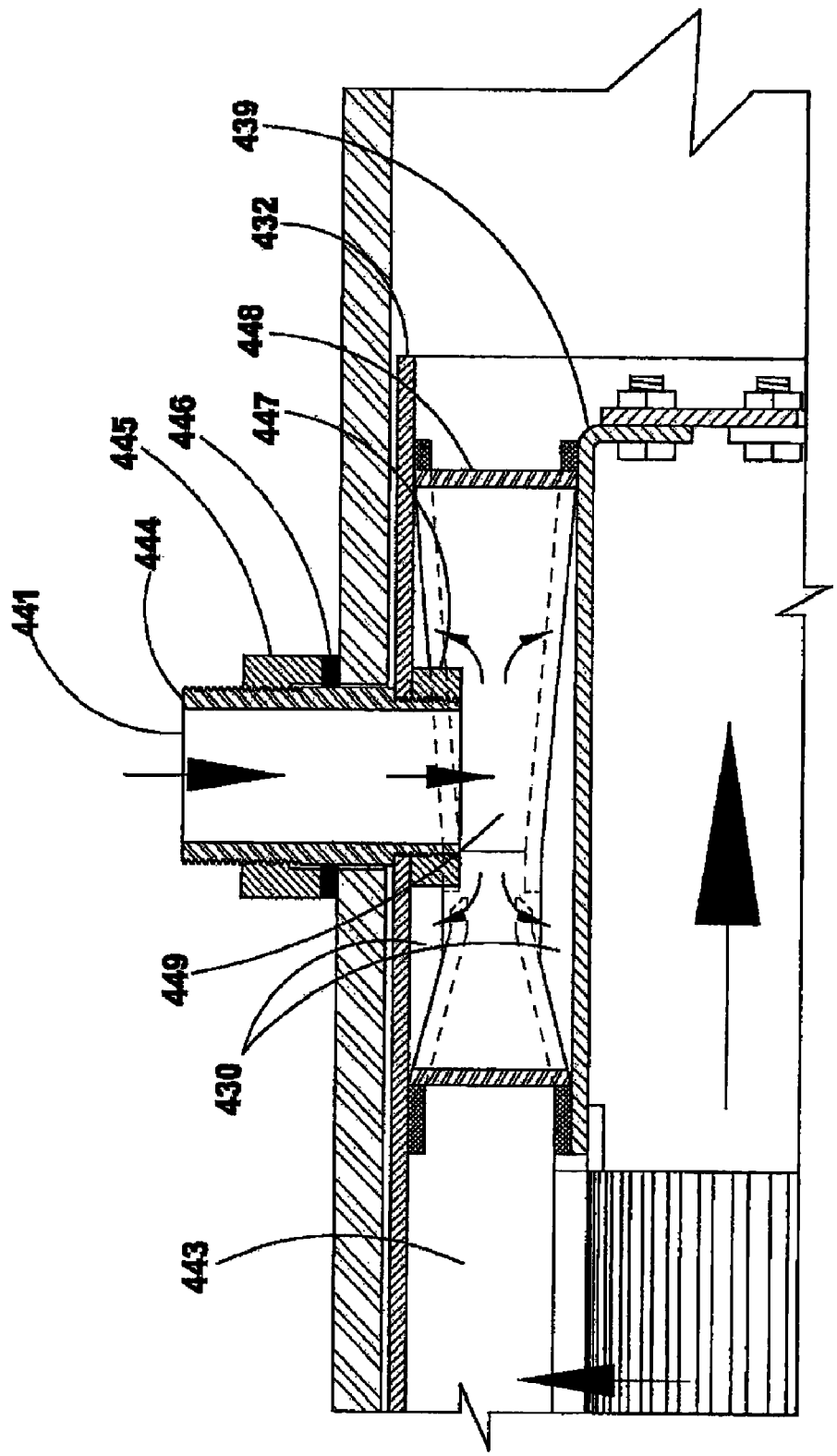
FIG. 49 is a horizontal cross sectional schematic of the seventh eductor embodiment illustrating the secondary fluid inlet and internal flow channels in accordance with the present invention.

FIG. 49 illustrates the components of the secondary inlet 441 (e.g. for air) and airflow into the eductor (420, FIG. 48) in accordance with the present invention. The secondary inlet (e.g. for air) 141 may comprise an secondary inlet (e.g. for air) enclosure 448, a weld nut 447 attached to the inside of the outer housing 432, a threaded tubing 444, a seal 446, and a nut 445 to tighten the seal 446. The arrows indicate the direction of airflow. Air from the atmosphere, e.g., may be drawn into the secondary inlet 441, flows into a receiving chamber 449, and flows out of the receiving chamber 449 into the air distribution channels 430 on each side of the venturi (428, FIG. 48).

The eductor 420 can be made any size for insertion into any size pipe. The components can be constructed from sheet metal at a relatively low cost and provide an economical solution to odor problems and convert many municipal sewage collection systems into supplementary treatment systems providing a reduction on the treatment loads of certain municipal treatment plants operating at capacity or over capacity, and perhaps even extend the time before a costly addition to plant capacity is needed or bring the treatment load back down to the design capacity if now operating over capacity.

FIG. 50 provides a schematic illustration of piping installation 450 with an eighth embodiment of an eductor 462 installed in piping 455 having a linear venturi opening in the form of an enlarged ring sized for aerating water containing large solid particles with suction gaps on each side of the venturi opening in accordance with the present invention. The piping installation 450 is at the output of a pump to aerate the water flowing through the line, such as in a municipal wastewater collection system. The piping installation 450 may comprise an outlet flange 1451 of a pump (not shown), an eductor 462 inserted between the outlet flange 451 and outlet piping 455 of the pump with gaskets 452 and 454, a dresser coupling 456, and municipal collection system piping 457. The eductor 462 may comprise primary fluid inlet 466 (e.g. for water), a fluid outlet 460, an secondary inlet 453 (e.g. for air), and a venturi assembly having a venturi inlet 466 with contracting sides 464, a venturi 465, suction gaps 461 on each side of the venturi 465 opening, and a venturi outlet 460 expanding on both the inside and outside diameters 459. The arrows indicate the direction of flow. Water enters the piping installation 450 from the pump through the inlet 467 of the pump outlet flange 451, flows through the contracting venturi inlet 466, flows through the venturi 465, and draws atmospheric air, e.g., from the secondary inlet 453 into the water stream as the water flows across the gaps 461. The mixture (e.g. water-air) flows out of the eductor 462 through the expanding venturi outlet 460. The aerated water flows out or the piping 455 and into the wastewater collection piping system 457. The atmospheric air, e.g., flows from the secondary inlet 453 into the outer air distribution channel 463 around the outside diameter of the venturi 465 and into the inner air distribution channel 458 through the air passageways 468 where the air is available to be drawn into the water stream through the gaps 461. The eductor 450 is shown with one circular venturi 465. In is understood that in larger pipes eductors with multiple concentric venturi might be installed to draw in any amount of air needed for aeration of the quantity of water flowing through the pipe. In smaller pipes the eductor might be reduced to having a gap only on one side of the venturi opening.

Although various embodiments have been shown and described, the invention is not so limited and will be understood to include all such modifications and variations as would be apparent to one skilled in the art.

What I claim is:

1. An eductor system to mix a primary fluid and a secondary fluid, the eductor system comprising:
   a housing having a housing axis, the housing having a primary fluid inlet and a secondary fluid inlet;
   at least one venturi assembly comprising:
      a venturi inlet for the primary fluid;
      a venturi in fluid communication with the venturi inlet, the venturi having a cross section flow area with an inner diameter and a concentric outer diameter; and
      a venturi outlet having an annular void;
   an outer distribution channel in fluid communication with the secondary fluid inlet; and
   at least one gap between the venturi and the venturi outlet, wherein the primary fluid flows into the venturi inlet, the primary fluid being accelerated as the primary fluid flows through the venturi, to draw in the secondary fluid from the outer distribution channel through the at least one gap by suction, to mix the secondary fluid with the primary fluid, a mixture of primary fluid and secondary fluid exiting the eductor system through the venturi outlet.

2. An eductor system as defined in claim 1, wherein the venturi inlet is a contracting venturi inlet and the venturi outlet is an expanding venturi outlet.

3. An eductor system as defined in claim 2, wherein the contracting venturi inlet is adapted to funnel the primary fluid into the venturi.

4. An eductor system as defined in claim 3, wherein the expanding venturi outlet has an outer perimeter extending away from the housing axis along a length of the housing.

5. An eductor system as defined in claim 1, wherein the system further comprises an inner distribution channel, the inner distribution channel in fluid communication with the outer distribution channel via at least one passageway, the inner distribution channel also being in fluid communication with a second gap between the venturi and the inner distribution channel, to draw the secondary fluid from the inner distribution channel into the primary fluid through the second gap by suction.

6. An eductor system as defined in claim 5, wherein the at least one passageway passes radially through the venturi.

7. An eductor system as defined in claim 1, wherein the gap is in fluid communication with the venturi, the second distribution channel, and the venturi outlet.

8. An eductor system as defined in claim 1, the eductor system further comprising an inner distribution channel, the outer distribution channel in fluid communication with the inner distribution channel via a passageway.

9. An eductor system as defined in claim 1, wherein the housing is adapted to be installed in piping.

10. An eductor system as defined in claim 1, wherein the primary fluid is a liquid or gas.

11. An eductor system as defined in claim 1, wherein the secondary fluid is a liquid or gas.

12. An eductor system to mix a primary fluid and a secondary fluid, comprising:
   an eductor housing comprising:
      a primary fluid inlet;
      a primary fluid distribution channel in fluid communication with the primary fluid inlet; and
      a secondary fluid inlet, a secondary fluid distribution channel in fluid communication with the secondary fluid inlet;
   a plurality of venturi assemblies, each with a venturi inlet positioned around a periphery of the primary fluid distribution channel, each of the plurality of venturi assemblies having:
      a contracting venturi inlet in fluid communication with the primary fluid distribution channel;
      a venturi in fluid communication with the venturi inlet and having an cross-section in the form of a rectangle;
      a venturi outlet in fluid communication with the venturi, the venturi having an inner perimeter and an outer perimeter forming an annular void; and
      at least one gap being formed between the venturi and the venturi outlet,
   wherein the primary fluid from the primary fluid distribution channel flows into the contracting venturi inlet, accelerates as the primary fluid flows through the venturi, draws in the secondary fluid through the at least one gap in each of the venturi assemblies from the secondary fluid distribution channel by suction, and mixes the secondary fluid with the primary fluid, a mixture of the primary and secondary fluid exiting the eductor through the venturi outlet.

13. An eductor system to mix a primary fluid and a secondary fluid comprising:
   an eductor housing having:
      at least one primary fluid inlet;
      at least one primary fluid distribution channel in fluid communication with each of the at least one primary fluid inlet;
      a secondary fluid inlet;
      a secondary distribution channel in fluid communication with the secondary fluid inlet;
      a mixing chamber having a fluid stabilizer and a fluid outlet;
   a plurality of venturi assemblies, each having at least one outlet positioned around a circumference of the mixing chamber adapted to discharge a fluid tangent to the circumference of the mixing chamber, each of the plurality of venturi assemblies having:
      a contracting venturi inlet for the primary fluid in fluid communications with the primary fluid distribution channel, a venturi having cross section in the form of a rectangle in fluid communications with the venturi inlet, and, an expanding venturi outlet in fluid communication with the venturi, the expanding venturi outlet being an annular void: and
      at least one gap being formed between the venturi and the venturi outlet,
   wherein the primary fluid from the primary fluid distribution channel flows into the contracting venturi inlet, accelerates as the primary fluid flows through the venturi, draws in the secondary fluid through the gaps from the secondary fluid distribution channel by suction, and mixes the secondary fluid with the primary fluid, a mixture of the primary fluid and secondary fluid exiting the eductor through the venturi outlet into the mixing chamber, and out of the eductor.

14. An eductor system to remove hydrogen sulfide and methane gases as a secondary fluid from pumping or lift stations for odor control in municipal wastewater collection systems, comprising:
   a source of wastewater as a primary fluid, having hydrogen sulfide and methane gases as the secondary fluid that are released to the atmosphere as the wastewater exits from the wastewater collection system piping in a well of the lift station;

a housing having a housing axis, the housing adapted to be inserted into municipal wastewater collection system piping having primary and secondary fluid inlets;

a secondary fluid distribution channel in fluid communications with the secondary fluid inlet; and a venturi assembly positioned inside the housing, the venture assembly comprising:
  a contracting venturi inlet in fluid communications with the primary fluid inlet;
  a venturi in fluid communication with the venturi inlet, the venturi forming an annular void about the housing axis; and
  at least one gap fanned between the venturi and a venturi outlet having an annular void, the venturi outlet in fluid communication with the venturi, wherein the primary fluid from the primary fluid inlet flows into the housing, through the contracting venturi inlet, accelerates as the primary fluid flows through the venturi, draws in the secondary fluid through the at least one gap from the secondary fluid distribution channel by suction, and mixes the secondary fluid with the primary fluid to become partially or totally dissolved in the primary fluid, a mixture of the primary and secondary fluid plus any excess secondary fluid gases exiting the eductor through the venturi outlet.

15. An aeration system to mix atmospheric air as a secondary fluid with wastewater as a primary fluid flowing through a municipal wastewater collection system piping, the aeration system comprising:
  a source of wastewater;
  a wastewater collection system piping in fluid communication with the source of wastewater;
  a wastewater pump in fluid communication with the wastewater collection system piping to force the wastewater to flow through the wastewater collection system piping; and
  an eductor system adapted for insertion into and in fluid communication with the wastewater collection system piping and the wastewater pump, the eductor comprising:
    a cylindrical housing having an axis, the cylindrical housing adapted to be inserted into municipal wastewater collection system piping having primary and secondary fluid inlets;
    a secondary fluid distribution channel in fluid communication with the secondary fluid inlet; and
    a venturi assembly positioned inside the housing, the venture assembly comprising:
      a contracting venturi inlet in fluid communications with the primary fluid inlet;
      a venturi in fluid communications with the venturi inlet forming an annular void about the housing axis; and
      at least one gap being formed between the venturi and a venturi outlet having an annular void, the venturi outlet in fluid communication with the venturi, wherein the wastewater flows through the wastewater pump where the pressure is increased, flows into the eductor housing, through the contracting venturi inlet, is accelerated as the wastewater flows through the venturi, draws in air as the secondary fluid through at least one gap from the secondary fluid distribution channel by suction, and mixes the air with the primary fluid, a mixture of the primary and secondary fluid exiting the eductor through the venturi outlet and continuing to flow through the wastewater collection system piping.

16. A method for mixing fluids, the method comprising the steps of:
  (a) inserting a primary fluid into a venturi via an eductor having a housing with an axis and a fluid inlet;
  (b) flowing the primary fluid through a venturi having a cross sectional flow area in the form of an annular void along the axis of the housing with at least one gap between the venturi and an expanding venturi outlet having an annular void;
  (c) flowing the primary fluid through the venturi producing a suction;
  (d) drawing the secondary fluid through the gaps and mixing the secondary fluid with the primary fluid; and
  (e) flowing a mixture of the primary fluid and the secondary fluid through the expanding venturi outlet and out of the eductor.

17. An eductor system to mix a primary fluid and a secondary fluid, the eductor system comprising:
  a cylindrical housing having a housing axis, the housing having a primary fluid inlet and a secondary fluid inlet;
  a venturi assembly comprising:
    a plurality of concentric venturi inlets for the primary fluid;
    a plurality of concentric venturis, each in fluid communication with one of the plurality of concentric venturi inlets, each of the plurality of concentric venturis having a cross section flow area with an inner diameter and an outer diameter about the housing axis; and
    a plurality of concentric venturi outlets forming annular voids, each in fluid communication with one of the plurality of concentric venturis;
  a distribution channel in fluid communication with the secondary fluid inlet; and
  at least one gap between each of the plurality of venturis and the plurality of concentric venturi outlets, wherein the primary fluid flows into the plurality of venturi inlets, the primary fluid being accelerated as the primary fluid flows through the plurality of venturis, to draw in the secondary fluid from the distribution channel through the at least one gap between each of the plurality of venturis and the distribution channel by suction, to mix the secondary fluid with the primary fluid, a mixture of primary fluid and secondary fluid exiting the eductor system through the plurality of venturi outlets.

18. An eductor to mix a first fluid and a second fluid, the eductor comprising:
  a cylindrical housing having a housing axis, the housing having a first fluid inlet and a second fluid inlet;
  a venturi having an inlet and an outlet with an annular void, the venturi having a cross section formed by an inner diameter and an outer diameter to define an annulus between the inner and outer diameter about the cylindrical housing axis;
  an outer distribution channel in fluid communication with the secondary fluid inlet; and
  at least one gap between the venturi and the venturi outlet,
  wherein the first fluid flows into the venturi inlet in a direction along the housing axis, the first fluid being accelerated as the first fluid flows through the venturi, to draw in the second fluid from the outer distribution channel through the gap by suction, to mix the second fluid and the first fluid, a mixture of the first and second fluid exiting the eductor through the venturi outlet.

19. An eductor as defined in claim 18, the eductor further comprising an inner distribution channel in fluid communication with the outer distribution channel, the inner distribution channel being within the annular void of the venturi.

20. An eductor as defined in claim 19, wherein the venturi outlet is an expanding venturi outlet with an outer perimeter extending away from the housing axis, along the housing.

21. An eductor as defined in claim 19, wherein at least one radial passage provides fluid communication between the inner distribution channel and the outer distribution channel, the at least one radial passage passing radially through the annulus of the venturi.

22. An eductor as defined in claim 20, wherein the venturi inlet is contracting venturi inlet to funnel the first fluid into the venturi.

23. An eductor as defined in claim 20, wherein the expanding venturi outlet has in inner perimeter extending toward the housing axis along the housing.

24. An eductor as defined in claim 18, wherein the eductor further comprises an inner distribution channel, the inner distribution channel in fluid communication with the outer distribution channel via at least one passageway, the inner distribution channel also being in fluid communication with the venturi via a second gap, to draw the second fluid from the inner distribution channel into the first fluid through the second gap by suction.

25. An eductor system to mix a primary fluid and a secondary fluid, the eductor system comprising:
- a housing having a primary fluid inlet in fluid communication with a primary fluid distribution channel, and a secondary fluid inlet in fluid communication with a secondary fluid distribution channel;
- at least one venturi assembly comprising:
  - a venturi inlet for the primary fluid in communication with the primary fluid distribution channel;
  - a venturi in fluid communication with the venturi inlet, the venturi having a cross section in the form of a rectangle; and
  - a venturi outlet having an annular void; and
- at least one gap between the venturi and the venturi outlet,
- wherein the primary fluid flows into the venturi inlet, the primary fluid being accelerated as the primary fluid flows through the venturi, to draw in the secondary fluid from the secondary fluid distribution channel through the at least one gap by suction, to mix the secondary fluid with the primary fluid, a mixture of primary fluid and secondary fluid exiting the eductor system through the venturi outlet.

* * * * *

UNITED STATES PATENT AND TRADEMARK OFFICE
CERTIFICATE OF CORRECTION

| | | |
|---|---|---|
| PATENT NO. | : 7,993,051 B2 | Page 1 of 1 |
| APPLICATION NO. | : 12/833479 | |
| DATED | : August 9, 2011 | |
| INVENTOR(S) | : Amaud | |

It is certified that error appears in the above-identified patent and that said Letters Patent is hereby corrected as shown below:

Column 29, Line 16:    remove "fanned" and insert --formed--

Signed and Sealed this
Twentieth Day of September, 2011

David J. Kappos
*Director of the United States Patent and Trademark Office*